United States Patent
Hashimoto et al.

(10) Patent No.: US 12,555,035 B2
(45) Date of Patent: Feb. 17, 2026

(54) MODEL GENERATION APPARATUS, ESTIMATION APPARATUS, MODEL GENERATION METHOD, AND COMPUTER-READABLE STORAGE MEDIUM STORING A MODEL GENERATION PROGRAM

(71) Applicant: OMRON Corporation, Kyoto (JP)

(72) Inventors: Atsushi Hashimoto, Tokyo (JP); Yamato Okamoto, Tokyo (JP)

(73) Assignee: OMRON Corporation, Kyoto (JP)

( * ) Notice: Subject to any disclaimer, the term of this patent is extended or adjusted under 35 U.S.C. 154(b) by 735 days.

(21) Appl. No.: 17/801,813

(22) PCT Filed: Feb. 10, 2021

(86) PCT No.: PCT/JP2021/005064
§ 371 (c)(1),
(2) Date: Aug. 24, 2022

(87) PCT Pub. No.: WO2021/176984
PCT Pub. Date: Sep. 10, 2021

(65) Prior Publication Data
US 2023/0109426 A1    Apr. 6, 2023

(30) Foreign Application Priority Data
Mar. 3, 2020 (JP) .................. 2020-036237

(51) Int. Cl.
G06F 16/00 (2019.01)
G06N 20/00 (2019.01)
G06V 10/774 (2022.01)

(52) U.S. Cl.
CPC .......... *G06N 20/00* (2019.01); *G06V 10/774* (2022.01)

(58) Field of Classification Search
None
See application file for complete search history.

(56) References Cited

U.S. PATENT DOCUMENTS 5,479,576 A     12/1995  Watanabe et al.
5,835,901 A  *  11/1998  Duvoisin, III ........... G06N 3/09
                                                  706/31
(Continued)

FOREIGN PATENT DOCUMENTS

JP    H5-346915 A    12/1993
JP    H9-16553 A     1/1997
(Continued)

OTHER PUBLICATIONS

Efficient statistical validation of machine learning systems for autonomous driving, IEEE, Weijing et al., (Year: 2016).*

(Continued)

*Primary Examiner* — Jean M Corrielus
(74) *Attorney, Agent, or Firm* — METROLEX IP LAW GROUP, PLLC; Robert L. Scott, Esq.

(57) ABSTRACT

A model generation apparatus according to one or more embodiments executes: a first training step of training an encoder, a first estimator, and a second estimator so that, when training data of each of learning data sets is given to the encoder, a result of the first estimator executing a first estimation task matches first correct answer data, and a result of the second estimator executing a second estimation task matches second correct answer data; and a second training step of training the encoder so that, for each of the learning data sets, a correlation between a first portion of feature amounts and the second correct answer data is lowered, and a correlation between a second portion of the feature amounts and the first correct answer data is lowered.

20 Claims, 18 Drawing Sheets

(56) References Cited

U.S. PATENT DOCUMENTS

| | | | | |
|---|---|---|---|---|
| 2016/0210529 | A1* | 7/2016 | Nishiyuki | G06V 10/44 |
| 2017/0154258 | A1* | 6/2017 | Liu | G06N 3/0442 |
| 2017/0228639 | A1* | 8/2017 | Hara | G06N 3/0985 |
| 2018/0096247 | A1* | 4/2018 | Maruhashi | G06N 3/0499 |
| 2018/0107215 | A1 | 4/2018 | Djuric et al. | |
| 2019/0205761 | A1* | 7/2019 | Wu | G06F 16/353 |
| 2019/0377955 | A1* | 12/2019 | Swaminathan | G06N 3/0475 |
| 2021/0142064 | A1* | 5/2021 | Shimizu | G06V 10/80 |
| 2022/0139070 | A1* | 5/2022 | Okamoto | G08G 1/0116 382/159 |
| 2022/0172046 | A1* | 6/2022 | Nishiyuki | G06N 3/045 |
| 2023/0059265 | A1* | 2/2023 | Watanabe | G06N 20/00 |
| 2024/0256836 | A1* | 8/2024 | Fukushi | G06N 20/00 |
| 2025/0068923 | A1* | 2/2025 | Fukushi | G06N 3/094 |

FOREIGN PATENT DOCUMENTS

| | | | | |
|---|---|---|---|---|
| JP | 2009-83095 | A | 4/2009 | |
| JP | 2012-26982 | A | 2/2012 | |
| JP | 2019-125299 | A | 7/2019 | |
| JP | 2019-533810 | A | 11/2019 | |
| WO | WO-2021095680 | A1 * | 5/2021 | G06N 3/045 |
| WO | WO-2021176984 | A1 * | 9/2021 | G06N 3/0499 |

OTHER PUBLICATIONS

Requirements-Driven Test Generation for Autonomous Vehicles With Machine Learning Components, IEEE, Cumhur et al., (Year: 2019).*

Deep learning algorithm for autonomous driving using GoogLeNet, IEEE, Mohammed et al., (Year: 2017).*

Autonomous driving: A comparison of machine learning techniques by means of the prediction of lane change behavior, IEEE, Urun et al., (Year: 2011).*

Liu Shikun et al: "End-To-End Multi-Task Learning With Attention", 2019 IEEE/CVF Conference On Computer Vision and Pattern Recognition (CVPR), IEEE, Jun. 15, 2019, pp. 1871-1880, XP033687308, DOI: 10.1109/CVPR.2019.00197 [retrieved on Jan. 8, 2020]; Relevance is indicated in the EESR issued on Aug. 29, 2023 in a counterpart European patent application.

Zhou Jianfeng et al: "Training Multi-task Adversarial Network for Extracting Noise-Robust Speaker Embedding", ICASSP 2019-2019 IEEE International Conference On Acoustics, Speech and Signal Processing (ICASSP), IEEE, May 12, 2019, pp. 6196-6200, XP033566375, DOI: 10.1109/ICASSP.2019.8683828 [retrieved on Apr. 4, 2019]; Relevance is indicated in the EESR issued on Aug. 29, 2023 in a counterpart European patent application.

The extended European search report (EESR) issued on Aug. 29, 2023 in a counterpart European patent application.

An English translation of the International Search Report ("ISR") of PCT/JP2021/005064 mailed on Apr. 6, 2021.

The Written Opinion("WO") of PCT/JP2021/005064 mailed on Apr. 6, 2021.

* cited by examiner

MODEL GENERATION APPARATUS, ESTIMATION APPARATUS, MODEL GENERATION METHOD, AND COMPUTER-READABLE STORAGE MEDIUM STORING A MODEL GENERATION PROGRAM

TECHNICAL FIELD

The present disclosure relates to a model generation apparatus, an estimation apparatus, a model generation method, and computer-readable storage medium storing a model generation program.

RELATED ART

In recent years, technology development in automated driving for autonomously driving vehicles has been increasing considerably. For example, Patent Document 1 proposes a system for establishing a destination of an automated driving vehicle within a local coordinate system using a trained neural network, and determining acceleration, braking, and steering of the automated driving vehicle so as to navigate the vehicle along the established route.

RELATED ART DOCUMENTS

Patent Documents

Patent Document 1: JP 2019-533810A (Translation of PCT Application)
Patent Document 2: JP 2019-125299A
Patent Document 3: JP 2012-026982A
Patent Document 4: JP 2009-083095A

SUMMARY

With a trained machine learning model constructed using machine learning, it is possible to execute tasks of estimation (including prediction) such as regression or classification on unknown data of the same type as that of given training data. Therefore, it is possible to determine an automated driving strategy based on an output from the trained machine learning model. However, the inventors of the present application found that the automated driving technology using a trained machine learning model has the following problems.

That is to say, a machine learning model includes a plurality of computation parameters for use in computation processing for executing an estimation task. For example, when a neural network is used as a machine learning model, examples of the computation parameters include weights of connections between neurons and thresholds of the neurons. The more complicated an estimation task is, the larger the number of the calculation parameters is, and elements of each dimension are connected in a more complicated manner, making it difficult to read the calculation content of the computation parameters. Also, values of the computation parameters are adjusted so that the ability of executing a desired estimation task is acquired using machine learning. There are a number of local solutions for realizing the abilities of the same level, and due to causes such as randomness of a default value, the value of each computation parameter reaches any one of the local solutions. At this time, the values of the computation parameters differ from each other depending on the reached local solution. Therefore, even if machine learning models having the same structure are trained so as to obtain the abilities of executing the same inference task, the computation contents of the same computation parameters of machine learning are not necessarily the same.

As an example, due to these causes, it is difficult to analyze the reason why the machine learning models have reached a given result. In other words, a trained machine learning model has very low explainability for the computation content. Accordingly, if automated driving based on a computation result of the machine learning model malfunctions, it is difficult to analyze the computation content of the machine learning model, and clarify the reason for the malfunction.

The problems occurring due to a machine learning model having low explainability for the computation content are not limited to the above-described problems. Furthermore, the case where some problem occurs due to a machine learning model having low explainability for the computation content is not limited to a case when trained machine learning is used in an automated driving scenario.

As another example, Patent Document 2 proposes a system for performing matching between a job applicant and a company using trained decision trees. In such a system, if a trained machine learning model has low explainability, and intentional intervention in the computation content of the machine learning model is not possible, an unexpected evaluation may be made (for example, an undesired determination standard is formed such as a disadvantageous evaluation due to gender). Also, as another example, Patent Document 3 proposes a system for performing defect inspection on an object using a trained neural network. In such a system, if a machine learning model has low explainability, it will be difficult to clarify the reason for a failed defect inspection. Furthermore, if information obtained in a specific environment (such as, for example, product type and brightness conditions) affects the execution of an estimation task, the accuracy of defect inspection of the trained machine learning model may decrease. As a result of the trained machine learning model having low explainability and intentional intervention in the computation content thereof being impossible, it will be difficult to suppress a decrease in the accuracy that results from information obtained in this specific environment. Also, as another example, Patent Document 4 proposes a system for controlling movement of a robot apparatus using a trained neural network. In such a system, if a machine learning model has low explainability, it will be difficult to clarify the reason for a malfunction of the robot apparatus.

Accordingly, as in the above-described examples, in various scenarios where a trained machine learning model is used to execute an estimation task, some sort of defects relating to this estimation task may occur, due to the machine learning model having low explainability for the computation content.

One or more embodiments has been made in view of the foregoing situations, and aims to provide a technique for generating a trained machine learning model that may have relatively high explainability for computation content.

One or more embodiments adopts the following configurations in order to solve the above-described problems.

That is to say, the model generation apparatus according to one or more embodiments includes: a data acquisition unit configured to acquire a plurality of learning data sets, each of the learning data sets being constituted by a combination of training data, first correct answer data that indicates a correct answer of a first estimation task with respect to the training data, and second correct answer data that indicates a correct answer of a second estimation task with respect to the training data, the second estimation task being different from the first estimation task; and a learning processing unit configured to execute machine learning of a learning model using the plurality of learning data sets. The learning model includes an encoder, a first estimator, and a second estimator. The encoder is configured to convert given input data into feature amounts. The first estimator is configured to accept an input from a first portion of the feature amounts, and execute the first estimation task on the input data based on the input first portion. The second estimator is configured to accept an input from a second portion of the feature amounts other than the first portion, and execute the second estimation task on the input data based on the input second portion. Also, executing the machine learning includes: a first training step of training the encoder, the first estimator, and the second estimator so that, when the training data of each of the learning data sets is given to the encoder, a result of the first estimator executing the first estimation task matches the first correct answer data, and a result of the second estimator executing the second estimation task matches the second correct answer data; and a second training step of training the encoder so that, for each of the learning data sets, a correlation between the first portion of the feature amounts and the second correct answer data is lowered, and a correlation between the second portion of the feature amounts and the first correct answer data is lowered.

In the model generation apparatus according to this configuration, machine learning of the learning model including the encoder, the first estimator, and the second estimator is executed by two training steps. In the first step, the first estimator is trained to acquire the ability of executing the first estimation task from the first portion of the feature amounts obtained from the encoder, and the second estimator is trained to acquire the ability of executing the second estimation task from the second portion of the feature amounts. According to the first training step, the first portion of the feature amounts acquired by the trained encoder includes information relating to the first estimation task, and the second portion of the feature amounts include information relating to the second estimation task. On the other hand, in the second training step, the encoder is trained so that both the correlation between the first portion of the feature amounts and the first correct answer data, and the correlation between the second portion of the feature amounts and the second correct answer data are low. According to the second training step, the first portion of the feature amounts acquired by the trained encoder is unlikely to include the information relating to the second estimation task, and the second portion of the feature amounts is unlikely to include the information relating to the first estimation task.

Therefore, the first training step and the second training step may allow the feature amounts obtained by the encoder to include information relating to the estimation tasks, making it possible to increase the exclusiveness of information between the first portion and the second portion of the feature amounts. With this, it may be possible to increase the explainability for the first portion and the second portion of the feature amounts obtained by the trained encoder. That is to say, it may be possible to ensure that the first portion of the feature amounts obtained by the trained encoder includes information that is highly relevant to the first estimation task and is less relevant to the second estimation task, and the second portion of the feature amounts include information that is less relevant to the first estimation task, and is highly relevant to the second estimation task. Accordingly, it may be possible to generate a trained machine learning model that has relatively high explainability for computation content.

As a result, it may be possible to make the execution of the first estimation task unlikely to be affected by information relating to the second estimation task, and vice versa. Note that if a scenario of executing the first estimation task is assumed as the scenario in which the trained learning model is used, the second estimation task may also be referred to as "pseudo task". Also, for example, when an error occurs in another estimation task (for example, a later-described higher-order estimation task) based on the first portion and the second portion of the feature amounts, the information included in the portions is secured as described above, and thus it may be possible to expect that the cause of the error is likely to be clarified. That is to say, it may be possible to expect that the reason why the error has occurred may be clarified with reference to the portions of the feature amounts.

In the model generation apparatus according to one or more embodiments, the learning model may further include a mask generator configured to generate a mask based on an output of the encoder. Executing the machine learning may further include a third training step of training the mask generator so that, when the training data of each of the learning data sets is given to the encoder, a result of the first estimator executing the first estimation task matches the first correct answer data. The first portion may be extracted by applying the generated mask to the feature amounts.

The ranges of the first portion and the second portion of the feature amounts may be determined in advance in a fixed manner. Note however that it is unclear that the ranges are respectively appropriate for the estimation tasks, and the range of each portion with respect to the corresponding estimation task may be redundant, or the number of dimensions may lack. If the range of each portion is redundant, data may waste. On the other hand, if the number of dimensions lacks in each portion, the accuracy of the corresponding estimation task may deteriorate. In contrast, according to this configuration, by training the mask generator, the range of the first portion of the feature amounts that includes information relating to the first estimation task may be determined so as to be suitable for the training data. With this, it may be possible to ensure the accuracy of the first estimation task, and optimize the information amount of the first portion of the feature amounts. As a result, it may be possible to expect that the efficiency of the time for calculating the first estimation task is increased. Also, it may be possible to expect that information contributing to both the first estimation task and the second estimation task may be extracted for the first portion and the second portion. As a result, it may be possible to improve the accuracy in the estimation tasks.

In the model generation apparatus according to one or more embodiments, the third training step may be executed at the same time as at least one of the first training step and the second training step. With this configuration, it may be possible to increase the efficiency in machine learning processing.

In the model generation apparatus according to one or more embodiments, executing the machine learning may further include a fourth training step of training the mask generator so that binarization of elements of the generated mask advances. With this configuration, it may be possible to facilitate the optimization of information in the first portion of the feature amounts.

In the model generation apparatus according to one or more embodiments, the learning model may further include a first adversarial estimator and a second adversarial estimator. The first adversarial estimator may be configured to accept an input from the first portion of the feature amounts, and execute the second estimation task on the input data based on the input first portion. Also, the second adversarial estimator may be configured to accept an input from the second portion of the feature amounts, and execute the first estimation task on the input data based on the input second portion. The second training step may be constituted by alternately and repeatedly executing: a first step of training the first adversarial estimator and the second adversarial estimator so that, when the training data of each of the learning data sets is given to the encoder, a result of the first adversarial estimator executing the second estimation task matches the second correct answer data, and a result of the second adversarial estimator executing the first estimation task matches the first correct answer data; and a second step of training the encoder so that, when the training data of each of the learning data sets is given to the encoder, a result of the first adversarial estimator executing the second estimation task does not match the second correct answer data, and a result of the second adversarial estimator executing the first estimation task does not match the first correct answer data. With this configuration, in the adversarial learning in the first step and the second step, it may be possible to appropriately realize training such that the correlation between the first portion of the feature amounts and the second correct answer data is lowered, and a correlation between the second portion of the feature amounts and the first correct answer data is lowered. With this, it may be possible to appropriately generate a trained machine learning model that has relatively high explainability for computation content. Note that executing the first step and the second step alternately and repeatedly may include executing the first step and the second step at the same time using a gradient inverting layer.

In the model generation apparatus according to one or more embodiments, the learning model may further include a decoder configured to decode the input data from the feature amounts. Also, executing the machine learning may further include a fifth training step of training the encoder and the decoder so that, when the training data of each of the learning data sets is given to the encoder, decoded data obtained by the decoder matches the training data. With this configuration, by training the decoder, it may be possible to ensure that input data (training data) may be reconstructed from the feature amounts. With this, in the feature amounts obtained from the encoder, it may be possible to suppress a loss of information relating to the input data. Thus, according to this configuration, since it may be possible to suppress a loss of information in the process of converting input data into the feature amounts, the generalization and robustness of the generated and trained machine learning model may be improved.

In the model generation apparatus according to one or more embodiments, the fifth training step may be executed at the same time as at least one of the first training step and the second training step. With this configuration, it may be possible to increase the efficiency in machine learning processing.

In the model generation apparatus according to the above-described aspect, the fifth training step may be executed at the same time as at least one of the first training step and the second training step. With this configuration, it is possible to increase the efficiency in machine learning processing.

In the model generation apparatus according to one or more embodiments, the second estimation task may be to estimate an identity of the training data. Noise included in the training data is a phenomenon uniquely appearing in a specific object, and thus corresponds to the identity of the training data. With this configuration, it may be possible to make information relating to the identity of the training data (that is, information that may correspond to the noise) unlikely to be included in the first portion of the feature amounts obtained by the trained encoder. With this, it may be possible to suppress the information relating to the identity from affecting the execution of the first estimation task, and realize an improvement in the generalization of the trained machine learning model (in this case, the encoder and the first estimator) that executes the first estimation task. In other words, it may be possible to expect that the estimation accuracy of the trained machine learning model with respect to object data obtained in an unknown environment is improved. Note that estimating the identity may be constituted by at least either of identification and regression of the identity. identifying the identity may be, for example, identifying the identifier, class, or the like. Also, regressing the identity may be, for example, estimating the distance relating to the identity (for example, the distance between classes based on the identifier).

In the model generation apparatus according to one or more embodiments, the second correct answer data may be configured to indicate an identifier of the training data, and estimating the identity of the training data may be to identify the identifier. With this configuration, it may be possible to appropriately set the second estimation task of identifying the identity, and improve the generalization performance of the trained machine learning model that executes the first estimation task.

In the model generation apparatus according to one or more embodiments, the identifier may be constituted by a hash value. An identifier may be individually given to each of the learning data sets. Note however that in this case, the information amount of the second correct answer data may be significant depending on the number of learning data sets. With this configuration, it may be possible to moderate an increase in the information amount of the second estimation task according to the number of learning data sets, thus making it possible to expect a reduction in the amount of calculation relating to the second estimation task, and a promotion of the efficiency of the machine learning processing.

In the model generation apparatus according to one or more embodiments, the training data of each of the learning data sets may be classified, and the identifier may be configured to represent a class to which the training data belongs. With this configuration, it may be possible to moderate an increase in the information amount of the second estimation task according to the number of learning data sets, thus making it possible to expect a reduction in the amount of calculation relating to the second estimation task, and an increase in the efficiency of the machine learning processing, compared to cases where an identifier is given to each learning data set. Note that "class" may be paraphrased as "category".

In the model generation apparatus according to one or more embodiments, each of the learning data sets may further include higher-order correct answer data that indicates a correct answer of a higher-order estimation task with respect to the training data. The learning model may further include a higher-order estimator. The higher-order estimator may be configured to accept inputs from the first portion and the second portion of the feature amounts, and execute the higher-order estimation task on the input data based on the input first portion and the input second portion. Executing the machine learning may further include a higher-order training step of training the higher-order estimator so that, when the training data of each of the learning data sets is given to the encoder, a result of the higher-order estimator executing the higher-order estimation task matches the higher-order correct answer data. With this configuration, it may be possible to construct a trained machine learning model (in this case, the encoder and the higher-order estimator) that is likely to clarify, if an error occurs in an estimation result, the reason of the error. Note that the "first estimation task" and the "second estimation task" may be paraphrased as "k-th order estimation task", and a "higher-order estimation task" may be paraphrased as "(k+1)th order estimation task" (where k is a natural number of 1 or more).

Note that in the model generation apparatus according to one or more embodiments, the numbers of set estimation tasks and portions of the feature amounts do not need to be limited to two. The numbers of estimation tasks and portions of the feature amounts may also be three or more. For example, a model generation apparatus according to one or more embodiments may include: a data acquisition unit configured to acquire a plurality of learning data sets each constituted by a combination of training data, and n pieces of correct answer data that respectively indicate correct answers of n estimation tasks with respect to the training data; and a learning processing unit configured to execute machine learning of a learning model using the plurality of learning data sets. The learning model may include an encoder and n estimators. The encoder may be configured to convert given input data into feature amounts. The feature amounts may include n portions that respectively correspond to the estimation tasks. Each of the estimators may be assigned to an estimation task, and each of the estimators may be configured to accept an input from the corresponding portion of the feature amounts, and execute the assigned estimation task on the input data based on the input portion, and executing the machine learning may include: a first training step of training the encoder and the estimators so that, when the training data of each of the learning data sets is given to the encoder, a result of each of the estimators executing the corresponding estimation task matches the corresponding correct answer data; and a second training step of training the encoder so that, for each of the learning data sets, a correlation between any of the portions of the feature amounts, and n−1 pieces of correct answer data other than the correct answer data that correspond to the estimation task corresponding to that portion of the feature amounts is lowered, and n is three or more. Moreover, in the model generation apparatus according to the above-described aspect, one of the n estimation tasks may be to estimate an identity of the training data.

The model generation apparatus according to one or more embodiments may be applied to various scenarios of generating a trained machine learning model that may be used to execute an estimation task. Examples of estimation tasks include inspecting products, determining automated driving strategy, determining operations of a robot apparatus, and estimating an object. The type of data to be used for an estimation task, and acquisition method thereof may be selected as appropriate depending on the scenario.

One or more embodiments is not limited to the aspect of the model generation apparatus. One or more embodiments may relate to an estimation apparatus configured to execute an estimation task, using a trained machine learning model generated by the above-described model generation apparatus. Note that the estimation apparatus may also be referred to as an inspection apparatus, an identification apparatus, a monitoring apparatus, an evaluation apparatus, a diagnosis apparatus, a monitoring apparatus, a prediction apparatus or the like, depending on the type of an estimation task in an application scenario.

For example, an estimation apparatus according to one or more embodiments includes: a data acquisition unit configured to acquire object data; an estimation unit configured to execute, using an encoder and a first estimator that are trained by the model generation apparatus according to one or more embodiments, a first estimation task on the acquired object data; and an output unit configured to output information relating to an execution result of the first estimation task. With this configuration, it may be possible to make execution of the first estimation task unlikely to be affected by information relating to the second estimation task. Accordingly, it may be possible to suppress execution of an estimation task using undesired determination standards. Also, it may be possible to expect that the estimation accuracy in the first estimation task is improved.

Also, for example, an estimation apparatus according to one or more embodiments includes: a data acquisition unit configured to acquire object data; an estimation unit configured to execute, using an encoder and a higher-order estimator that are trained by the model generation apparatus according to claim 12, a higher-order estimation task on the acquired object data; and an output unit configured to output information relating to an execution result of the higher-order estimation task. With this configuration, even if an error occurs in a result of a higher-order estimation task, it may be possible to expect that the reason why the error has occurred may be clarified with reference to the portions of the feature amounts.

As other aspects of the model generation apparatus and the estimation apparatus according to the above-described configurations, one or more embodiments may also relate to an information processing method for realizing all or some of the above-described configurations, a program, or a storage medium that stores such a program, and may be read by a computer or another apparatus such as a machine. Here, the storage medium that may be read by a computer or the like is a medium that stores information such as programs via an electrical, magnetic, optical, mechanical or chemical effect. Also, one or more embodiments may be an estimation system constituted by the model generation apparatus and the estimation apparatus according to any of the modes described above.

For example, a model generation method according to one or more embodiments relates to a model generation method in which a computer executes: a step of acquiring a plurality of learning data sets, each of the learning data sets being constituted by a combination of training data, first correct answer data that indicates a correct answer of a first estimation task with respect to the training data, and second correct answer data that indicates a correct answer of a second estimation task with respect to the training data, the second estimation task being different from the first estimation task; and a step of executing machine learning of a learning model using the plurality of learning data sets. The learning model includes an encoder, a first estimator, and a second estimator, the encoder is configured to convert given input data into feature amounts, the first estimator is configured to accept an input from a first portion of the feature amounts, and execute the first estimation task on the input data based on the input first portion, the second estimator is configured to accept an input from a second portion of the feature amounts other than the first portion, and execute the second estimation task on the input data based on the input second portion, and executing the machine learning includes: a first training step of training the encoder, the first estimator, and the second estimator so that, when the training data of each of the learning data sets is given to the encoder, a result of the first estimator executing the first estimation task matches the first correct answer data, and a result of the second estimator executing the second estimation task matches the second correct answer data; and a second training step of training the encoder so that, for each of the learning data sets, a correlation between the first portion of the feature amounts and the second correct answer data is lowered, and a correlation between the second portion of the feature amounts and the first correct answer data is lowered.

Also, for example, a model generation program according to one or more embodiments relates to a model generation program for causing a computer to execute: a step of acquiring a plurality of learning data sets, each of the learning data sets being constituted by a combination of training data, first correct answer data that indicates a correct answer of a first estimation task with respect to the training data, and second correct answer data that indicates a correct answer of a second estimation task with respect to the training data, the second estimation task being different from the first estimation task; and a step of executing machine learning of a learning model using the plurality of learning data sets. The learning model includes an encoder, a first estimator, and a second estimator, the encoder is configured to convert given input data into feature amounts, the first estimator is configured to accept an input from a first portion of the feature amounts, and execute the first estimation task on the input data based on the input first portion, the second estimator is configured to accept an input from a second portion of the feature amounts other than the first portion, and execute the second estimation task on the input data based on the input second portion, and executing the machine learning includes: a first training step of training the encoder, the first estimator, and the second estimator so that, when the training data of each of the learning data sets is given to the encoder, a result of the first estimator executing the first estimation task matches the first correct answer data, and a result of the second estimator executing the second estimation task matches the second correct answer data; and a second training step of training the encoder so that, for each of the learning data sets, a correlation between the first portion of the feature amounts and the second correct answer data is lowered, and a correlation between the second portion of the feature amounts and the first correct answer data is lowered.

According to one or more embodiments, it may be possible to generate a trained machine learning model that has relatively high explainability for computation content.

DETAILED DESCRIPTION

Hereinafter, an embodiment according to one aspect of the present invention (hereinafter, referred to also as "the present embodiment") will be described with reference to the drawings. However, the present embodiment described below is merely an example of the present invention in every respect. Needless to say, various improvements and modifications may be made without departing from the scope of the present invention. That is to say, to implement the present invention, a specific configuration corresponding to that implementation may also be employed as appropriate. Note that data that is used in the present embodiment is described using natural language, and more specifically, the data is defined by pseudo-language that can be recognized by a computer, such as commands, parameters, and machine language.

1. Application Example

Figure 1:
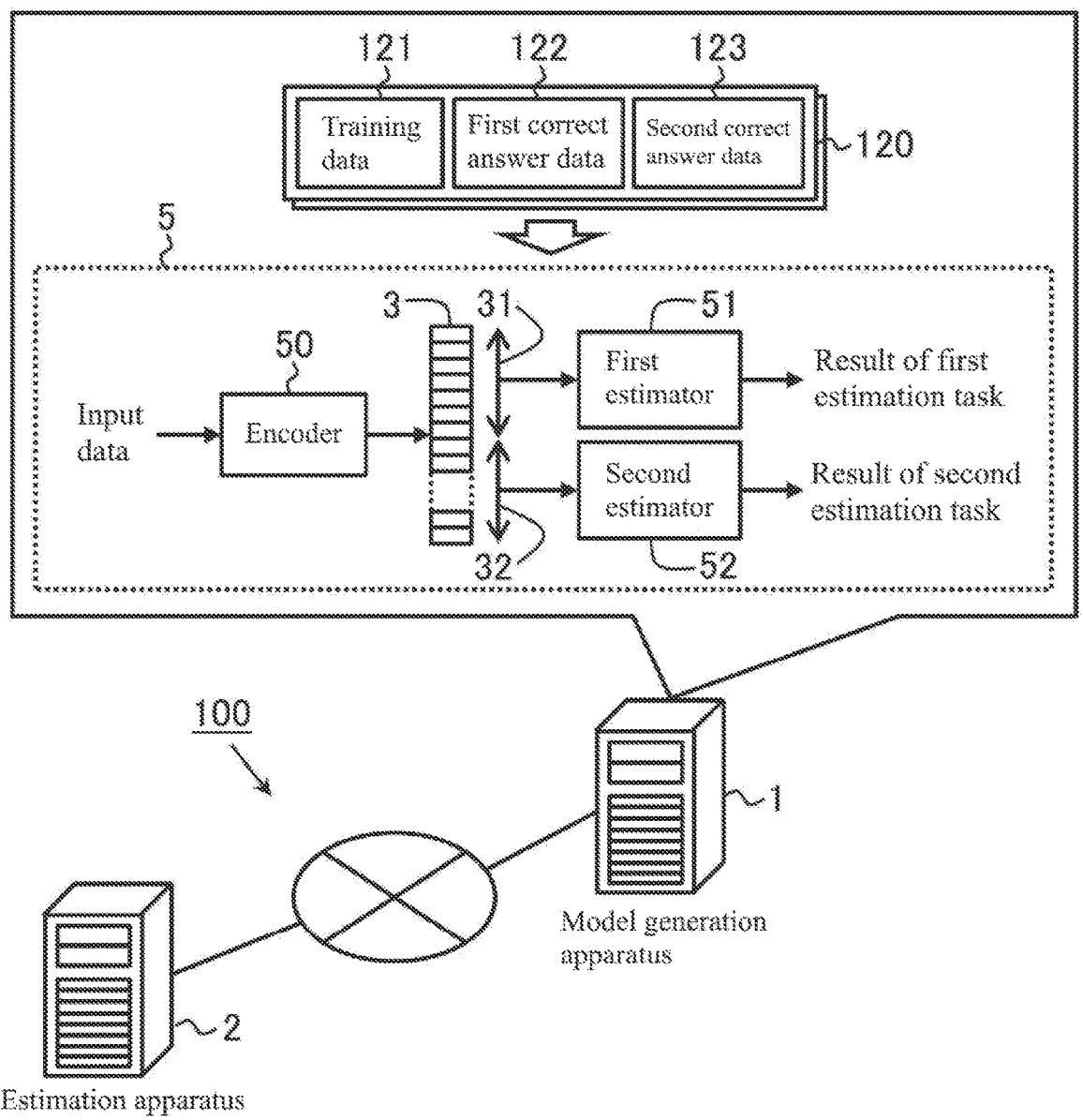
FIG. 1 is a schematic diagram illustrating an example of a scenario to which one or more embodiments is applied.

FIG. 1 schematically illustrates an example of a scenario to which the present invention is applied. An estimation system 100 according to the present embodiment includes a model generation apparatus 1 and an estimation apparatus 2.

The model generation apparatus 1 according to the present embodiment is a computer configured to execute machine learning of a learning model 5. Specifically, the model generation apparatus 1 acquires a plurality of learning data sets 120. Each of the learning data sets 120 is constituted by a combination of training data 121, first correct answer data 122, and second correct answer data 123. The first correct answer data 122 indicates a correct answer of a first estimation task with respect to the training data 121. The second correct answer data 123 indicates a correct answer of a second estimation task with respect to the training data 121, the second estimation task being different from the first estimation task.

The training data 121 is constituted by samples of a predetermined type of data. The type of data does not need to be particularly limited as long as the predetermined type of data is data that can include some sort of features so as to be subjected to an estimation task, and may be selected as appropriate depending on the embodiment. The predetermined type of data may be, for example, image data, sound data, numerical data, text data, or measured data obtained by various types of sensors. The predetermined type of data may be configured by a plurality of different types of data. The predetermined type of data may be, for example, sensing data obtained by observing a suitable target using a sensor. The sensor may be, for example, an image sensor (camera), an infrared sensor, a sound sensor (microphone), an ultrasonic sensor, an optical sensor, a pressure sensor, an air pressure sensor, a temperature sensor, or the like. Also, the sensor may be, for example, an environment sensor, a vital sensor, a medical inspection apparatus, an in-vehicle sensor, a home security sensor, or the like. Examples of environment sensors include a barometer, a thermometer, a hygrometer, a sound pressure meter, a sound sensor, an ultraviolet sensor, an illuminometer, an ombrometer, and a gas sensor. Examples of vital sensors include a blood-pressure meter, a pulse monitor, a pulse rate meter, an electrocardiographic monitor, an electromyograph, a clinical thermometer, an electric skin resistance meter, a micro-wave sensor, an electroencephalograph, a magnetoencephalography, an activity meter, a blood sugar meter, an electro-oculography meter, and an eyeball movement meter. Examples of medical inspection apparatuses include a computed tomography (CT) apparatus, and a magnetic resonance imaging (MRI) apparatus. Examples of in-vehicle sensors include an image sensor, a light detection and ranging (Lidar) sensor, a millimeter-wave radar, an ultrasonic sensor, and an acceleration sensor. Examples of home security sensors include an image sensor, an infrared sensor, an activation level (sound) sensor, a gas (such as $co_2$) sensor, an electric current sensor, and a smart meter (sensor for measuring power consumption of home electrical appliances, illuminations, or the like).

The first estimation task and the second estimation task may be selected as appropriate from all tasks for estimating some sort of feature included in data, so as to differ from each other. The feature may be any feature relating to a component (element) that can directly or indirectly appear in data. "Directly appearing" means that a feature appears in data itself, such as a feature appearing in image data. "Indirectly appearing" means that a feature is derived from data such as a feature being estimated based on image data. "Estimating" may be at least either of performing classification and regression. "Performing regression" may include specifying a range within data such as a bounding box. "Estimating" may also include, for example, executing approval processing such as detection or determination based on at least either of a result of the classification and the regression. "Estimating" may also include forecasting some sort of element in the future, and correspondingly, the feature may relate to a prediction of the future. "Estimation" may be paraphrased as "inference".

In the present embodiment, an estimation task that is executed in an application scenario is set as the "first estimation task". Therefore, the second estimation task according to the present embodiment may be referred to as a "quasi-task". Note however that the relationship between the estimation tasks and the application scenario is not limited to this example. The second estimation task may be set as the estimation task that is executed in the application scenario. In addition to the first estimation task and the second estimation task, another estimation task may be set that is executed in a scenario in which a trained machine learning model is used. In this case, the first estimation task and the second estimation task may be set as prior learning tasks. The first correct answer data 122 and the second correct answer data 123 may also be paraphrased as "teacher signal", "label", or the like. The data format of the correct answer data (122, 123) may be determined as appropriate depending on the estimation task, the machine learning method, the configuration of the learning model 5, and the like.

The model generation apparatus 1 according to the present embodiment uses the plurality of acquired learning data sets 120 to execute machine learning of the learning model 5. The learning model 5 according to the present embodiment includes an encoder 50, a first estimator 51, and a second estimator 52. The encoder 50 is configured to convert given input data into feature amounts 3. In other words, the encoder 50 is configured to accept an input of data, and output the output values that correspond to a result obtained by converting the input data into the feature amounts 3. The first estimator 51 is configured to accept an input from a first portion 31 of the feature amounts 3, and execute, based on the input first portion 31, the first estimation task on the input data (in other words, the first estimator 51 outputs the output values that correspond to a result obtained by executing the first estimation task). The second estimator 52 is configured to accept an input from a second portion 32 of the feature amounts 3 other than the first portion 31, and execute, based on the input second portion 32, the second estimation task on the input data (in other words, the second estimator 52 outputs the output values that correspond to a result obtained by executing the second estimation task).

The data format of the feature amounts 3 and the ranges of the portions (31, 32) does not need to be particularly limited, and may be determined as appropriate depending on the embodiment. In the present embodiment, as will be described later, the ranges of the portions (31, 32) are adaptively determined using machine learning. Note that in the example of FIG. 1, the portions (31, 32) constitute the entire range of the feature amounts 3. However, the ranges of the portions (31, 32) do not need to be limited to this example. The feature amounts 3 may also include a range that is not used as the portions (31, 32). Also, in the example of FIG. 1, the upper portion of the feature amounts 3 is allocated to the first portion 31, and the lower portion of the feature amounts 3 is allocated to the second portion 32.

However, such allocation is made only for convenience, and the allocation of the portions (31, 32) does not need to be limited to this example, and may be determined as appropriate depending on the embodiment.

Also, the formats of the output values of the estimators (51, 52) may be determined as appropriate so as to directly or indirectly represent execution results of the corresponding estimation tasks. "Indirectly indicating execution results of the corresponding estimation tasks" means that the execution result is achieved by some sort of information processing such as threshold determination or table reference. The encoder 50 and the estimators (51, 52) are each configured by a machine learning model including a plurality of computation parameters. The type of the machine learning model does not need to be particularly limited as long as it can execute computation, and may be selected as appropriate depending on the embodiment. In the present embodiment, as described later, neural networks are used as the encoder 50 and the estimators (51, 52).

Executing machine learning according to the present embodiment includes a first training step and a second training step. In the first training step, the model generation apparatus 1 trains the encoder 50, the first estimator 51, and the second estimator 52 so that when the training data 121 of each of the learning data sets 120 is given to the encoder 50, a result obtained by the first estimator 51 executing the first estimation task matches the first correct answer data 122, and a result obtained by the second estimator 52 executing the second estimation task matches the second correct answer data 123. Also, in the second training step, the model generation apparatus 1 trains the encoder 50 so that when the training data 121 of each of the learning data sets 120 is given to the encoder 50, the correlation between the first portion 31 of the feature amounts 3 and the second correct answer data 123 is lowered, and the correlation between the second portion 32 of the feature amounts 3 and the first correct answer data 122 is lowered. "Low correlation" between two values means that the two values are ideally not correlated, and may be paraphrased as a state in which the two values are statistically independent from each other, the state in which the distance between the distributions of the values is minimized, or the state in which even by giving one of the values, it is difficult (impossible) to increase the estimation accuracy of the other value. The training steps may be performed in an appropriate order. With this configuration, it is possible to generate a trained encoder 50 and a trained first estimator 51 that can be used to execute the first estimation task. Note that the model generation apparatus 1 according to the present embodiment may also be paraphrased simply by "generation apparatus", "learning apparatus", or the like. "Trained" may be paraphrased as "learned" or "having finished learning".

On the other hand, the estimation apparatus 2 according to the present embodiment is a computer configured to execute a predetermined estimation task on a predetermined type of object data, using the trained machine learning model generated by the model generation apparatus 1. The estimation apparatus 2 is an example of an application apparatus that uses a trained machine learning model. In the present embodiment, the estimation apparatus 2 uses the trained encoder 50 and the trained first estimator 51 to execute the first estimation task on the object data. Specifically, the estimation apparatus 2 acquires object data to be subjected to an estimation task. Then, the estimation apparatus 2 executes the first estimation task on the acquired object data, using the trained encoder 50 and first estimator 51 generated by the model generation apparatus 1. Also, the estimation apparatus 2 outputs information relating to an execution result of the first estimation task. The estimation apparatus 2 may also be referred to as an inspection apparatus, an identification apparatus, a monitoring apparatus, an evaluation apparatus, a prediction apparatus or the like depending on the estimation task to be executed.

As described above, in the present embodiment, the machine learning includes two training steps. As a result of the first training step, the portions (31, 32) of the feature amounts 3 obtained by the trained encoder 50 include information relating to the estimation tasks, so that the estimation tasks are successfully executed for each learning data set 120. On the other hand, as a result of the second training step, the first portion 31 of the feature amounts 3 obtained by the trained encoder 50 is unlikely to include information relating to the second estimation task, and the second portion 32 is unlikely to include information relating to the first estimation task.

Therefore, according to the present embodiment, the first training step and the second training step allow the feature amounts 3 obtained by the encoder 50 to include information relating to the respective estimation tasks, making it possible to increase the exclusiveness of information between the first portion 31 and the second portion 32 of the feature amounts 3. With this, it is possible to increase the explainability for the first portion 31 and the second portion 32 of the feature amounts 3 obtained by the trained encoder 50. That is to say, it is possible to ensure that the first portion 31 of the feature amounts 3 obtained by the trained encoder 50 includes information that is highly relevant to the first estimation task and is less relevant to the second estimation task, and the second portion 32 includes information that is less relevant to the first estimation task, and is highly relevant to the second estimation task. Thus, according to the present embodiment, it is possible to generate a trained machine learning model that has relatively high explainability for computation content.

Note that, in the example shown in FIG. 1, the model generation apparatus 1 and the estimation apparatus 2 are connected to each other via a network. The type of the network may be selected as appropriate from the Internet, a wireless communication network, a mobile communication network, a telephone network, a dedicated network, and the like. Note however that the method for exchanging data between the model generation apparatus 1 and the estimation apparatus 2 does not need to be limited to this example, and may be selected as appropriate depending on the embodiment. For example, data may be exchanged between the model generation apparatus 1 and the estimation apparatus 2, using a storage medium.

Also, in the example shown in FIG. 1, the model generation apparatus 1 and the estimation apparatus 2 are constituted by separate computers. However, the configuration of the estimation system 100 according to the present embodiment does not need to be limited to this example, and may be selected as appropriate depending on the embodiment. For example, the model generation apparatus 1 and the estimation apparatus 2 may be constituted by one computer. Also, for example, at least one of the model generation apparatus 1 and the estimation apparatus 2 may also be constituted by a plurality of computers.

2. Configuration Example

Hardware Configuration
Model Generation Apparatus

Figure 2:
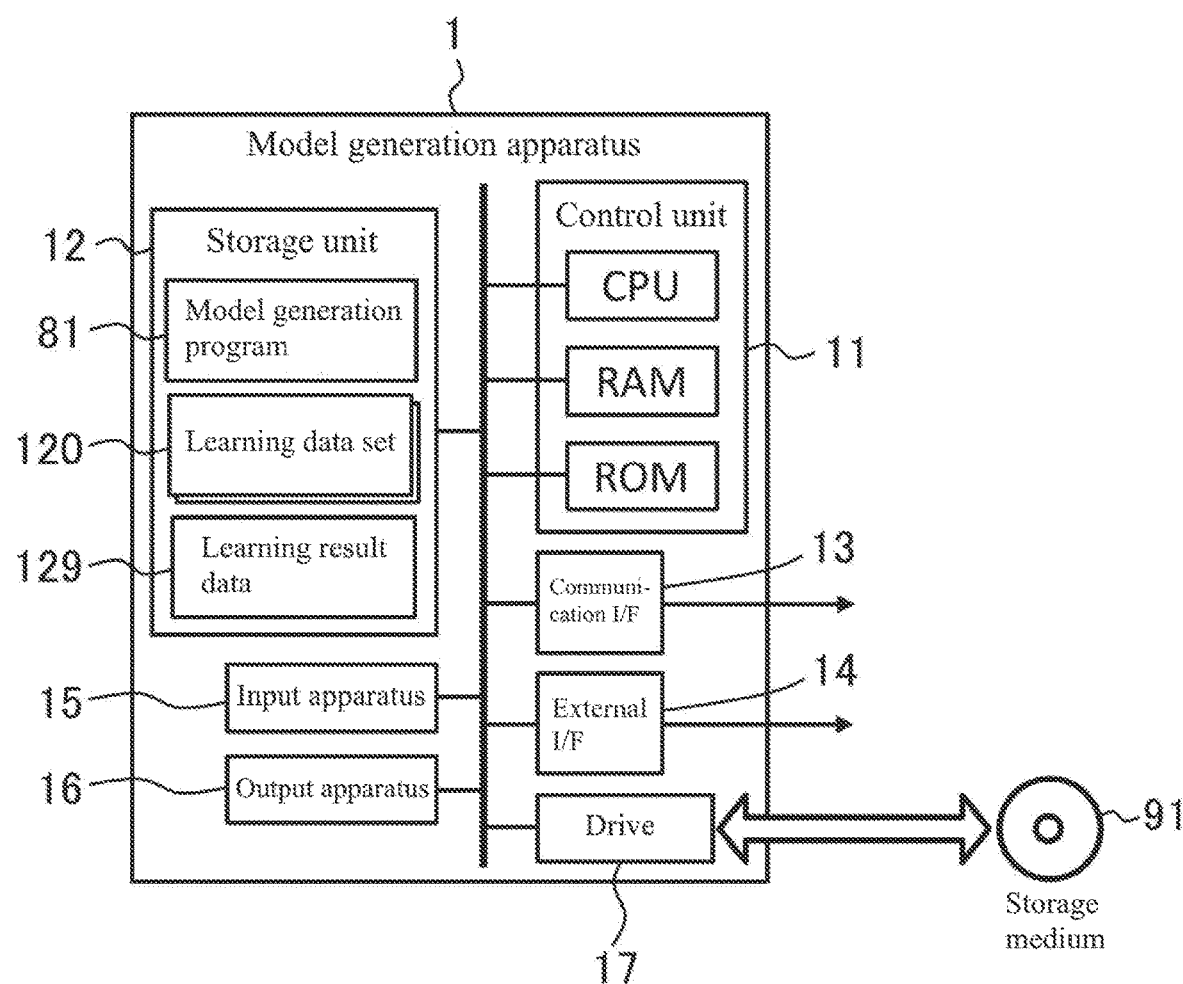
FIG. 2 is a schematic diagram illustrating an example of a hardware configuration of a model generation apparatus according to one or more embodiments.

FIG. 2 schematically illustrates an example of a hardware configuration of the model generation apparatus 1 according to the present embodiment. As shown in FIG. 2, the model generation apparatus 1 according to the present embodiment is a computer in which a control unit 11, a storage unit 12, a communication interface 13, an external interface 14, an input apparatus 15, an output apparatus 16, and a drive 17 are electrically connected to each other. Note that in FIG. 2, the communication interface and the external interface are respectively denoted as "communication I/F" and "external I/F". The same notation is used also in FIG. 3 below.

The control unit 11 includes a CPU (Central Processing Unit), which is a hardware processor, a RAM (Random Access Memory), ROM (Read Only Memory), and the like, and is configured to execute information processing based on a program and various types of data. CPU is an example of a processor resource. The storage unit 12 is an example of a memory resource, and is constituted by a hard disk drive, a solid-state drive, or the like. In the present embodiment, the storage unit 12 stores various types of information such as a model generation program 81, a plurality of learning data sets 120, a plurality of pieces of learning result data 129.

The model generation program 81 is a program for causing the model generation apparatus 1 to execute the later-described information processing (FIGS. 7 and 8) relating to machine learning of the learning model 5. The model generation program 81 includes a series of commands for this information processing. The model generation program 81 may also be referred to simply as "generation program", "learning program", or the like. The learning data sets 120 are used for machine learning of the learning model 5. The learning result data 129 indicates information relating to results of machine learning (in the present embodiment, the trained encoder 50 and first estimator 51 generated by machine learning). In the present embodiment, the learning result data 129 is generated as a result of execution of the model generation program 81.

The communication interface 13 is a wired LAN (Local Area Network) module, a wireless LAN module, or the like, and is an interface for performing wired or wireless communication via a network. The model generation apparatus 1 may also perform data communication with another information processing apparatus via the network by using the communication interface 13. The external interface 14 is a USB (Universal Serial Bus) port, a dedicated port, or the like, and is an interface for connecting to an external apparatus. The type and the number of external interfaces 14 may be appropriately selected depending on the type and number of connected external apparatuses. When data such as training data 121 is acquired by a sensor, the model generation apparatus 1 may also be connected to an object sensor via at least one of the communication interface 13 and the external interface 14.

The input apparatus 15 is an apparatus for performing input, such as a mouse or a keyboard. Also, the output apparatus 16 is an apparatus for performing output, such as a display or a speaker. An operator such as a user can operate the model generation apparatus 1 by using the input apparatus 15 and the output apparatus 16.

The drive 17 is a CD drive, a DVD drive, or the like, and is a drive apparatus for reading various types of information such as programs stored in a storage medium 91. The storage medium 91 is a medium that stores information such as programs via an electrical, magnetic, optical, mechanical or chemical effect such that the stored information, such as the programs, can be read by an apparatus or a machine such as a computer. At least either the model generation program 81 or the plurality of learning data sets 120 may be stored in the storage medium 91. The model generation apparatus 1 may acquire at least either the model generation program 81 or the plurality of learning data sets 120 from the storage medium 91. Note that, in FIG. 2, a disk-type storage medium such as a CD or a DVD is illustrated as an example of the storage medium 91. However, the type of the storage medium 91 does not need to be limited to the disk type, and the storage medium 91 may be a medium other than a disk-type medium. Examples of storage media other than disk-type media include a semiconductor memory such as a flash memory. The type of the drive 17 may be selected as appropriate depending on the type of the storage medium 91.

Note that, regarding the specific hardware configuration of the model generation apparatus 1, constituent elements can be omitted, replaced, and added as appropriate depending on the embodiment. For example, the processor resource may also include a plurality of hardware processors. The hardware processors may also be constituted by a microprocessor, an FPGA (field-programmable gate array), a DSP (digital signal processor), and the like. The storage unit 12 may be constituted by the RAM and ROM included in the control unit 11. At least one of the communication interface 13, the external interface 14, the input apparatus 15, the output apparatus 16, and the drive 17 may be omitted. The model generation apparatus 1 may also be constituted by a plurality of computers. In this case, the hardware configuration of the computers may be the same, or may not be the same. Also, the model generation apparatus 1 may be an information processing apparatus specifically designed for the service to be provided, or may also be a general-purpose server apparatus, a PC (Personal Computer), or the like.

Estimation Apparatus

Figure 3:
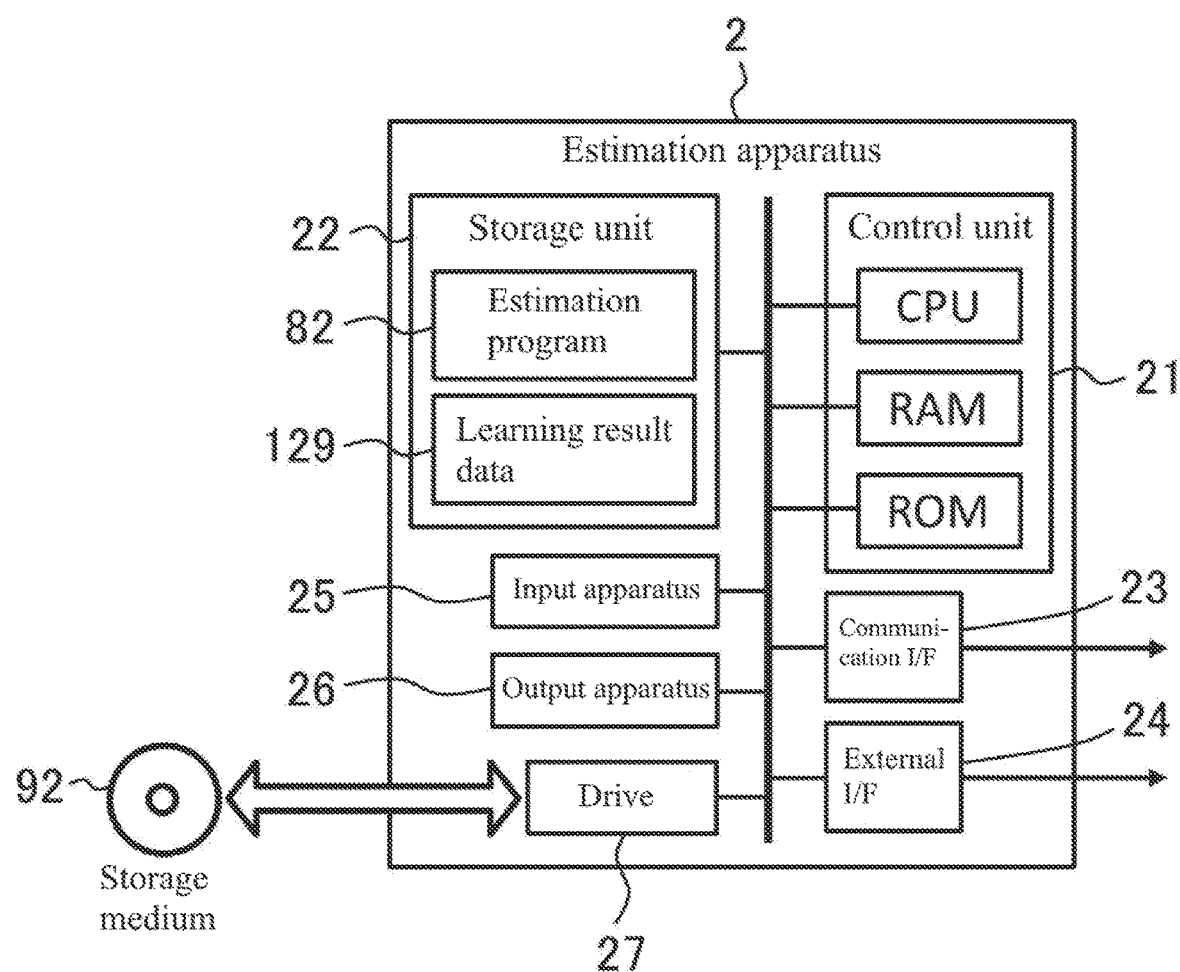
FIG. 3 is a schematic diagram illustrating an example of a hardware configuration of an estimation apparatus according to one or more embodiments.

FIG. 3 schematically illustrates an example of a hardware configuration of the estimation apparatus 2 according to the present embodiment. As shown in FIG. 3, the estimation apparatus 2 according to the present embodiment is a computer in which a control unit 21, a storage unit 22, a communication interface 23, an external interface 24, an input apparatus 25, an output apparatus 26, and a drive 27 are electrically connected to each other.

The elements from the control unit 21 to the drive 27 of the estimation apparatus 2 and the storage medium 92 may have the same configurations as elements from the control unit 11 to the drive 17 of the model generation apparatus 1 and the storage medium 91. The control unit 21 includes a CPU, which is a hardware processor, a RAM, a ROM, and the like, and is configured to execute various types of information processing based on a program and data. The storage unit 22 is constituted by a hard disk drive, a solid-state drive, or the like. The storage unit 22 stores various types of information such as an estimation program 82 and the learning result data 129.

The estimation program 82 is a program for causing the estimation apparatus 2 to execute later-described information processing (FIG. 9) to execute a predetermined estimation task on a predetermined type of data, using a trained machine learning model (in the present embodiment, the encoder 50 and the first estimator 51). The estimation program 82 includes a series of commands for this information processing. At least one of the estimation program 81, and the learning result data 129 may be stored in the storage medium 92. Also, the estimation apparatus 2 may acquire at least one of the estimation program 81 and the learning result data 129 from the storage medium 92.

Note that, regarding the specific hardware configuration of the estimation apparatus 2, constituent elements can be omitted, replaced, and added as appropriate depending on the embodiment. For example, the processor resource of the estimation apparatus 2 may also include a plurality of hardware processors. The hardware processors may also be constituted by a microprocessor, an FPGA, a DSP, and the like. The storage unit 22 may be constituted by the RAM and ROM included in the control unit 21. At least one of the communication interface 23, the external interface 24, the input apparatus 25, the output apparatus 26, and the drive 27 may be omitted. The estimation apparatus 2 may also be constituted by a plurality of computers. In this case, the hardware configuration of the computers may be the same, or may not be the same. Also, the estimation apparatus 2 may be an information processing apparatus specifically designed for the service to be provided a general-purpose server apparatus, or may also be a general-purpose PC, or the like.

Software Configuration

Model Generation Apparatus

Figure 4:
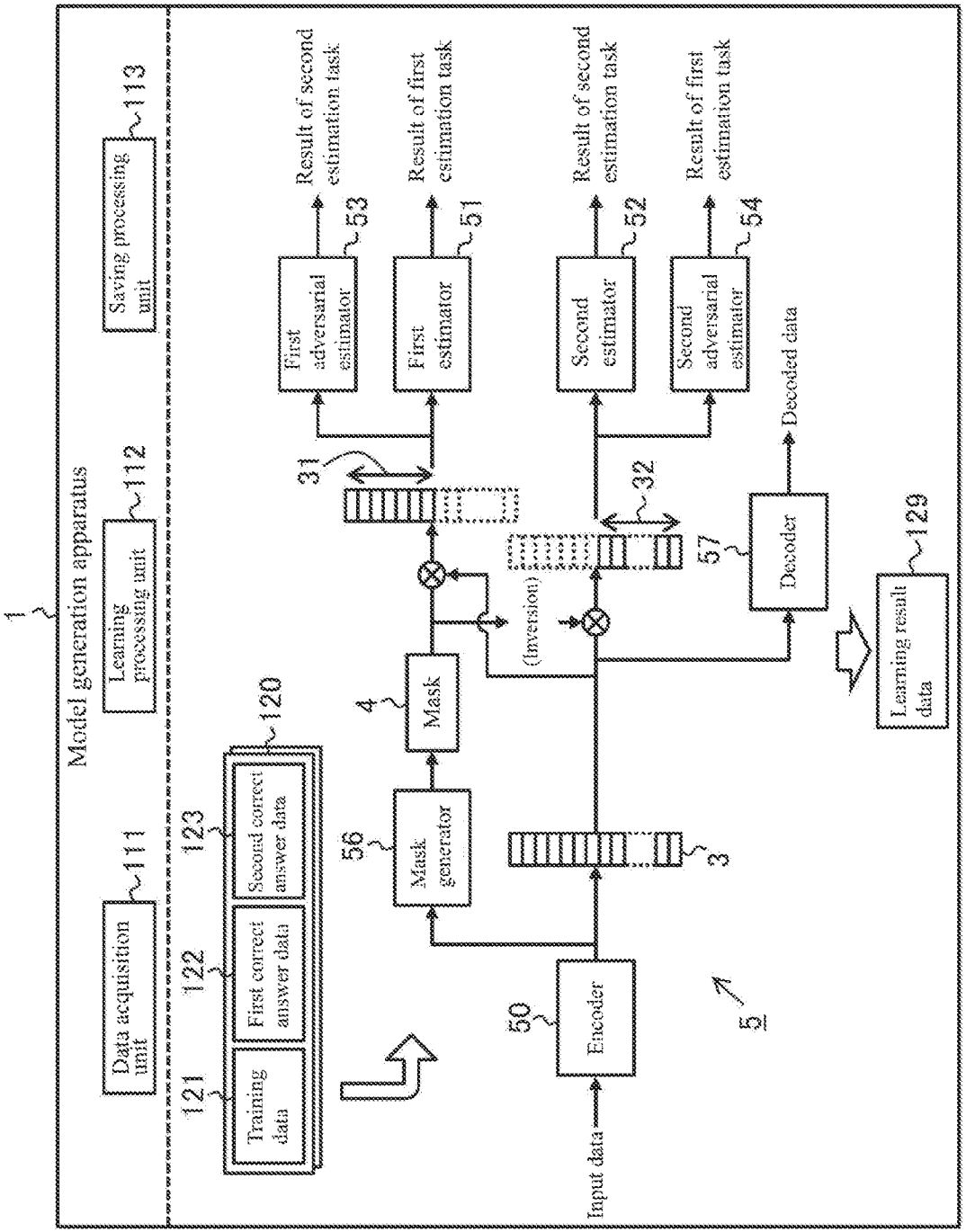
FIG. 4 is a schematic diagram illustrating an example of a software configuration of a model generation apparatus according to one or more embodiments.
Figure 5A:
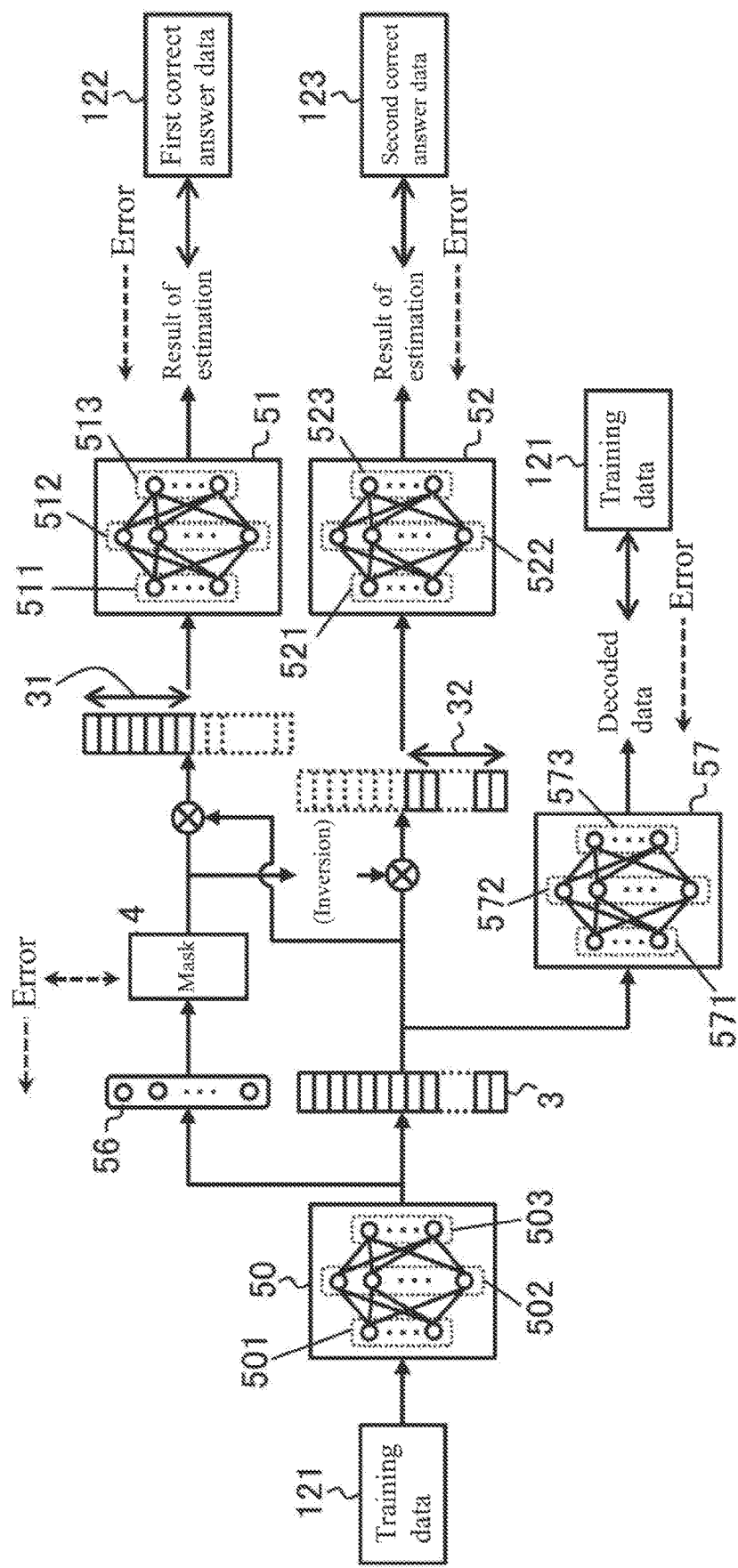
FIG. 5A is a schematic diagram illustrating an example of a procedure of machine learning by a model generation apparatus according to one or more embodiments.
Figure 5B:
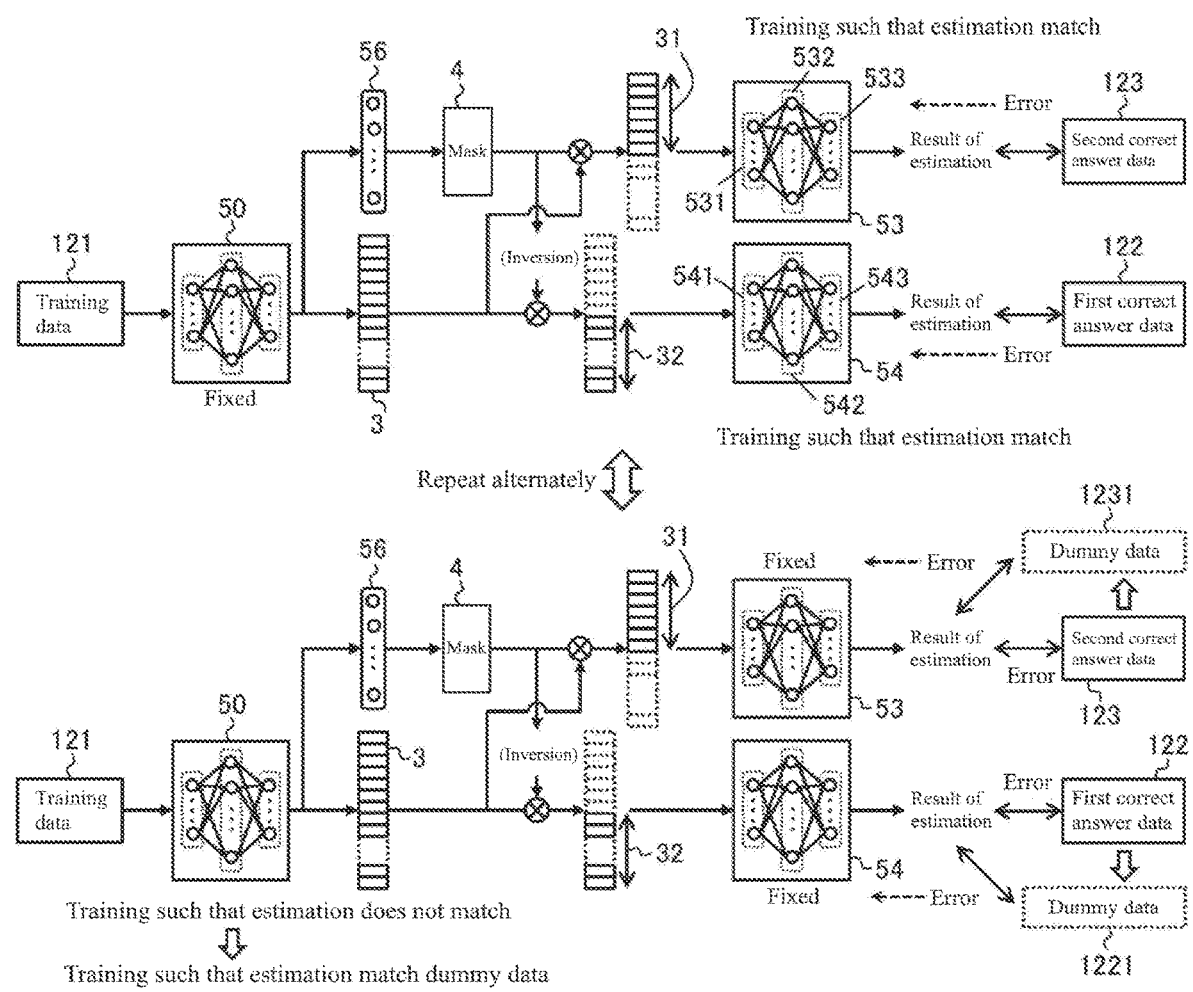
FIG. 5B is a schematic diagram illustrating an example of a procedure of a machine learning by a model generation apparatus according to one or more embodiments.

FIG. 4 schematically illustrate an example of a software configuration of the model generation apparatus 1 according to the present embodiment. FIGS. 5A and 5B illustrate an example of a procedure of machine learning of the model generation apparatus 1 according to the embodiment.

The control unit 11 of the model generation apparatus 1 deploys the model generation program 81 stored in the storage unit 12 to the RAM. Then, the control unit 11 controls the constituent elements by the CPU interpreting and executing the commands included in the model generation program 81 deployed to the RAM. With this, as shown in FIG. 4, the model generation apparatus 1 according to the present embodiment operates as a computer including a data acquisition unit 111, a learning processing unit 112, and a saving processing unit 113, as software modules. That is to say, in the present embodiment, the software modules of the model generation apparatus 1 are realized by the control unit 11 (CPU).

The data acquisition unit 111 acquires the plurality of learning data sets 120 each constituted by a combination of training data 121, first correct answer data 122, and second correct answer data 123. The learning processing unit 112 uses the plurality of acquired learning data sets 120 to execute machine learning of the learning model 5. As described above, the learning model 5 includes the encoder 50, the first estimator 51, and the second estimator 52. In the present embodiment, the learning model 5 further includes, in addition to these, a first adversarial estimator 53, a second adversarial estimator 54, a mask generator 56, and a decoder 57.

The first adversarial estimator 53 corresponds to the first estimator 51 for the second training step, and is configured to execute an estimation task other than the estimation task allocated to the first estimator 51. Similarly, the second adversarial estimator 54 corresponds to the second estimator 52 for the second training step, and is configured to execute an estimation task other than the estimation task allocated to the second estimator 52. In the present embodiment, the first adversarial estimator 53 is configured to accept an input from the first portion 31 of the feature amounts 3, and execute, based on the input first portion 31, the second estimation task on the input data (in other words, the first adversarial estimator 53 outputs output values that correspond to a result obtained by executing the second estimation task). The second adversarial estimator 54 is configured to accept an input from the second portion 32 of the feature amounts 3, and execute, based on the input second portion 32, the first estimation task on the input data (in other words, the second adversarial estimator 54 outputs output values that correspond to a result obtained by executing the first estimation task). The mask generator 56 is configured to generate a mask 4 based on an output from the encoder 50 (in other words, the mask generator 56 accepts the output from the encoder 50 as an input, and outputs output values that correspond to a result of generating the mask 4 based on the output that was input from the encoder 50). The mask 4 is used to extract the first portion 31. That is to say, the first portion 31 is extracted by applying the generated mask 4 to the feature amounts 3. The configuration of the mask 4 does not need to be particularly limited as long as it can be used to extract the first portion 31, and may be selected as appropriate depending on the embodiment. The second portion 32 may be extracted as appropriate from the remaining portion of the feature amounts 3. As an example of the present embodiment, the mask 4 is constituted by elements having the same number of dimensions (dimensionality) as that of the feature amounts 3, and the value of each element of the mask 4 may be configured to indicate whether or not to let the corresponding element of the feature amounts 3 serving as the first portion 31 to pass therethrough (for example, "1" or "0"). Also, the second portion 32 may be the whole remaining portion of the feature amounts 3 other than the first portion 31. In this case, as shown in FIG. 4, the first portion 31 may be calculated by multiplying the generated mask 4 by the feature amounts 3 (in other words, the first portion 31 may be a product of the mask 4 and the feature amounts 3). On the other hand, the second portion 32 may be calculated by inverting the values of the elements of the generated mask 4 and multiplying the obtained inverted mask by the feature amounts 3. Accordingly, extracting the first portion 31 may be configured by disabling the elements of the portion other than the first portion 31 (for example, replacing the elements by "0"). The same applies to the extraction of the second portion 32.

The decoder 57 is configured to decode the input data from the feature amounts 3 (in other words, the decoder 57 accepts the feature amounts 3 as an input, and outputs output values that correspond to decoded data obtained by decoding the input data from the input feature amounts 3).

As described in FIGS. 5A and 5B, executing machine learning includes a first training step and a second training step. As shown in FIG. 5B, the second training step according to the present embodiment is constituted by a first step of training the first adversarial estimator 53 and the second adversarial estimator 54, and a second step of training the encoder 50, the first step and the second step being executed repeatedly. In the first step, the first adversarial estimator 53 and the second adversarial estimator 54 are trained so that when the training data 121 of each of the learning data sets 120 is given to the encoder 50, a result of the first adversarial estimator 53 executing the second estimation task matches the second correct answer data 123, and a result of the second adversarial estimator 54 executing the first estimation task matches the first correct answer data 122. During this first step, the computation parameters of the encoder 50 are fixed. On the other hand, in the second step, the encoder 50 is trained so that when the training data 121 of each of the learning data sets 120 is given to the encoder 50, a result of the first adversarial estimator 53 executing the second estimation task does not match the second correct answer data 123, and a result of the second adversarial estimator 54 executing the first estimation task does not match the first correct answer data 122. During this second step, the computation parameters of the first adversarial estimator 53 and the second adversarial estimator 54 are fixed.

According to the first step, the first adversarial estimator 53 acquires the ability of executing the second estimation task from the first portion 31 of the feature amounts 3 obtained from the encoder 50, and the second adversarial estimator 54 acquires the ability of executing the first estimation task from the second portion 32. On the other hand, according to the second step, the encoder 50 is trained so as to acquire the ability of converting the input data into feature amounts 3 such that the second estimation task of the first adversarial estimator 53 based on the first portion 31 fails, and the first estimation task of the second adversarial estimator 54 based on the second portion 32 fails. By executing the first step and the second step alternately and repeatedly, it is possible to ensure that the first portion 31 obtained by the encoder 50 is unlikely to include the components relating to the second estimation task, and the second portion 32 is unlikely to include the components relating to the first estimation task, so that the estimation tasks performed by the adversarial estimators (53, 54) fail in response to an improvement in the estimation properties of the adversarial estimators (53, 54). Accordingly, the encoder 50 can be trained so that the correlation between the first portion 31 of the feature amounts 3 and the second correct answer data 123 is lowered, and the correlation between the second portion 32 of the feature amounts 3 and the first correct answer data 122 is lowered.

Note that, as an example of the second step, the learning processing unit 112 may acquire, for each of the learning data sets 120, dummy data 1221 that corresponds to the first correct answer data 122, and is constituted by values different from the corresponding first correct answer data 122. The learning processing unit 112 may acquire, for each of the learning data sets 120, dummy data 1231 that corresponds to the second correct answer data 123, and is constituted by values different from the corresponding second correct answer data 123. In this case, performing training in such a manner that a result of the first adversarial estimator 53 executing the second estimation task does not match the second correct answer data 123 may be configured by performing training in such a manner that a result of the first adversarial estimator 53 executing the second estimation task matches the dummy data 1231. Performing training in such a manner that a result of the second adversarial estimator 54 executing the first estimation task does not match the first correct answer data 122 may be configured by performing training in such a manner that a result of the second adversarial estimator 54 executing the first estimation task matches the dummy data 1221. Note however that the method for training the encoder 50 so that results of the execution of the estimation tasks do not match the correct answer data (122, 123) does not need to be limited to this example, and may be selected as appropriate depending on the embodiment.

In the present embodiment, executing machine learning further includes, in addition to the description above, a third training step, a fourth training step, and a fifth training step. As shown in FIG. 5A, in the third training step, the mask generator 56 is trained so that when the training data 121 of each of the learning data sets 120 is given to the encoder 50, a result of the first estimator 51 executing the first estimation task matches the first correct answer data 122. In the fourth training step, the mask generator 56 is trained so that binarization of the elements of the generated mask 4 advances. In the fifth training step, the encoder 50 and the decoder 57 are trained so that when the training data 121 of each of the learning data sets 120 is given to the encoder 50, the decoded data obtained by the decoder 57 matches the training data 121. At least one of the third to fifth training steps may be executed at the same time as at least one of the first training step and the second training step.

By the execution of the above-described training steps, the trained learning model 5 is generated. As shown in FIG. 4, the saving processing unit 113 generates information relating to the trained learning model 5 as the learning result data 129. Then, the saving processing unit 113 saves the generated learning result data 129 in a predetermined storage area. Note that the learning result data 129 does not need to include information relating to constituent elements of the trained learning model 5 that are not used in the application scenario. For example, in the present embodiment, the trained second estimator 52, the first adversarial estimator 53, the second adversarial estimator 54, and the decoder 57 are not used in the estimation apparatus 2. Thus, the learning result data 129 may include or may not include information relating to them. 30

Configuration of Machine Learning Model

An appropriate model that can execute machine learning may be used as each of the encoder 50, the first estimator 51, the second estimator 52, the first adversarial estimator 53, the second adversarial estimator 54, the mask generator 56, and the decoder 57. As shown in FIGS. 5A and 5B, in the present 5 embodiment, each of the encoder 50, the first estimator 51, the second estimator 52, the first adversarial estimator 53, the second adversarial estimator 54, and the decoder 57 is constituted by a multilayer fully connected neural network. Each of the encoder 50, the first estimator 51, the second estimator 52, the first adversarial estimator 53, the second adversarial estimator 54, and the decoder 57 includes an input layer (501, 511, 521, 531, 541, 571), an intermediate (hidden) layer (502, 512, 522, 532, 542, 572), and an output layer (503, 513, 523, 533, 543, 573). On the other hand, the mask generator 56 is constituted by a single layer neural network.

Note, however, that the structure of each of the components does not need to be limited to this example, and may be selected as appropriate depending on the embodiment. For example, the number of intermediate layer (502, 512, 522, 532, 542, 572) is not limited to one, and may be two or more. Alternatively, at least one of the encoder 50, the first estimator 51, the second estimator 52, the first adversarial estimator 53, the second adversarial estimator 54, and the decoder 57 may be constituted by a neural network with at most two layers (that is to say, the intermediate layer may be omitted). The mask generator 56 may be constituted by a neural network with two or more layers. That is to say, the number of layers constituting each neural network does not need to be particularly limited, and May be determined as appropriate depending on the embodiment. Furthermore, in a combination of at least two of the encoder 50, the first estimator 51, the second estimator 52, the first adversarial estimator 53, the second adversarial estimator 54, the mask generator 56, and the decoder 57, the structures of the constituent components may be at least partially the same, or may be different from each other. Also, in the examples of FIGS. 5A and 5B, the neural networks are separated, but two or more constituent components to be processed sequentially may be constituted by an integrated neural network.

Each of the layer (501 to 503, 511 to 513, 521 to 523, 531 to 533, 541 to 543, and 571 to 573) and the layer of the mask generator 56 includes one or more neurons (nodes). The number of neurons (nodes) included in each layer does not need to be particularly limited, and may be selected as appropriate depending on the embodiment. Neurons in adjacent layers are appropriately connected to each other. In the example shown in FIGS. 5A and 5B, each neuron is connected to all neurons in adjacent layers. However, the connections of neurons are not limited to this example, and may be set as appropriate depending on the embodiment.

A weight (connection load) is set for each connection. A threshold value is set for each neuron, and basically, the output of each neuron is determined based on whether or not the sum of products of an input and a weight exceeds a threshold value. The threshold values may be expressed as activating functions. In this case, the output of each neuron is determined by inputting the sum of products of an input and a weight to the activating function and executing a calculation of the activating function. The type of the activating function does not need to be particularly limited, and may be selected as appropriate depending on the embodiment. The weights of the connections between neurons included in the layers and the threshold values of the neurons are examples of the computation parameters that are to be used in computation processing.

Values of the computation parameters of the constituent components (such as the encoder 50) of the learning model 5 are adjusted in each of the training steps of the machine learning. Specifically, as shown in FIG. 5A, in the first training step, the learning processing unit 112 inputs the training data 121 to the input layer 501 of the encoder 50, executes forward propagation computation processing, and acquires the output values that correspond to execution results of the estimation tasks from the output layers (513, 523) of the estimators (51, 52). "Forward propagation computation processing" is to determine firing of the neurons included in the layers in order from the input side. The learning processing unit 112 adjusts the values of the computation parameters of the encoder 50 and the first estimator 51 so that an error between the output values acquired from the first estimator 51 and the first correct answer data 122 is small. Also, the learning processing unit 112 adjusts the values of the computation parameters of the encoder 50 and the second estimator 52 so that an error between the output values acquired from the second estimator 52 and the second correct answer data 123 is small.

As shown in FIG. 5B, in the first step of the second training step, the learning processing unit 112 inputs the training data 121 to the input layer 501 of the encoder 50, executes forward propagation computation processing, and acquires the output values that correspond to execution results of the estimation tasks from the output layers (533, 543) of the adversarial estimators (53, 54). The learning processing unit 112 fixes the values of the computation parameters of the encoder 50, and adjusts the values of the computation parameters of the first adversarial estimator 53 so that an error between the output values acquired from the first adversarial estimator 53 and the second correct answer data 123 is small. Also, the learning processing unit 112 adjusts the values of the computation parameters of the second adversarial estimator 54 so that an error between the output values acquired from the second estimator 54 and the first correct answer data 122 is small.

In the second step of the second training step, the learning processing unit 112 inputs the training data 121 to the input layer 501 of the encoder 50, executes forward propagation computation processing, and acquires the output values that correspond to execution results of the estimation tasks from the output layers (533, 543) of the adversarial estimators (53, 54). The learning processing unit 112 fixes the values of the computation parameters of the adversarial estimators (53, 54), and adjusts the values of the computation parameters of the encoder 50 so that an error between the output values acquired from the first adversarial estimator 53 and the second correct answer data 123 is large, and an error between the output values acquired from the second adversarial estimator 54 and the first correct answer data 122 is large. As an example, the learning processing unit 112 adjusts the values of the computation parameters of the encoder 50 so that an error between the output values acquired from the first adversarial estimator 53 and the dummy data 1231 is small, and an error between the output values acquired from the second adversarial estimator 54 and the dummy data 1221 is small.

As shown in FIG. 5A, in the third training step, the learning processing unit 112 inputs, for each of the learning data sets 120, the training data 121 to the input layer 501 of the encoder 50, executes forward propagation computation processing, and acquires an output value from the output layer 513 of the first estimator 51. The learning processing unit 112 adjusts values of the computation parameters of the mask generator 56 so that an error between the output values acquired from the first estimator 51 and the first correct answer data 123 is small. This third training step may be executed as part of the first training step.

In the fourth training step, the learning processing unit 112 inputs, for each of the learning data sets 120, the training data 121 to the input layer 501 of the encoder 50, executes forward propagation computation processing, and acquires the output values that correspond to the generated mask 4 from the mask generator 56. The learning processing unit 112 calculates an error in the output value obtained from the mask generator 56, using an indicator whose value increases the less the binarization of elements advances. The learning processing unit 112 adjusts the values of the computation parameters of the mask generator 56 so that the calculated error is small. This fourth training step may be executed within another training step.

In the fifth training step, the learning processing unit 112 inputs, for each of the learning data sets 120, the training data 121 to the input layer 501 of the encoder 50, executes forward propagation computation processing, and acquires the output values that correspond to the generated decoded data from the output layer 573 of the decoder 57. The learning processing unit 112 adjusts the values of the computation parameters of the encoder 50 and the decoder 57 so that an error between the output values acquired from the decoder 57 and the training data 121 is small. The calculation of errors and the adjustment of values of the computation parameters in the training steps may be executed at the same time to the extent possible.

The saving processing unit 113 generates information indicating the structures of the constituent components of the trained learning model 5 constituted by the machine learning, and the values of the computation parameters, as the learning result data 129. The structures may be specified by, for example, the number of layers from the input layer to the output layer in the neural network, the types of the layers, the number of neurons included in each layer, the connection relationship of neurons of adjacent layers, or the like. If the structures of models of a system are common, the information relating to the structures may be omitted from the learning result data 129. Also, information relating to constituent components that are not used in the application scenario may be omitted from the learning result data 129.

The saving processing unit 113 saves the generated learning result data 129 in a predetermined storage area.

Estimation Apparatus

Figure 6:
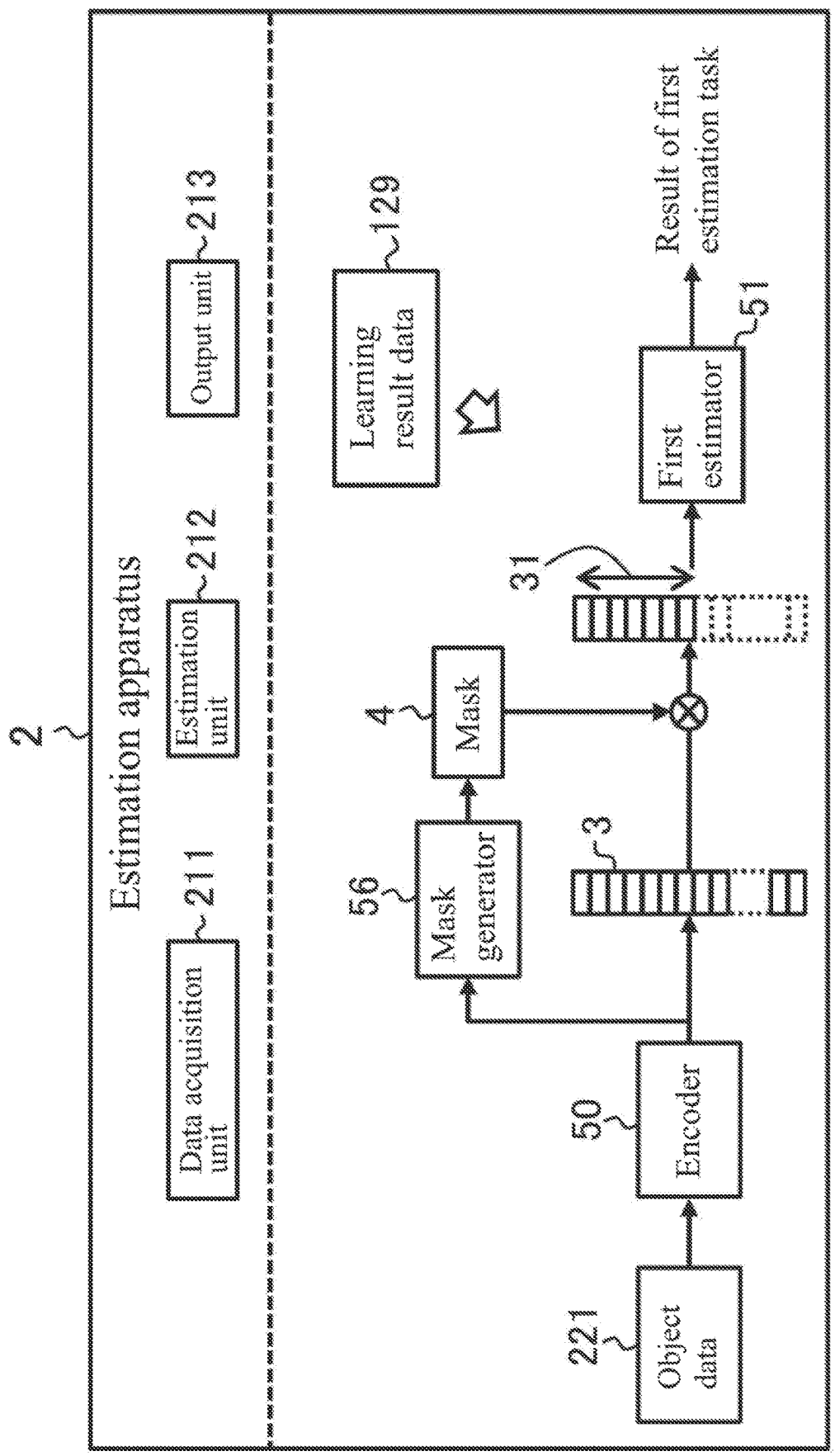
FIG. 6 is a schematic diagram illustrating an example of a software configuration of an estimation apparatus according to one or more embodiments.

FIG. 6 schematically illustrates an example of a software configuration of the estimation apparatus 2 according to the present embodiment. The control unit 21 of the estimation apparatus 2 deploys the estimation program 82 stored in the storage unit 22 to the RAM. Then, the control unit 21 controls the constituent elements by the CPU interpreting and executing the commands included in the estimation program 82 deployed to the RAM. With this, as shown in FIG. 6, the estimation apparatus 2 according to the present embodiment operates as a computer including a data acquisition unit 211, an estimation unit 212, and an output unit 213, as software modules. That is to say, in the present embodiment, the software modules of the estimation apparatus 2 are realized by the control unit 21 (CPU), as in the model generation apparatus 1.

The data acquisition unit 211 acquires object data 221 to be subjected to an estimation task. The estimation apparatus 212 executes the estimation task on the acquired object data 221, using the trained machine learning model generated by the model generation apparatus 1. In the present embodiment, by storing the learning result data 129, the estimation unit 212 includes the trained encoder 50, mask generator 56, and first estimator 51 that are generated by the model generation apparatus 1. The estimation apparatus 212 uses the trained encoder 50, mask generator 56, and first estimator 51 to execute the first estimation task on the acquired object data 221. The estimation unit 212 may also be referred to as an inspection unit, an identification unit, a monitoring unit, an estimation unit, a prediction unit or the like according to the estimation task to be executed. The output unit 213 outputs information relating to an execution result of the first estimation task.

Other Considerations

The software modules of the model generation apparatus 1 and the estimation apparatus 2 will be described in detail in later-described operation examples. Note that the present embodiment describes an example in which the software modules of the model generation apparatus 1 and the estimation apparatus 2 are realized by a general-purpose CPU. However, some or all of the above-described software modules may be realized by at least one dedicated processor. For example, if the training data 121 and the object data 221 include image data, some or all of the software modules may be processed by a graphics processing unit. Also, regarding the software configurations of the model generation apparatus 1 and the estimation apparatus 2, software modules may also be omitted, replaced, and added as appropriate depending on the embodiment.

3. Operation Examples

Model Generation Apparatus

Figure 7:
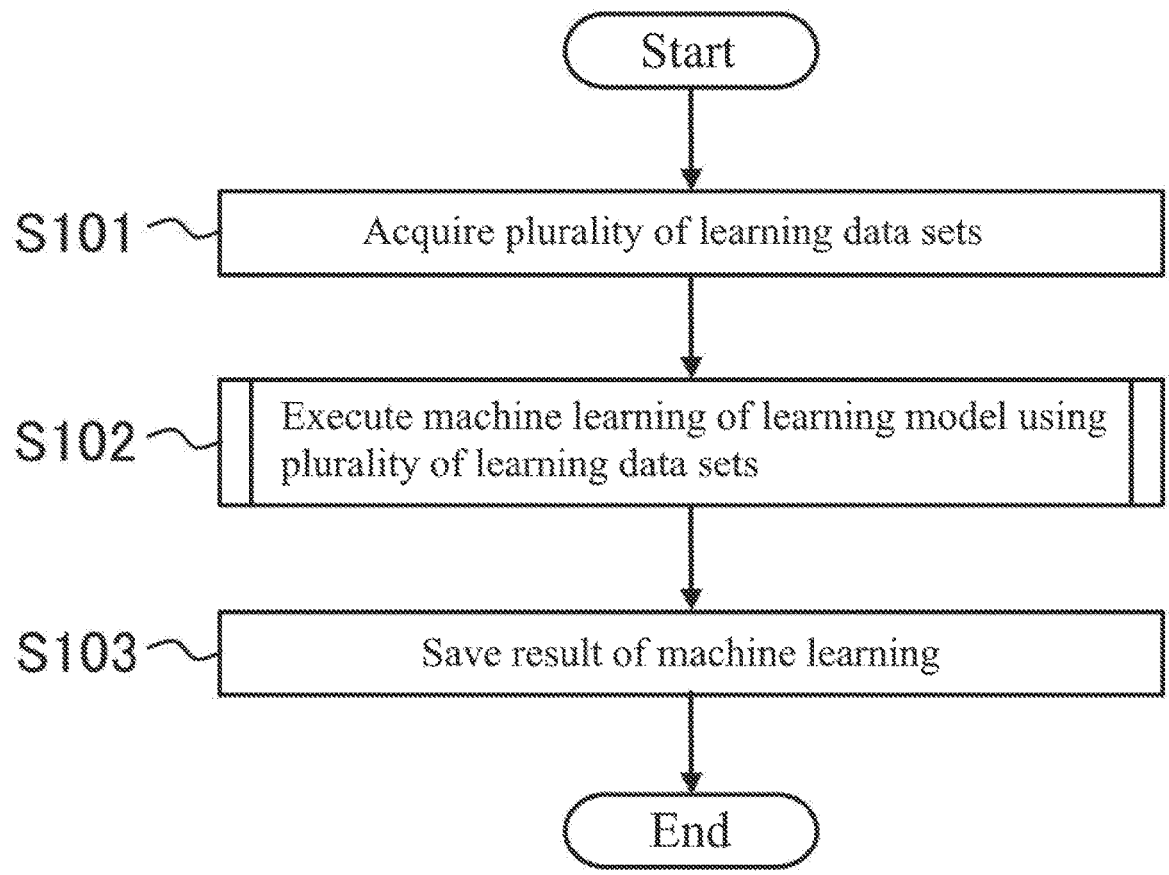
FIG. 7 is a diagram illustrating an example of a procedure of a model generation apparatus according to one or more embodiments.

FIG. 7 is a flowchart illustrating an example of a procedure of the model generation apparatus 1 according to the present embodiment. The procedure described below is an example of the "model generation method" of the present invention. Note however that the procedures described below are merely examples, and the steps may be modified to the extent possible. Moreover, in the procedure described below, steps may also be omitted, replaced, and added as appropriate depending on the embodiment.

Step S101

In step S101, the control unit 11 operates as the data acquisition unit 111, and acquires the plurality of learning data sets 120 each constituted by a combination of the training data 121, the first correct answer data 122, and the second correct answer data 123.

The learning data sets 120 may be generated as appropriate. For example, in the actual space or a virtual space, a predetermined type of data samples to be subjected to the estimation task may be acquired as the training data 121. The method for acquiring the samples may be appropriately selected. As an example, if a predetermined type of data is sensing data, the training data 121 can be acquired by observing an object using a sensor under various conditions. The object to be observed may be selected as appropriate depending on the estimation task to be learned. Information indicating the correct answers of the first estimation task and the second estimation task with respect to the obtained training data 121 is associated with the obtained training data 121, the information serving as the first correct answer data 122 and the second correct answer data 123.

The first estimation task and the second estimation task may be selected as appropriate depending on the embodiment. For example, each of the first estimation task and the second estimation task may be selected as appropriate from estimation tasks to be executed in an application scenario, or estimation tasks relating thereto. In the present embodiment, an estimation task that is executed in an application scenario is selected as the "first estimation task". On the other hand, the second estimation task may be selected as appropriate from estimation tasks other than the first estimation task. If the estimation task that is executed in the application scenario is not to estimate the identity of input data, the second estimation task may be to estimate the identity of input data. In a learning scenario, the input data is the training data 121, and in an application scenario, the input data is the object data 221. Estimating an identity may be to perform at least one of identification and regression of the identity. The identification of an identity may be, for example, to identify the identifier, class, or the like. Also, regression of an identity may be, for example, to estimate the distance relating to the identity (for example, the distance between classes based on the identifier).

As an example, the second correct answer data 123 may be configured to indicate an identifier of the training data 121. In this case, estimating the identity of the training data 121 may be to identify the identifier. The identifier may be constituted by an individual discrimination number given to each piece of training data 121. In this case, the identifier of the training data 121 may be given as appropriate in accordance with a predetermined rule such as the acquisition order, the acquisition time, or randomly.

Alternatively, the training data 121 of each of the learning data sets 120 may be classified, and the identifier may be configured to represent the class to which the training data 121 belongs. "Class" may also be paraphrased as "category". The classification method does not need to be particularly limited, and may be selected as appropriate depending on the embodiment. For example, the training data 121 may be classified by a predetermined clustering method, an allocation method in accordance with a predetermined rule (such as randomly), or the like. Also, for example, the training data 121 may be classified in accordance with a random rule such that the training data 121 is aligned as appropriate, and predetermined chunks of data from the top are allocated to the same group.

Alternatively, the identifier may be constituted by a hash value. A well-known method may be adopted as the method for calculating a hash value. A hash value may be calculated based on the training data 121 or the above-described individual discrimination number. Note that the hash value (that is, the second correct answer data 123) is preferably calculated so as not to match the correct answer of the first estimation task (that is, the first correct answer data 122 included in the same learning data set 120). This method does not need to be particularly limited, and may be selected as appropriate depending on the embodiment. As an example of the method, a configuration is also possible in which the learning data sets 120 having the same correct answer indicated by the first correct answer data 122 are allocated to the same group, a hash value is calculated for each group, and the calculated hash value is used as the second correct answer data 123. Moreover, a configuration is also possible in which a hash value is calculated from values including the correct answer indicated by the first correct answer data 122 in a pre-fixed portion, a partial hash value is derived by excluding the corresponding fixed portion from the calculated hash value, and the derived partial hash value is used as the second correct answer data 123.

With this, it is possible to generate the learning data sets 120. The learning data set 120 may be generated automatically by operation of a computer, or may be generated manually by at least partially including an operation of an operator. Also, the learning data sets 120 may be generated by the model generation apparatus 1 or a computer other than the model generation apparatus 1. When the learning data sets 120 are generated by the model generation apparatus 1, the control unit 11 acquires the plurality of learning data sets 120 by executing the above-described series of generation processing automatically, or manually using an operation of an operator via the input apparatus 15. On the other hand, when the learning data sets 120 are generated by another computer, the control unit 11 acquires the plurality of learning data sets 120 generated by the other computer via, for example, a network, the storage medium 91, or the like. Some of the learning data sets 120 may be generated by the model generation apparatus 1, and the remaining learning data sets 120 may be generated by one or more other computers.

The number of learning data sets 120 may be selected as appropriate. Upon acquisition of the plurality of learning data sets 120, the control unit 11 moves the processing to next step S102.

Step S102

In step S102, the control unit 11 operates as the learning processing unit 112, and uses the acquired plurality of learning data sets 120 to execute machine learning of the learning model 5.

Figure 8:
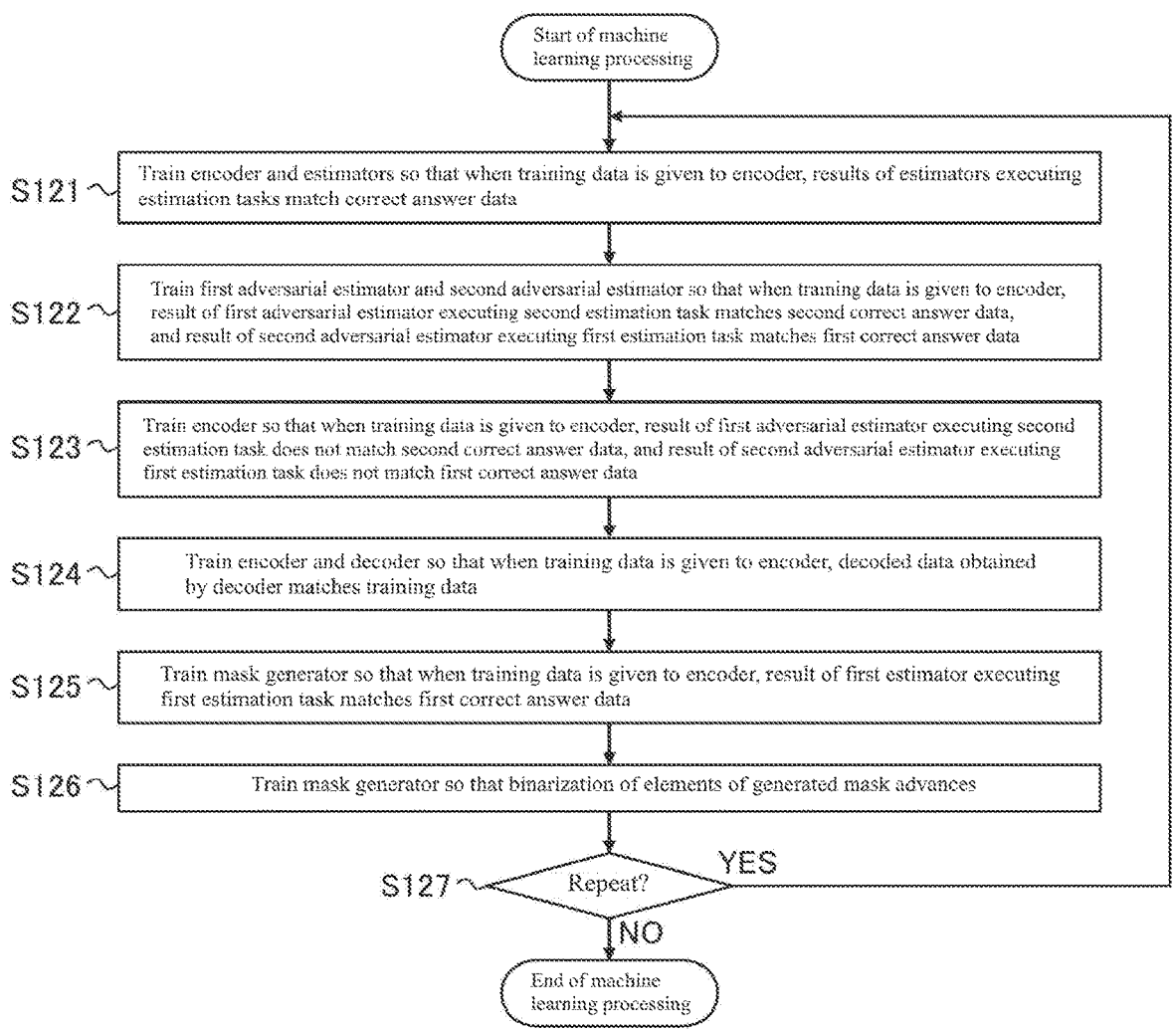
FIG. 8 is a diagram illustrating an example of a procedure of machine learning of a model generation apparatus according to one or more embodiments.

FIG. 8 is a flowchart illustrating an example of a procedure of a sub routine relating to the machine learning in step S102 on the learning model 5 according to the present embodiment. The processing of step S102 according to the present embodiment includes the following steps S121 to S127. Note however that the procedure described below is merely an example, and the processing may be modified to the extent possible. Also, in the procedure described below, steps May also be omitted, replaced, and added as appropriate depending on the embodiment.

Note that neural networks that constitute the constituent components (in the present embodiment, the encoder 50, the first estimator 51, the second estimator 52, the first adversarial estimator 53, the second adversarial estimator 54, the mask generator 56, and the decoder 57) of the learning model 5 to be subjected to machine learning may be prepared as appropriate. The structures (such as the number of layers, the number of neurons included in each layer, and connection relationship between neurons of adjacent layers) of the constituent components, default values of weights of connections between neurons, and default values of thresholds of neurons may be given by a template, or may be given by input of an operator. Also, when relearning is performed, the control unit 11 may prepare the constituent components of the learning model 5 based on the learning result data obtained by past machine learning.

Step S121

In step S121, the control unit 11 trains the encoder 50, the first estimator 51, and the second estimator 52 so that when the training data 121 of each of the learning data sets 120 is given to the encoder 50, a result of the first estimator 51 executing the first estimation task matches the first correct answer data 122, and a result of the second estimator 52 executing the second estimation task matches the second correct answer data 123. Step S121 is an example of the above-described first training step. A batch gradient descent method, a stochastic gradient descent method, a mini batch gradient descent method, or the like may be used for training processing of the machine learning. The same will apply to training processing in the later-described steps S122 to S126.

As an example of the training processing, first, the control unit 11 inputs the training data 121 of each of the learning data sets 120 to the input layer 501 of the encoder 50, and executes forward propagation computation processing of the encoder 50, the mask generator 56, the first estimator 51, and the second estimator 52. In the process of this computation processing, an output of the encoder 50 is input to the mask generator 56. The output of the encoder 50 may be feature amounts 3 (that is, an output of the output layer 503), or an intermediate result of the computation of the encoder 50 (for example, a computation result of a layer prior to the output layer 503). That is to say, the mask generator 56 may be connected to the output layer 503 of the encoder 50, or to the intermediate layer 502. The control unit 11 acquires the output values that correspond to the feature amounts 3 from the output layer 503 of the encoder 50, by the computation processing until the encoder 50. Also, the control unit 11 acquires the output values that correspond to the generated mask 4 from the mask generator 56, by the computation processing until the mask generator 56. In the process of the computation processing, the control unit 11 uses the obtained mask 4 to extract the first portion 31 and the second portion 32 from the feature amounts 3. Then, the control unit 11 inputs the first portion 31 of the feature amounts 3 to the input layer 511 of the first estimator 51, inputs the second portion 32 to the input layer 521 of the second estimator 52, and executes the forward propagation computation processing of the estimators (51, 52). With this, the control unit 11 obtains the output values that corresponds to results of the estimation tasks from the output layers (513, 523) of the estimators (51, 52).

The control unit 11 calculates, with respect to the each of the learning data sets 120, a first error between the output value obtained from the first estimator 51 and the first correct answer data 122. Similarly, the control unit 11 calculates, with respect to each of the learning data sets 120, a second error between the output value obtained from the second estimator 52 and the second correct answer data 123. A loss function may be used for the calculation of errors (losses). A loss function is a function that evaluates a difference (that is, a degree of difference) between an output of a machine learning model and a correct answer, and the larger the difference value between the output value and the correct answer (desired value) is, the larger the value of the error calculated by the loss function. The type of the loss function that is used to calculate errors does not need to be particularly limited, and may be selected as appropriate depending on the embodiment. As the loss function, a well-known loss function such as e.g., a mean squared error or a cross-entropy error may be used. Note that if the second estimation task is to perform regression of the identity (for example, to estimate the distance between classes based on an identifier), the second error may be calculated by a loss function used in measurement learning such as a triplet loss.

Using back propagation, the control unit 11 calculates, based on the gradient of the calculated first error, errors of values of computation parameters (such as the weights of connections of neurons, and thresholds of neurons) of the first estimator 51 and the encoder 50. Similarly, the control unit 11 calculates, based on a gradient of the calculated second error, errors of values of computation parameters of the second estimator 52 and the encoder. The control unit 11 updates values of the computation parameters of the encoder 50, the first estimator 51, and the second estimator 52 based on the calculated errors. The degree of update of the values of the computation parameters may be adjusted based on a learning rate. The learning rate may be given by designation of an operator or may be given as a set value in a program.

Using the above-described series of update processing, the control unit 11 adjusts the values of the computation parameters of the encoder 50, the first estimator 51, and the second estimator 52 so that the sum of the calculated errors is small. For example, the control unit 11 may repeatedly adjust the values of the computation parameters using the above-described series of update processing, until a predetermined condition is satisfied such as execution being made a predetermined number of times, or the sum of the calculated errors being reduced to the threshold or less. With this, the control unit 11 can train the encoder 50 and the estimators (51, 52) so that the result of the execution of the estimation tasks obtained from the estimators (51, 52) by giving the training data 121 of each of the learning data sets 120 to the encoder 50 matches the respective correct answer data (122, 123). Upon completion of the training processing of step S121, the control unit 11 moves the processing to the next step S122.

Note that in the process of the back propagation of the gradient of the errors in the training processing, the control unit 11 may further calculate an error in values of the computation parameters of the mask generator 56, and may update the values of the computation parameters of the mask generator 56 based on the calculated errors. With this, the control unit 11 may train the mask generator 56, together with the training of the encoder 50, the first estimator 51, and the second estimator 52.

Step S122

In step S122, the control unit 11 trains the first adversarial estimator 53 and the second adversarial estimator 54 so that when the training data 121 of each of the learning data sets 120 is given to the encoder 50, a result of the first adversarial estimator 53 executing the second estimation task matches the second correct answer data 123, and a result of the second adversarial estimator 54 executing the first estimation task matches the first correct answer data 122. Step S122 is an example of the first step of the second training step.

As an example of the training processing, first, the control unit 11 inputs the training data 121 of each of the learning data sets 120 to the input layer 501 of the encoder 50, and executes forward propagation computation processing of the encoder 50, the mask generator 56, the first adversarial estimator 53, and the second adversarial estimator 54. The forward propagation computation processing may be executed similar to above-described step S121, except for the first estimator 51 being replaced by the first adversarial estimator 53, and the second estimator 52 being replaced by the second adversarial estimator 54. With this, the control unit 11 obtains output values that correspond to the execution result of the second estimation task from the output layer 533 of the first adversarial estimator 53, and obtains output values that correspond to the execution result of the first estimation task from the output layer 543 of the second adversarial estimator 54.

Then, the control unit 11 calculates, with respect to each of the learning data sets 120, a third error between the output value obtained from the first adversarial estimator 53 in the above-described computation processing and the second correct answer data 123. Similarly, the control unit 11 calculates a fourth error between the output value obtained from the second adversarial estimator 54 and the first correct answer data 122. The loss functions for use in calculating the errors may be selected as appropriate, similar to the step S121. The control unit 11 back-propagates the gradient of the calculated third error from the output side of the first adversarial estimator 53 to the input side by error back propagation, so as to calculate errors of values of the computation parameters of the first adversarial estimator 53. Similarly, the control unit 11 back-propagates the gradient of the calculated fourth error from the output side of the second adversarial estimator 54 to the input side by error back propagation, so as to calculate errors of values of the computation parameters of the second adversarial estimator 54. Then, the control unit 11 updates the values of the computation parameters of the adversarial estimators (53, 54) based on the calculated errors. The degree of update of the values of the computation parameters may be adjusted based on a learning rate.

The control unit 11 fixes the values of the computation parameters of the encoder 50 and the mask generator 56, and adjusts, using the above-described series of update processing, the values of the computation parameters of the adversarial estimators (53, 54) so that the sum of the calculated errors is small. Similar to step S121, the control unit 11 may repeatedly adjust the values of the computation parameters of the adversarial estimators (53, 54) using the above-described series of update processing, until a predetermined condition is satisfied. With this, the control unit 11 can train the adversarial estimators (53, 54) so that the execution results of the estimation tasks obtained from the adversarial estimators (53, 54) by giving the training data 121 of each of the learning data sets 120 to the encoder 50 match the respective correct answer data (123, 122). Upon completion of the training processing of the adversarial estimators (53, 54), the control unit 11 moves the processing to the next step S123.

Step S123

In step S123, the control unit 11 trains the encoder 50 so that, when the training data 121 of each of the learning data sets 120 is given to the encoder 50, a result of the first adversarial estimator 53 executing the second estimation task does not match the second correct answer data 123, and a result of the second adversarial estimator 54 executing the first estimation task does not match the first correct answer data 122. Step S123 is an example of the second step of the second training step.

As described above, in this training processing, dummy data (1221, 1231) may be used. That is to say, the control unit 11 may train the encoder 50 so that a result of the first adversarial estimator 53 executing the second estimation task matches the dummy data 1231, and a result of the second adversarial estimator 54 executing the first estimation task matches the dummy data 1221.

The dummy data (1221, 1231) may be acquired as appropriate so as to correspond to the correct answer data (122, 123) of the learning data sets 120. As an example, the dummy data (1221, 1231) of the object learning data set may be constituted by the correct answer data (122, 123) of another learning data set different from the object learning data set. The other learning data set may be selected as appropriate depending on the embodiment. As an example of the selecting method, the other learning data set may be selected from the plurality of learning data sets 120 by a mechanical method such as randomly. As yet another example, the correspondence relationship between the correct answer data (122, 123) and the training data 121 of each of the learning data sets 120 may be shifted to an appropriate direction. With this, the correct answer data (122, 123) of the other learning data set allocated to the object learning data set may be used as the corresponding dummy data (1221, 1231). As yet another example, a configuration is also possible in which one learning data set is selected from the plurality of learning data sets 120 using an appropriate method, and the correct answer data (122, 123) of the selected learning data set is used as the respective dummy data (1221, 1231). According to this method, it is possible to suppress the amount of calculation for generating the respective pieces of dummy data (1221, 1231), making it possible to reduce the processing cost in step S123.

Note that the method for generating the dummy data (1221, 1231) does not need to be limited to this example, and may be selected as appropriate depending on the embodiment. As another method example, the control unit 11 may generate the dummy data (1221, 1231) by inverting the values of the correct answer data (122, 123). As yet another method example, the control unit 11 may generate the dummy data (1221, 1231) using a mechanical method such as randomly (using, e.g., random numbers), so that the values of the dummy data differ from the values of the correct answer data (122, 123). The plurality of learning data sets 120 may include a learning data set in which dummy data (1221, 1231) and the corresponding correct answer data (122, 123) match each other. In this case, this learning data set may be directly used in training, or the dummy data (1221, 1231) of this learning data set may be changed as appropriate.

As an example of the training processing using the dummy data (1221, 1231), similar to step S122, the control unit 11 first inputs the training data 121 of each of the learning data sets 120 to the input layer 501 of the encoder 50, and executes forward propagation computation processing of the encoder 50, the mask generator 56, the first adversarial estimator 53, and the second adversarial estimator 54. With this, the control unit 11 obtains the output values that correspond to results of the estimation tasks from the adversarial estimators (53, 54).

Then, the control unit 11 calculates, with respect to each of the learning data sets 120, a fifth error between the output value obtained from the first adversarial estimator 53 in the above-described computation processing and the dummy data 1231. Similarly, the control unit 11 calculates a sixth error between the output value obtained from the second adversarial estimator 54 and the dummy data 1221. The loss functions for use in calculating the errors may be selected as appropriate, similar to the step S121 or the like. The control unit 11 back-propagates the gradient of the calculated fifth error into computation parameters of the encoder 50 via the first adversarial estimator 53, using error back propagation. Similarly, the control unit 11 back-propagates the gradient of the calculated sixth error into computation parameters of the encoder 50 via the second adversarial estimator 54, using error back propagation. With this, the control unit 11 calculates errors of the values of the computation parameters of the encoder 50. Then, the control unit 11 updates the values of the computation parameters of the encoder 50 based on the calculated errors. The degree of update of the values of the computation parameters may be adjusted based on a learning rate.

The control unit 11 fixes the values of the computation parameters of the adversarial estimators (53, 54), and adjusts, using the above-described series of update processing, the values of the computation parameters of the encoder 50 so that the sum of the calculated errors is small. Similar to step S121 and the like, the control unit 11 may repeatedly adjust the values of the computation parameters of the encoder 50 using the above-described series of update processing, until a predetermined condition is satisfied. With this, the control unit 11 can train the encoder 50 so that the execution results of the estimation tasks obtained from the adversarial estimators (53, 54) by giving the training data 121 of each of the learning data sets 120 to the encoder 50 do not match the correct answer data (123, 122). Upon completion of the training processing of the encoder 50, the control unit 11 moves the processing to the next step S124.

Note that the method for training the encoder 50 in step S123 does not need to be limited to a method using the dummy data (1221, 1231). For example, in the training processing, similar to step S122, the control unit 11 may calculate, with respect to each of the learning data sets 120, an error between the output value obtained from the first adversarial estimator 53 and the second correct answer data 123. Similarly, the control unit 11 may calculate an error between the output value obtained from the second adversarial estimator 54 and the first correct answer data 122. Then, the control unit 11 may calculate a gradient of the calculated errors in a direction in which the errors increase, and back-propagates the calculated gradient of the errors into computation parameters of the encoder 50, using error back propagation. With this, the control unit 11 may calculate errors in the values of the computation parameters of the encoder 50, and may update the values of the computation parameters of the encoder 50 based on the calculated errors.

Note that in the process of back propagation of the gradient of the errors in the training processing in step S123, the control unit 11 may further calculate errors in the values of the computation parameters of the mask generator 56, and may update the values of the computation parameters of the mask generator 56 based on the calculated errors. With this, in step S123, the control unit 11 may trains the mask generator 56, together with the encoder 50. Furthermore, in both steps S121 and S122, the control unit 11 may multiply weights that correspond to the appearance frequencies of the correct answers by the errors. Alternatively, the control unit 11 may adjust the sampling rate of the learning data sets 120 based on the appearance frequencies of the correct answers. With this, in the training in steps S121 and S122, the control unit 11 may also correct a bias in the combination of the correct answers.

Step S124

In step S124, the control unit 11 trains the encoder 50 and the decoder 57 so that, when the training data 121 of each of the learning data sets 120 is given to the encoder 50, decoded data obtained by the decoder 57 matches the training data 121. Step S124 is an example of the fifth training step.

As an example of the training processing in step S124, first, the control unit 11 inputs the training data 121 of each of the learning data sets 120 to the input layer 501 of the encoder 50, and executes forward propagation computation processing of the encoder 50 and the decoder 57. With this, the control unit 11 obtains output values that correspond to the generated decoded data from the output layer 573 of the decoder 57. Then, the control unit 11 calculates, with respect to each of the learning data sets 120, a seventh error (reconstruction error) between the output value obtained from the decoder 57 and the training data 121. The loss functions for calculating the seventh error may be selected as appropriate, similar to the step S121 or the like. The control unit 11 back-propagates the gradient of the calculated seventh error from the output layer 573 of the decoder 57 to the input layer 501 of the encoder 50 by error back propagation, so as to calculate errors of values of the computation parameters of the decoder 57 and the encoder 50. Then, the control unit 11 updates the values of the computation parameters of the encoder 50 and the decoder 57 based on the calculated errors. The degree of update of the values of the computation parameters may be adjusted based on a learning rate.

Using the above-described series of update processing, the control unit 11 adjusts the values of the computation parameters of the encoder 50 and the decoder 57 so that the sum of the calculated seventh errors is small. Similar to step S121 and the like, the control unit 11 may repeatedly adjust the values of the computation parameters of the encoder 50 and the decoder 57 using the above-described series of update processing, until a predetermined condition is satisfied. With this, the control unit 11 can train the encoder 50 and the decoder 57 so that decoded data obtained from the decoder 57 by giving the training data 121 of each of the learning data sets 120 to the encoder 50 matches the training data 121. Upon completion of the training processing of the encoder 50 and decoder 57, the control unit 11 moves the processing to the next step S125.

Step S125

In step S125, the control unit 11 trains the mask generator 56 so that, when the training data 121 is given to the encoder 50, a result of the first estimator 51 executing the first estimation task matches the first correct answer data 122. Step S125 is an example of the third training step.

As an example of the training processing in step S125, similar to step S121, the control unit 11 first inputs the training data 121 of each of the learning data sets 120 to the input layer 501 of the encoder 50, and executes forward propagation computation processing of the encoder 50, the mask generator 56, the first estimator 51. With this, the control unit 11 obtains output values that 5 correspond to an execution result of the first estimation task from the output layer 513 of the first estimator 51. Then, the control unit 11 calculates, with respect to each of the learning data sets 120, an eighth error between the output value obtained from the first estimator 51 and the first correct answer data 122. The loss functions for calculating the eighth error may be selected as appropriate, similar to the step S121 or the like. The control unit 11 back-propagates the gradient of the calculated eighth error to the mask generator 56 via the first estimator 51 by error back propagation, and calculates errors of values of the computation parameters of the mask generator 56. Then, the control unit 11 updates the values of the computation parameters of the mask generator 56 based on the calculated errors. The degree of update of the values of the computation parameters may be adjusted based on a learning rate.

Using the above-described series of update processing, the control unit 11 adjusts the values of the computation parameters of the mask generator 56 so that the sum of the calculated eighth errors is small. Similar to step S121 and the like, the control unit 11 may repeatedly adjust the values of the computation parameters of the mask generator 56 using the above-described series of update processing, until a predetermined condition is satisfied. With this, the control unit 11 can train the mask generator 56 so that an execution result of the first estimation task obtained from the first estimator 51 by giving the training data 121 of each of the learning data sets 120 to the encoder 50 matches the first correct answer data 122. Upon completion of the training processing of the mask generator 56, the control unit 11 moves the processing to step S126.

Note that the training processing in step S125 may be executed as part of the training processing in step S121. In this case, the eighth error may be replaced by the first error. Alternatively, the training processing in step S125 may be executed separately from the training processing in step S121. In this case, the training of the first estimator 51 and the encoder 50 in step S125 may be optional. As an example, in the training processing in step S125, the values of the computation parameters of the first estimator 51 may be fixed (that is, the training of the first estimator 51 may be omitted). On the other hand, the control unit 11 may further back-propagate the gradient of the eight errors to the input layer 501 of the encoder 50 to calculate the errors in the values of the computation parameters of the encoder 50, and update the values of the computation parameters of the encoder 50 based on the calculated errors.

Step S126

In step S126, the control unit 11 trains the mask generator 56 so that binarization of the elements of the generated mask 4 advances. Step S126 is an example of the fourth training step.

As an example of the training processing in step S126, first, the control unit 11 inputs the training data 121 of each of the learning data sets 120 to the input layer 501 of the encoder 50, and executes forward propagation computation processing of the encoder 50 and the mask generator 56. With this, the control unit 11 acquires the output values that correspond to the generated mask 4 from the mask generator 56. Then, the control unit 11 calculates a ninth error in the output value obtained from the mask generator 56, using an error function whose value increases the less the binarization of elements advances. For example, a well-known function of the following Expression 1 may be used as the error function.

$$\sum_i \sum_j \frac{x_i x_j}{\left(x_i^2 + x_j^2 + \varepsilon\right)} + \sum_i \sum_j \frac{(1-x_i)(1-x_j)}{\left((1-x_i)^2 + (1-x_j)^2 + \varepsilon\right)} \quad \text{(Expression 1)}$$

Where $x_i$ and $x_j$ indicate values of elements of the mask 4 (output values). $\varepsilon$ is a constant number other than 0, and the value thereof may be given as appropriate. Note that the error function for advancing the binarization does not need to be limited to this example, and may be selected as appropriate depending on the embodiment. For example, an error function configured to multiply the L0 norm, L1 norm, or approximation thereof by the output values of the mask generator 56 may be used to calculate the ninth error.

The control unit 11 back-propagates the gradient of the calculated ninth error to the mask generator 56 using error back propagation, so as to calculate errors of values of the computation parameters of the mask generator 56. Then, the control unit 11 updates the values of the computation parameters of the mask generator 56 based on the calculated errors. The degree of update of the values of the computation parameters may be adjusted based on a learning rate.

Using the above-described series of update processing, the control unit 11 adjusts the values of the computation parameters of the mask generator 56 so that the sum of the calculated ninth errors is small. Similar to step S121 and the like, the control unit 11 may repeatedly adjust the values of the computation parameters of the mask generator 56 using the above-described series of update processing, until a predetermined condition is satisfied. With this, the control unit 11 trains the mask generator 56 so that the binarization of the elements of the generated mask 4 advances. Upon completion of the training processing for advancing the binarization, the control unit 11 moves the processing to step S127.

Note that in the training processing in step S126, the control unit 11 may further back-propagate the gradient of the ninth errors to the input layer 501 of the encoder 50 to calculate the errors in the values of the computation parameters of the encoder 50, and may update the values of the computation parameters of the encoder 50 based on the calculated errors. With this, the control unit 11 trains the encoder 50 together with the mask generator 56 so that the binarization of the elements of the generated mask 4 advances. With the training of the encoder 50, it is possible to expect that the binarization of the elements of the mask 4 is facilitated. Alternatively, the training processing in step S126 may be executed together with the training processing of at least one of above-described steps S121 to S125.

Step S127

In step S127, the control unit 11 determines whether or not to repeat the training processing in steps S121 to S126. The determination standard may be selected as appropriate depending on the embodiment. As an example, a predetermined number of times the processing is to be repeated may be given as appropriate. The predetermined number of times may be given by, for example, designation of an operator or may be given as a set value in a program. In this case, the control unit 11 determines whether or not the number of times the training processing of steps S121 to S126 has been executed has reached the predetermined number of times. If it is determined that the number of times of the execution has not reached the predetermined number of times, the control unit 11 returns to the processing in step S121, and executes again the training processing in steps S121 to S126. With this, in the present embodiment, steps S122 and S123 are executed alternately and repeatedly. On the other hand, if it is determined that the number of times of the execution has reached the predetermined number of times, the control unit 11 completes the machine learning processing of the learning model 5, and moves the processing to the next step S103.

Note that the processing order of steps S121 to S126 does not need to be particularly limited, and may be changed as appropriate depending on the embodiment. For example, the processing in step S123 may be executed after the processing in step S122. At least one of steps S121 and S124 to S126 may be executed outside the loop of the step S127. The training of the constituent components in training processing may be executed individually. A combination of at least two of steps S121 to S126 may be executed at the same. That is to say, the calculation of errors and the adjustment of values of the computation parameters in steps S121 to S126 may be executed at the same time to the extent possible. In this case, the forward propagation computation processing may be executed in common to the extent possible, and the gradient of the errors may be summed up using a weighted sum. With this, it is possible to increase the efficiency in machine learning processing. Also, instead of repeatedly adjusting the values of the computation parameters in the training processing of steps S121 to S126, the control unit 11 may repeatedly adjust the values of the computation parameters in steps S121 to S126, using the processing in step S127.

Step S103

Returning to FIG. 7, in step S103, the control unit 11 operates as the saving processing unit 113, and generates information relating to the result of machine learning in step S102, as the learning result data 129. In the present embodiment, the control unit 11 generates information indicating the structures of the trained encoder 50, mask generator 56, and first estimator 51 that are constituted by the machine learning, and the values of the computation parameters, as the learning result data 129. Then, the control unit 11 saves the generated learning result data 129 in a predetermined storage area.

A predetermined storage area may be, for example, a RAM, the storage unit 12, an external storage device, a storage medium within the control unit 11, or a combination thereof. The storage medium may be, for example, a CD, a DVD, or the like, and the control unit 11 may store the learning result data 129 in the storage medium via the drive 17. The external storage device may be, for example, a data server such as a NAS (Network Attached Storage). In this case, the control unit 11 may use the communication interface 13 to store the learning result data 129 in the data server via a network. Also, the external storage device may be, for example, an externally-attached storage device connected to the model generation apparatus 1 via the external interface 14. Upon completion of the saving the learning result data 129, the control unit 11 ends the procedure of the present operation example.

Note that the generated learning result data 129 may be provided to the estimation apparatus 2 at an appropriate timing. For example, the control unit 11 may transfer the learning result data 129, as the processing in step S103 or in addition to the processing in step S103. Upon receiving the transfer, the estimation apparatus 2 may acquire the learning result data 129. Also, the estimation apparatus 2 may acquire the learning result data 129, by using the communication interface 23 to access the model generation apparatus 1 or the data server via a network. Also, for example, the estimation apparatus 2 may acquire the learning result data 129 via the storage medium 92. Also, for example, the learning result data 129 may be incorporated in advance into the estimation apparatus 2.

Furthermore, the control unit 11 may update or newly generate the learning result data 129, by regularly or irregularly repeating the processing from step S101 to S103. During the repetition, at least some of the plurality of learning data sets 120 may be, for example, changed, modified, added or deleted as appropriate. Then, the control unit 11 may provide the updated or newly generated learning result data 129 to the estimation apparatus 2 by an appropriate method, so as to update the learning result data 129 held by the estimation apparatus 2.

Estimation Apparatus

Figure 9:
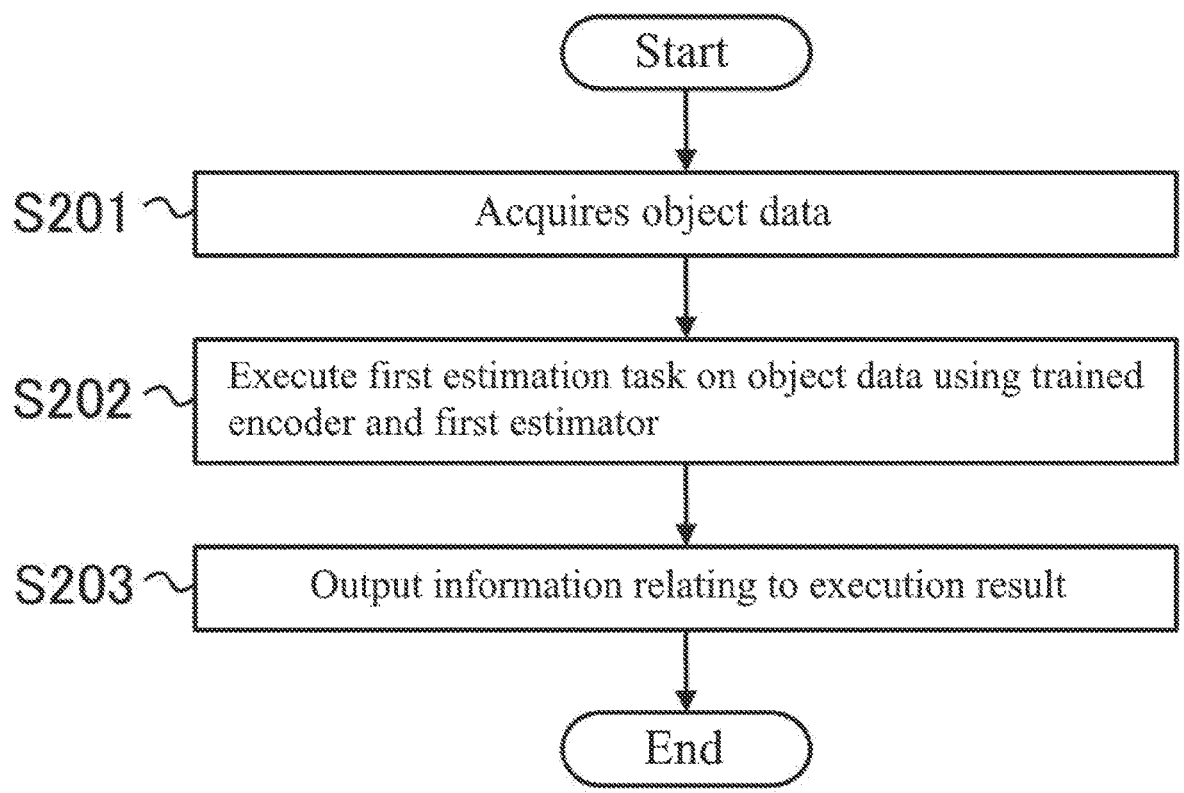
FIG. 9 is a diagram illustrating an example of a procedure of an estimation apparatus according to one or more embodiments.

FIG. 9 illustrates an example of a procedure of the estimation apparatus 2 according to the present embodiment. The procedure described below is an example of the "estimation method" of the present invention. Note however that the procedures described below are merely examples, and the steps may be modified to the extent possible. Moreover, in the procedure described below, steps may also be omitted, replaced, and added as appropriate depending on the embodiment.

Step S201

In step S201, the control unit 21 operates as the data acquisition unit 211, and acquires object data 221. The object data 221 is a sample of a predetermined type of data to be subjected to the first estimation task. The method for acquiring the object data 221 may be determined as appropriate depending on the type of data. If the object data 221 is sensing data, the control unit 21 can acquire the object data 221 by observing an object relating to the first estimation task using a sensor. Upon acquisition of the object data 221, the control unit 21 moves the processing to the next step S202.

Step S202

In step S202, the control unit 21 operates as the estimation unit 212, and configures settings of the trained encoder 50, mask generator 56, and first estimator 51 with reference to the learning result data 129. The control unit 21 inputs the acquired object data 221 to the input layer 501 of the trained encoder 50, and executes forward propagation computation processing of the trained encoder 50, mask generator 56, and first estimator 51. In the process of the computation processing, the control unit 21 acquires the output values of the object data 221 that correspond to the feature amounts 3 from the output layer 503 of the encoder 50, by the computation processing up to the trained encoder 50. Also, the control unit 21 acquires the output values that correspond to the generated mask 4 from the object data 221, by the computation processing up to the trained mask generator 56. The control unit 21 uses the obtained mask 4 to extract the first portion 31 from the feature amounts 3. Then, the control unit 21 inputs the first portion 31 of the feature amounts 3 to the input layer 511 of the trained first estimator 51, and executes the forward propagation computation processing on the trained first estimator 51. With this, the control unit 21 can obtain output values that correspond to a result obtained by executing the first estimation task on the object data 221, from the output layer 513 of the trained first estimator 51. That is to say, in the present embodiment, "executing the first estimation task on the object data 221" is realized by giving the object data 221 to the encoder 50, and executing the forward propagation computation processing of the trained encoder 50, mask generator 56, and first estimator 51. Upon completion of the first estimation task, the control unit 21 moves the processing to the next step S203.

Step S203

In step S203, the control unit 21 operates as the output unit 213, and outputs information relating to an execution result of the first estimation task.

The content of destination and information to be output may be determined as appropriate depending on the embodiment. For example, the control unit 21 may directly output the execution result of the first estimation task obtained in step S202, to the output apparatus 26. Also, for example, the control unit 21 may execute some information processing based on the execution result of the first estimation task. Then, the control unit 21 may output a result obtained by executing the information processing as information relating to the execution result of the first estimation task. "Outputting a result obtained by executing the information processing" may include outputting a specific message according to the execution result of the first estimation task, controlling operations of an apparatus to be controlled according to the execution result, and the like. The destination may be, for example, the output apparatus 26, an output apparatus of another computer, an apparatus to be controlled, or the like.

Upon completion of the output of information relating to the execution result of the first estimation task, the control unit 21 ends the procedure according to the present operation example. Note that during a predetermined period in time, the control unit 21 may execute continuously and repeatedly the series of information processing from step S201 to step S203. The timing of the repetition may be set as appropriate. With this, the estimation apparatus 2 may continuously execute the first estimation task.

Features

As described above, according to the present embodiment, the training processing in steps S121 to S123 allow the feature amounts 3 obtained by the encoder 50 to include information relating to the estimation tasks, making it possible to increase the exclusiveness of information between the first portion 31 and the second portion 32 of the feature amounts 3. With this, it is possible to increase the explainability for the first portion 31 and the second portion 32 of the feature amounts 3 obtained by the trained encoder 50. Accordingly, it is possible to generate a trained machine learning model that has relatively high explainability for computation content. In the estimation apparatus 2, it is possible to make execution of the first estimation task unlikely to be affected by information relating to the second estimation task.

Also, in the present embodiment, the learning model 5 includes the mask generator 56. By the processing of training the mask generator 56 in step S125, the range of the first portion 31 of the feature amounts 3 can be determined so as to adapt to the training data 121. With this, it is possible to ensure the execution accuracy of the first estimation task by the trained first estimator 51, and optimize the information amount of the first portion 31 of the feature amounts 3. As a result, it is possible to expect that the efficiency in the time for calculating the first estimation task is increased. Also, when the elements of the generated mask 4 have intermediate values, it is possible to expect that information contributing to both the first estimation task and the second estimation task can be extracted for the first portion 31 and the second portion 32. As a result, it is possible to improve the accuracy in execution of the estimation tasks. Furthermore, in the present embodiment, by the training processing in step S126, it is possible to facilitate the optimization of the information amount of the first portion 31 of the feature amounts 3 (that is, generation of the trained mask generator 56).

Also, in the present embodiment, the learning model 5 includes the decoder 57. By the processing of training the encoder 50 and the decoder 57 in step S124, it is possible to ensure that the training data 121 is able to be reconstructed from the feature amounts 3. With this, in the feature amounts 3 obtained from the encoder 50, it is possible to suppress a loss of information relating to the training data 121. Thus, according to the present embodiment, since it is possible to suppress a loss of information in the process of converting input data into the feature amounts 3 by the trained encoder 50, the generalization and robustness of the trained machine learning model used in the estimation apparatus 2 can be improved.

Also, in the present embodiment, the second estimation task may be to estimate the identity of the training data 121. Noise included in the training data 121 is a phenomenon uniquely appearing in a specific object, and thus corresponds to the identity of the training data 121. According to the present embodiment, it is possible to make information relating to the identity of the training data 121 (that is, information that can correspond to the noise) less likely to be included in the first portion 31 of the feature amounts 3 obtained by the trained encoder 50. With this, it is possible to suppress the information relating to the identity from affecting execution of the first estimation task, and improve the generalization properties of the trained machine learning model (the encoder 50, the mask generator 56, and the first estimator 51) that executes the first estimation task. In other words, in the estimation apparatus 2, it is possible to expect that the accuracy in the execution of the first estimation task with respect to the object data 221 obtained in an unknown environment is improved. Note that estimating the identity may be to identify the identifier of the training data 121. With this, the second estimation task can be set as appropriate. Also, the identifier may be configured to indicate a hash value or a class. With this, it is possible to mitigate an increase in the amount of information of the second correct answer data 123 according to the number of the learning data sets 120. As a result, it is possible to expect that the amount of calculation relating to the second estimation task is reduced, and the efficiency of the machine learning processing is increased.

4. Modification Examples

Although the embodiment of the present invention has been described above in detail, the above descriptions are merely examples of the present invention in all aspects. Needless to say, various improvements or modifications can be made without departing from the scope of the present invention. For example, the following modifications are possible. Note that, in the following description, the same reference numerals are used for the same constituent elements as the constituent elements described in the above embodiment, and descriptions of the same points as the points described in the above embodiment are omitted as appropriate. The following modifications may be combined as appropriate.
<4.1>

In the foregoing embodiment, an estimation task that is executed in the estimation apparatus 2 (that is, an application scenario) is set as the first estimation task. However, the estimation task to be executed in the application scenario does not need to be limited to the first estimation task. As another example, the second estimation task may be executed in the application scenario. As yet another example, an estimation task other than the first estimation task and the second estimation task may be executed in the application scenario. In this case, the other estimation task to be executed in the application scenario may be a higher-order estimation task for estimating higher-order features from information relating to features estimated by the plurality of estimation tasks. "Higher-order" corresponds to estimating more complicated or abstract features from the estimation result of two or more estimation tasks or information used in the execution thereof. As an example, at least either the first estimation task or the second estimation task may be to estimate more primitive (or simple) features such as counting the number of objects included in input data, or identifying the type of objects. When both the first estimation task and the second estimation task are to estimate primitive features, the first estimation task and the second estimation task may be set so as to estimate different items of the primitive features. Alternatively, at least either the first estimation task or the second estimation task may be, for example, to estimate relatively near future or past values (for example, future or past values that can be estimated from the current value with allowable accuracy) of input data such as sensing data. When both the first estimation task and the second estimation task are to estimate future or past values of input data, the first estimation task and the second estimation task may be set so as to estimate different temporal values. In contrast, the higher-order estimation task may be to estimate higher-order features (complicated or abstract features) such as determining an automated driving strategy. Note that the first estimation task and the second estimation task may also be higher-order estimation tasks relative to a lower-order estimation task. In view of this point, the first estimation task and the second estimation task may be paraphrased as "k-th order estimation tasks", and a higher-order estimation task may be paraphrased as "(k+1)th order estimation task" (where k is a natural number of 1 or more).

Figure 10A:
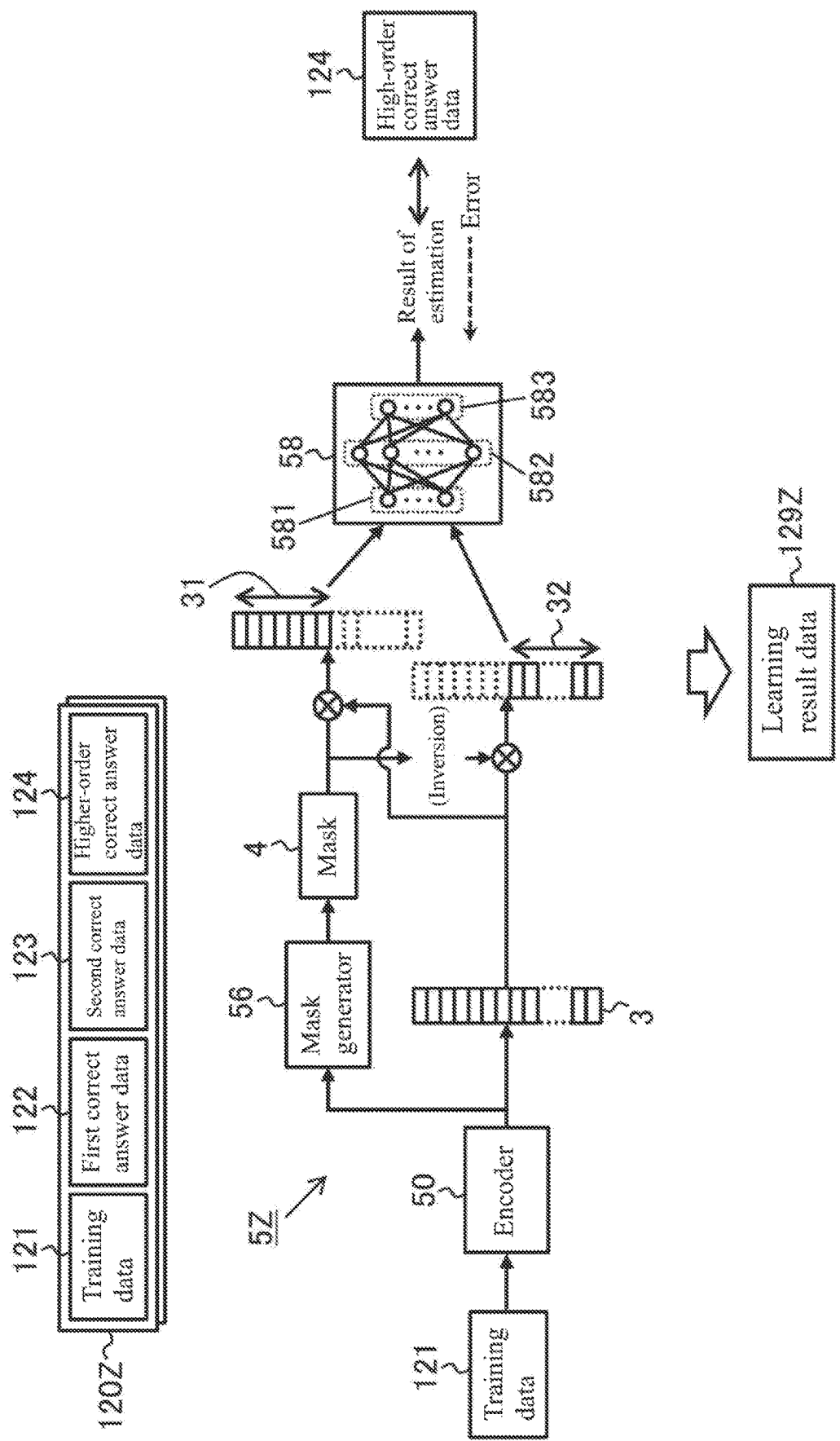
FIG. 10A is a schematic diagram illustrating an example of a learning model according to a modification.

FIG. 10A schematically illustrates an example of a procedure of machine learning of a learning model 5Z according to a modification in which a higher-order estimation task is executed in an application scenario. The learning model 5Z according to this modification has the same configuration as the learning model 5 except for the learning model 5Z further including a higher-order estimator 58. The higher-order estimator 58 is configured to accept inputs from the first portion 31 and the second portion 32 of the feature amounts 3, and execute, based on the input first portion 31 and second portion 32, the higher-order estimation task on input data (in other words, the higher-order estimator 58 outputs output values that correspond to an execution result of the higher-order estimation task).

Similar to the above-described estimators (51, 52), the higher-order estimator 58 may have a format of an output value that is appropriately determined so as to directly or indirectly represent the execution result of the higher-order estimation task. Also, the type of a machine learning model constituting the higher-order estimator 58 does not need to be particularly limited, and may be selected as appropriate depending on the embodiment. In the example of FIG. 10A, similar to the estimators (51, 52) according to the above-described embodiment, the higher-order estimator 58 is constituted by a multilayer fully connected neural network. The higher-order estimator 58 includes an input layer 581, an intermediate (hidden) layer 582, and an output layer 583. Note however that, similar to the constituent components of the learning model 5, the structure of the higher-order estimator 58 does not need to be limited to this example, and may be selected as appropriate depending on the embodiment. The number of layers of the higher-order estimator 58 may be determined as appropriate depending on the embodiment. Each of the layers 581 to 583 includes one or more neurons (nodes). The connection relationship between neurons may be set as appropriate depending on the embodiment. Each of the layers 581 to 583 may have the same configuration as in the above-described embodiment.

Machine learning of the learning model 5Z according to this modification can be executed by the above-described model generation apparatus 1. In above-described step S101, the control unit 11 acquires a plurality of learning data sets 120Z. Each of the learning data sets 120Z may have the same configuration as the above-described learning data sets 120, except for the learning data set 120Z further including higher-order correct answer data 124, which indicates a correct answer of the higher-order estimation task with respect to the training data 121. The data format of the higher-order correct answer data 124 may be determined as appropriate depending on the higher-order estimation task, the machine learning method, the configuration of the learning model 5Z, or the like.

Also, executing the machine learning in above-described step S102 may have the same configuration as in the above-described embodiment, except for it further including a higher-order training step of training the higher-order estimator 58. In the higher-order training step, the control unit 11 trains the higher-order estimator 58 so that, when the training data 121 of each of the learning data sets 120Z is given to the encoder 50, a result of the higher-order estimator 58 executing the higher-order estimation task matches the higher-order correct answer data 124. Similar to above-described step S121 and the like, a batch gradient descent method, a stochastic gradient descent method, a mini batch gradient descent method, or the like may be used in the training processing of the machine learning.

As an example of the training processing, first, the control unit 11 inputs the training data 121 of each of the learning data sets 120Z to the input layer 501 of the encoder 50, and executes forward propagation computation processing of the encoder 50, the mask generator 56, and the higher-order estimator 58. With this, the control unit 11 obtains the output values that correspond to an execution result of the higher-order estimation task from the output layer 583 of the higher-order estimator 58. Note that in this training processing, the processing of the mask generator 56 may be omitted.

Then, the control unit 11 calculates, with respect to each of the learning data sets 120Z, an error between the output value obtained from the higher-order estimator 58 in the above-described computation processing and the higher-order correct answer data 124. The loss functions for use in calculating the error may be selected as appropriate, similar to above-described step S121, and the like. The control unit 11 back-propagates the calculated gradient from the output side of the higher-order estimator 58 to the input side using error back propagation, and calculates errors of values of computation parameters of the higher-order estimator 58. Then, the control unit 11 updates values of the computation parameters of the higher-order estimator 58 based on the calculated errors. The degree of update of the values of the computation parameters may be adjusted based on a learning rate.

Using the above-described series of update processing, the control unit 11 adjusts the values of the computation parameters of the higher-order estimator 58 so that the sum of the calculated errors is small. Similar to above-described step S121, and the like, the control unit 11 may repeatedly adjust the values of the computation parameters of the higher-order estimator 58 using the above-described series of update processing, until a predetermined condition is satisfied. With this, the control unit 11 can train the higher-order estimator 58 so that an execution result of the higher-order estimation task obtained from the higher-order estimator 58 by giving the training data 121 of each of the learning data sets 120Z to the encoder 50 match the higher-order correct answer data 124.

The timing at which the higher-order training step is executed may be selected as appropriate depending on the embodiment. For example, the higher-order training step may be executed within the loop of step S127 (that is to say, together with steps S121 to S126), or may be executed after step S127. When executed within the loop, the higher-order training step may be handled in the same manner as in above-described step S121, and the like.

Note that in the higher-order training step, the control unit 11 may further back-propagate the gradient of errors to the input layer 501 of the encoder 50, further calculate errors in the values of the computation parameters of the encoder 50, and update the values of the computation parameters of the encoder 50 based on the calculated errors. With this, the control unit 11 may also train the encoder 50, together with the higher-order estimator 58. The mask generator 56 may also be trained together with the higher-order estimator 58.

In above-described step S103, the control unit 11 generates information indicating the structures of the trained encoder 50, mask generator 56, and higher-order estimator 58 constituted by machine learning and the values of the computation parameters thereof, as the learning result data 129Z. Then, the control unit 11 saves the generated learning result data 129Z in a predetermined storage area. Note that the generated learning result data 129Z may be provided to an applied apparatus (for example, the estimation apparatus 2) at an appropriate timing.

Note that if the processing of the mask generator 56 is omitted in the process of computation of the higher-order estimation task, the information relating to the trained mask generator 56 may be omitted from the learning result data 129Z. Also, the learning result data 129Z may include information relating to other constituent elements of the trained learning model 5Z.

Figure 10B:
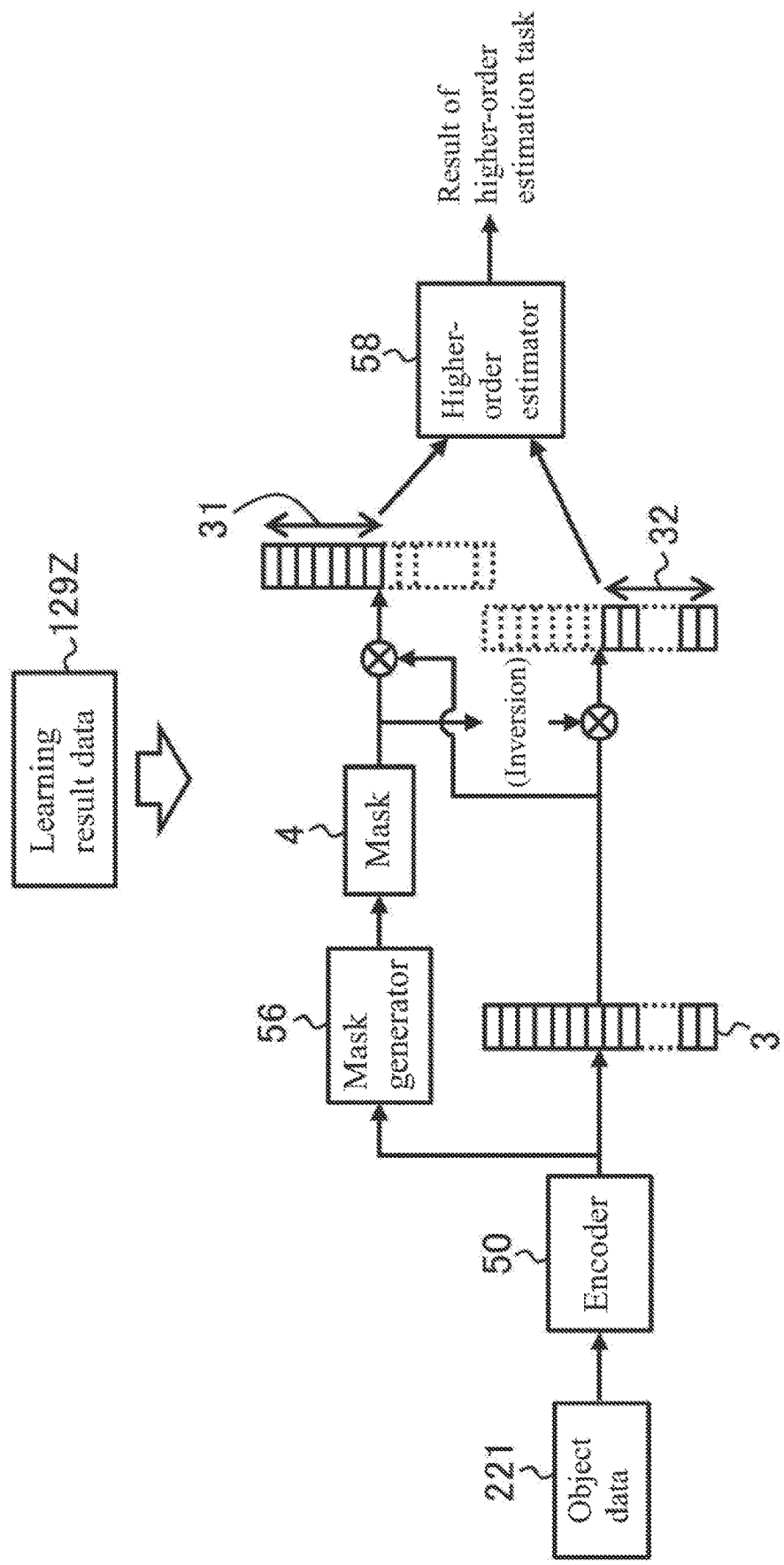
FIG. 10B is a schematic diagram illustrating an example of a scenario to which a trained learning model according to a modification is applied.

FIG. 10B schematically illustrates an example of a scenario in which the trained learning model 5Z according to this modification is used. The higher-order estimation task using the trained higher-order estimator 58 can be executed by the above-described estimation apparatus 2. In above-described step S202, the control unit 21 uses the trained encoder 50, mask generator 56, and higher-order estimator 58 to execute the higher-order estimation task on the acquired object data 221. That is to say, the control unit 21 configures settings of the trained encoder 50, mask generator 56, and higher-order estimator 58 with reference to the learning result data 129Z. The control unit 21 inputs the acquired object data 221 to the input layer 501 of the trained encoder 50, and executes forward propagation computation processing of the trained encoder 50, mask generator 56, and higher-order estimator 58. With this, the control unit 21 can obtain output values that correspond to a result obtained by executing the higher-order estimation task on the object data 221, from the trained higher-order estimator 58. Except for these points, the estimation apparatus 2 can use the same procedure as in the above-described embodiment to execute processing relating to the higher-order estimation task. Note that in step S202, the trained mask generator 56 may be omitted if not necessary.

According to this modification, it is possible to construct a trained machine learning model (the encoder 50, the mask generator 56, and the higher-order estimator 58) that is likely to clarify, if an error occurs in an estimation result, the reason of the error. That is to say, in the estimation apparatus 2, if an error occurs in an execution result of the higher-order estimation task, the portions (31, 32) of the feature amounts 3 are referenced. For reference of the portions (31, 32), 1 ( ) trained estimators (51, 52) may also be used. As a result of the referencing, if it is found that at least either the first portion 31 or the second portion 32 does not have an appropriate value (that is, an error has occurred in the first estimation task and the second estimation task that have a lower order than the higher-order estimation task), it is possible to clarify the reason why the error has occurred in the execution result of the higher-order estimation task. Also, if an error occurs in the estimation result of the higher-order estimator 58, it is assumed that one of the first portion 31 and the second portion 32 is found to be inappropriate. In this case, one of the first portion 31 and the second portion 32 that may be inappropriate is removed, then the higher-order estimator 58 is again trained, and a higher-order estimation task is executed by a trained higher-order estimator 58 that is newly generated. Alternatively, one of the first portion 31 and the second portion 32 that may be inappropriate is removed, then the removed portion is complemented to an appropriate value, and a higher-order estimation task is executed by the higher-order estimator 58. If the execution result is correct, it is possible to clarify that the removed portion of the feature amounts 3 is the cause of the error. That is to say, according to the present modification, by enhancing the exclusiveness of information between the first portion 31 and the second portion 32, thereby increasing the explainability for the feature amounts 3, it is possible to verify, if an estimation task has malfunctioned, the reason of the malfunction.

<4.2>

In the above-described embodiment, the numbers of portions extracted from the feature amounts 3, corresponding estimation tasks, and the estimators are two. However, the numbers do not need to be limited to two, and may be three or more.

Figure 11:
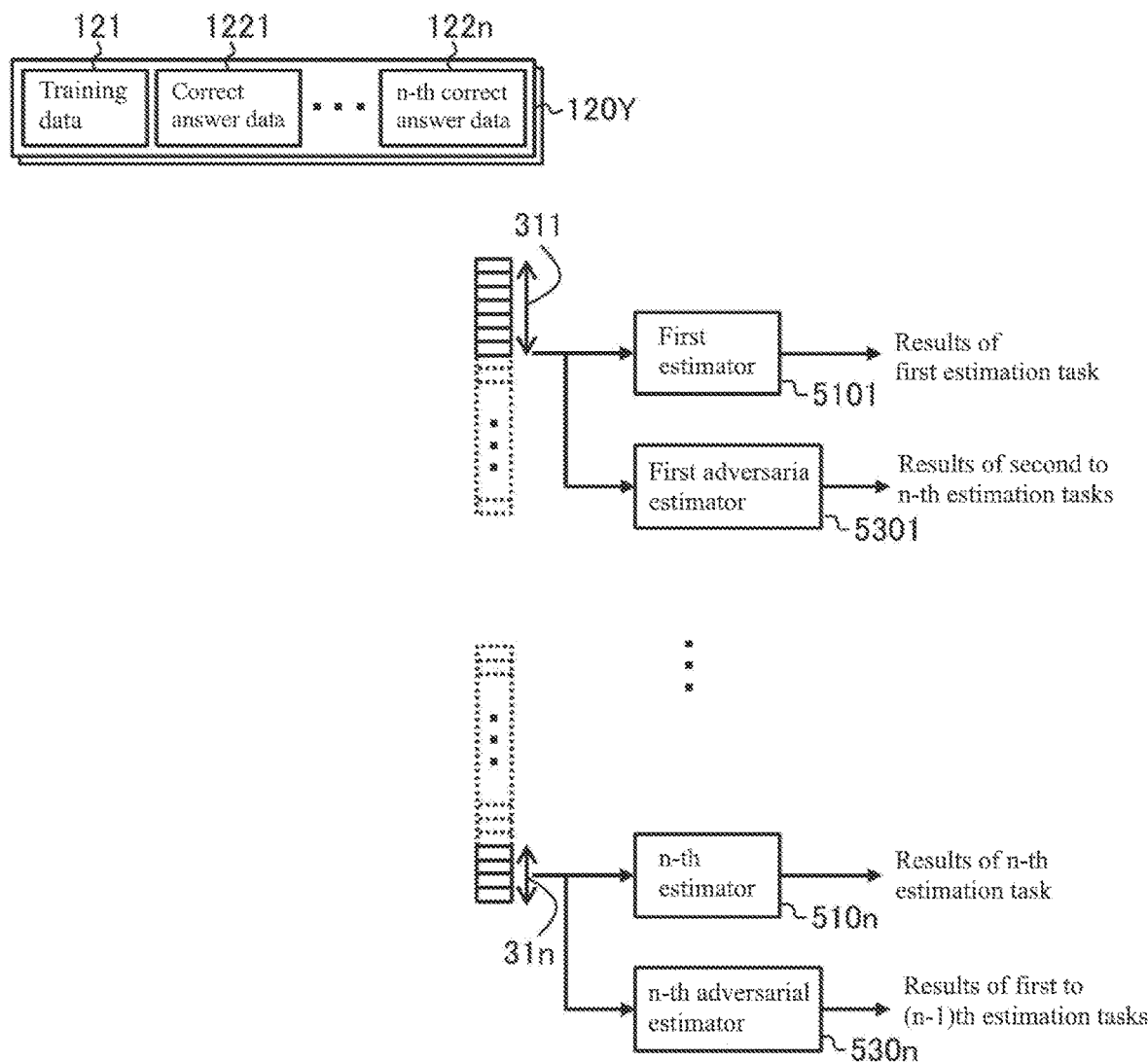
FIG. 11 is a schematic diagram illustrating an example of a learning model according to a modification.

FIG. 11 illustrates an example of the learning model according to this modification. In this modification, n estimation tasks are set. Here, n may be a natural number of three of more. One of the n estimation tasks may be to estimate the identity of input data, similar to the above-described second estimation task. The learning model according to this modification has the same configuration as the learning model 5 according to the above-described embodiment, except for the feature in which the number of constituent components is changed according to the number of estimation tasks. The learning model according to this modification includes the above-described encoder 50, and n estimators 5101 to 510n. Each of the estimators 5101 to 510n may have the same configuration as the above-described estimators (51, 52).

The feature amounts 3 may include n portions 311 to 31n that respectively correspond to the estimation tasks. The number of mask generators 56 that generate masks 4 for extracting the portions 311 to 31n may be determined as appropriate depending on the embodiment. For example, one mask generator 56 may be configured to generate n masks 4 for extracting the respective portions 311 to 31n. Also, for example, the learning model may include n-1 mask generators 56, and each of the mask generators 56 may be configured to generate masks 4 for extracting the first to (n-1)th portions. In this case, the n-th portion 31n may be extracted from the portion of the feature amounts 3 other than the first to n-1 th portions.

Each of the estimators 5101 to 510n is allocated to an estimation task. The estimators 5101 to 510n are configured to respectively accept inputs from the portions 311 to 31n of the feature amounts 3 that correspond to the corresponding estimation task assigned thereto, execute the estimation tasks assigned to the input data based on the input portions 311 to 31n. In the example of FIG. 11, the first estimator 5101 is configured to accept an input of the first portion 311, and execute the first estimation task. The n-th estimator 510n is configured to accept an input of the n-th portion 31n, and execute the n-th estimation task.

Also, to realize the second training step using adversarial learning, the learning model according to this modification includes n adversarial estimators 5301 to 530n that correspond to the respective estimators 5101 to 510n. The adversarial estimators 5301 to 530n are configured to respectively accept inputs from the corresponding portions 311 to 31n of the feature amounts 3, and execute, based on the input portions 311 to 31n, n-1 estimation tasks other than the estimation tasks assigned to the corresponding estimators 5101 to 510n. In the example of FIG. 11, the first adversarial estimator 5301 is configured to accept an input of the first portion 311, and execute the second to n-th estimation tasks. The n-th adversarial estimator 530n is configured to accept an input of the n-th portion 31n, and execute the first to (n-1)th estimation tasks. The adversarial estimators 5301 to 530n may have the same configuration as the above-described adversarial estimators (53, 54). Note that the number of the adversarial estimators does not need to be limited to this example. For example, an adversarial estimator may be set for each estimation task. That is to say, n-1 adversarial estimators may also be set for each of the estimators 5101 to 510n.

Machine learning of the learning model according to this modification can be executed by the above-described model generation apparatus 1. In step S101 above, the control unit 11 acquires a plurality of learning data sets 120Y. Each of the learning data sets 120Y is constituted by a combination of training data 121, and n pieces of correct answer data 1221 to 122n that respectively indicate correct answers of the n estimation tasks with respect to the training data 121. The correct answer data 1221 to 122n correspond to the correct answer data (122, 123) according to the above-described embodiment.

Executing machine learning according to this modification has the same configuration as that in step S102 according to the above-described embodiment, except for the number of constituent components. In step S121, the control unit 11 trains the encoder 50 and the estimators 5101 to 510n so that when the training data 121 of each of the learning data sets 120Y is given to the encoder 50, results of the estimators 5101 to 510n executing the respective estimation tasks match the corresponding correct answer data 1221 to 122n. In step S122, the control unit 11 trains the adversarial estimators 5301 to 530n so that when the training data 121 of each of the learning data sets 120Y is given to the encoder 50, results of the adversarial estimators 5301 to 530n executing n-1 estimation tasks match n-1 pieces of correct answer data (for example, the second to n-th correct answer data in the case of the first adversarial estimator 5301) that indicate the respective correct answers of the n-1 estimation tasks. On the other hand, in step S123, the control unit 11 trains the encoder 50 so that when the training data 121 of each of the learning data sets 120Y is given to the encoder 50, results of the adversarial estimators 5301 to 530n executing n-1 estimation tasks do not match n-1 pieces of correct answer data that indicate the respective correct answers of the n-1 estimation tasks. The control unit 11 executes steps S122 and S123 alternately and repeatedly. With this, the control unit 11 can train the encoder 50 so that, for each of the learning data sets 120Y, the correlation between the portions 311 to 31n of the feature amounts 3, and n-1 pieces of (other) correct answer data except for the correct answer data 1221 to 122n that correspond to the estimation tasks corresponding to the portions 311 to 31n (for example, the second to n-th correct answer data in the case of the first portion 311) is lowered.

The trained learning model according to this modification may be used as appropriate to execute the estimation tasks in the application scenario. For example, the estimation apparatus 2 may also use one of the n trained estimator 5101 to 510n and the trained encoder 50, so as to execute one of the n estimation tasks on the object data 221. Also, similar to the above-described item <4.1>, a higher-order estimation task other than the n estimation tasks may be set, and the learning model according to this modification may further include a higher-order estimator. The higher-order estimation task may be set for at least two estimation tasks of the n estimation tasks. In this case, the higher-order estimator may be configured to accept at least two inputs from the n portions 311 to 31n of the feature amount 3, and execute the higher-order estimation tasks on the input data based on the at least two of the input n portions 311 to 31n. Executing machine learning of the learning model may further include the above-described higher-order training step. The estimation apparatus 2 may use the trained encoder 50 and higher-order estimator to execute the higher-order estimation task on the object data 221.

According to the present modification, it is possible to generate a trained machine learning model that has higher explainability for computation content. In the estimation apparatus 2, when any of the estimation tasks is executed, it is possible to make that estimation task unlikely to be affected by information relating to another estimation task. Also, in the aspect in which a higher-order estimator is provided, if an error occurs in an execution result of the higher-order estimation task, it is possible to expect that the reason why the error has occurred can be clarified, with reference to the portions 311 to 31n. Also, if an error occurs in an execution result of the higher-order estimation task, an inappropriate portion is removed from the n portions 311 to 31n of the feature amounts 3, then the higher-order estimator 58 is again trained, and a higher-order estimation task is executed by a newly generated higher-order estimator 58. Alternatively, the removed portion is complemented to an appropriate value, and a higher-order estimation task is executed by the higher-order estimator 58. With this, it is possible to verify the reason why the error has occurred.

Moreover, a creator may select a portion of the feature amounts 3 that is to be used depending on the application scenario, and may configure a higher-order estimator so that it executes a higher-order estimation task based on the selected portion. For example, in a first application scenario, the first portion 311 contributes to an improvement in the execution accuracy of the higher-order estimation task, whereas in a second application scenario, the first portion 311 deteriorates the execution accuracy of the higher-order estimation task. In this case, the creator may configure the higher-order estimator so that, in the first application scenario, the higher-order estimator accepts an input from the first portion 311, and in the second application scenario, the first portion 311 is excluded from the input of the higher-order estimator. With this, it is possible to expect that a trained higher-order estimator that is optimal for an application scenario can be generated.

<4.3>

In the above-described embodiment, by executing steps S122 and S123 independently, and making a loop of the training processing in step S127, the first step and the second step of the second training step are executed alternately and repeatedly. However, executing the first step and the second step alternately and repeatedly does not need to be limited to this example, and may include executing the first step and the second step at the same time using a gradient inverting layer.

Figure 12:
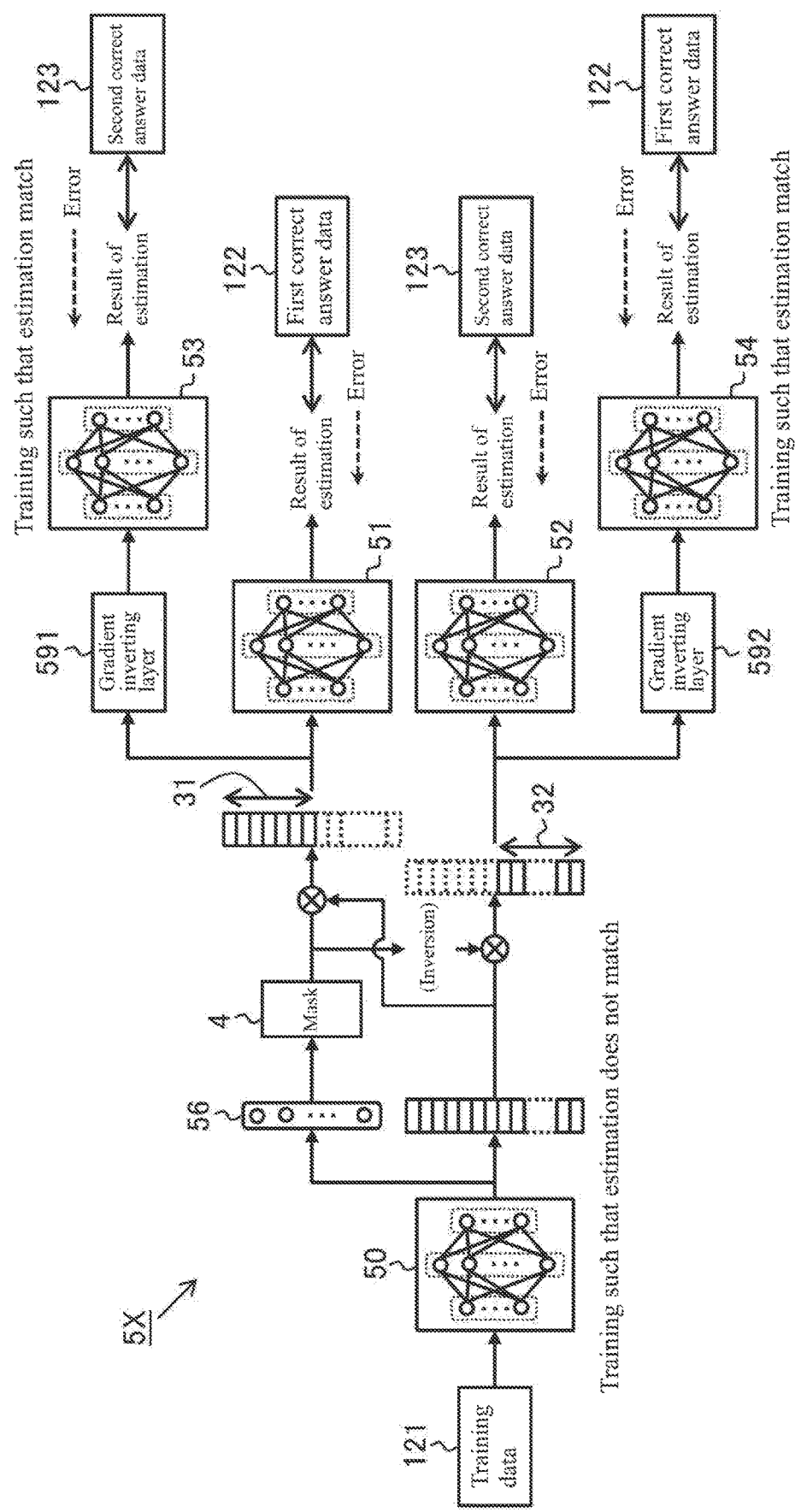
FIG. 12 is a schematic diagram illustrating an example of a learning model according to a modification.

FIG. 12 schematically illustrates an example of a learning model 5X according to this modification. The learning model 5X according to this modification includes gradient inverting layers (591, 592) that are arranged upstream of the respective adversarial estimators (53, 54). The gradient inverting layers (591, 592) are configured to let values pass therethrough in the case of forward propagation computation, and invert values in the case of back propagation computation. Machine learning of the learning model $5x$ according to this modification may be processed in the same manner as in the above-described embodiment, except for processing of the second training step (above-described steps S122 and S123). In the second training step, the control unit 11 calculates errors of output values of the adversarial estimators (53, 54), as in above-described steps S122 and S123. The control unit 11 back-propagates the calculated errors from the output layer (533, 534) of the adversarial estimators (53, 54) to the input layer 501 of the encoder 50, and updates the values of computation parameters of the encoder 50 and the adversarial estimators (53, 54), without fixing the values. With this, the control unit 11 can process steps S122 and S123 at the same time. Note that the same configuration may also be employed in the above-described modification <4.2>. The gradient inverting layers may be arranged upstream of the adversarial estimators 5301 to 530n.

<4.4>

In the above-described embodiment and modifications, the second training step is constituted by adversarial learning of the first step and the second step. However, the method for training the encoder 50 so that the correlations between the respective portions and the correct answer data are low does not need to be limited to this example. As an example, in the second training step, the control unit 11 may calculate, as errors, discrepancies between distributions of the portions of the feature amounts 3 and the correct answer data (in the above-described embodiment, between the first portion 31 and the second correct answer data 123, and between the second portion 32 and the first correct answer data 122), and may also train the encoder 50 so that the calculated errors are minimized. A well-known indicator such as MMD (maximum mean discrepancy) or MCD (maximum classifier discrepancy) may be used for the calculation of errors. With this, the control unit 11 may also train the encoder 50 so that the correlations between the portions and the correct answer data are low. In this case, the adversarial estimators (53, 54, and 5301 to 530n) may be omitted.

<4.5>

In the above-described embodiment, a multilayer fully connected neural network is used for each of the encoder 50, the estimators (51, 52), the adversarial estimators (53, 54), and the decoder 57. However, the types of the neural networks constituting the respective components do not need to be limited to this example. For example, a well-known neural network such as a convolution neural network or recurrent neural network may also be used for each of constituent components of the learning model 5. The constituent components of the learning model 5 may further include, for example, other types of layers such as a dropout layer. The same applies to the mask generator 56 and the higher-order estimator 58.

Also, in the above-described embodiment, the type of machine learning model constituting each of the constituent components of the learning model 5 does not need to be limited to a neural network. Instead of a neural network, for example, a support vector machine, a regression model, a decision tree model, or the like may be used for each constituent component. The computation content of the machine learning model may be at least either identification or regression. The method of machine learning may be selected as appropriate depending on the type of each machine learning model. As a machine learning method, for example, a k-nearest neighbor algorithm or an approximation method thereof (such as e.g., an approximation nearest neighbor algorithm), random forests, bagging, boosting, or the like may be used. The same applies to the higher-order estimator 58. Note that if the machine learning model is not constituted by a differentiable function such as e.g., a neural network, the method of machine learning may employ a method that can execute training of an indifferentiable model, such as reinforcement learning.

Also, in the above-described embodiment, the formats of input and output of the constituent components of the learning model 5 do not need to be particularly limited, and may be determined as appropriate depending on the embodiment. For example, the first estimator 51 may be configured to further accept an input of information other than the first portion 31 (and the second portion 32) of the feature amounts 3. The same applies to the higher-order estimator 58.

<4.6>

In the above-described embodiment, the training processing in step S126 may also be omitted from the procedure of machine learning of the learning model 5.

Also, in the above-described embodiment, the mask generator 56 may be omitted from the learning model 5. In this case, the training processing in step S125 may be omitted from the procedure of machine learning of the learning model 5. The first portion 31 and the second portion 32 of the feature amounts 3 may be extracted without using the mask 4 because the ranges of the portions are defined in advance. That is to say, the ranges of the first portion 31 and the second portion 32 of the feature amounts 3 may be determined in advance in a fixed manner. The ranges of the first portion 31 and the second portion 32 may be defined as appropriate by designation of an operator, using set values, or the like. Alternatively, the mask 4 may be given without using the mask generator 56. In this case, the mask 4 may be constituted by predetermined fixed values. Alternatively, the values of the elements of the mask 4 may be adjusted in a programmed manner according to the progress of the training processing such that, for example, the range of the first portion 31 is reduced as the training processing progresses.

Also, in the above-described embodiment, the decoder 57 may be omitted from the learning model 5. In this case, the training processing in step S124 may be omitted from the procedure of machine learning of the learning model 5.

<4.7>

The estimation system 100 according to the above-described embodiment and the modification thereof may be applied to any scenario in which an estimation task is executed on a predetermined type of data.

As an example, the estimation system 100 according to the above-described embodiment and the modification thereof may be applied to a scenario in which an object (such as human or a physical body) is observed by a sensor. In this case, data (training data and object data) to be handled may be sensing data generated by a sensor for observing the object. In this case, the first estimation task and the second estimation task may be to estimate one or more items different from each other regarding attributes of an object, an environment to be observed, or the like. For example, the first estimation task may be to estimate attributes of an object, whereas the second estimation task may be to estimate an environment to be observed. Attributes of an object may include, for example, the object state, situation, evaluation, type, identifier, and the like. An environment to be observed may include, for example, observation place, observation conditions of the sensor (such as e.g., settings of the sensor and setting position thereof), observation conditions of an observation range (such as e.g., lighting conditions and disturbance/ambient light conditions), and the like. Note that, for example, attributes affecting the observation conditions of the sensor, such as the object type or identifier, may be interpreted as being included in the environment to be observed. Also, for example, the first estimation task may be to estimate attributes of an object, whereas the second estimation task may be to estimate the identity of input data (such as training data or object data).

The higher-order estimation tasks may be set as the first estimation task and the second estimation task. In this case, at least one of the first estimation task and the second estimation task may be to estimate (including predicting) one or more items regarding attributes of an object. In contrast, the higher-order estimation tasks may be to estimate attributes of an object that is more complicated than the first estimation task and the second estimation task, and estimate the operation strategy of an apparatus (such as e.g., an automated driving vehicle or a robot apparatus) to be controlled based on the object attributes. Estimating a complicated object may be to estimate, based on the items estimated from the first estimation task and the second estimation task, one or more items of higher order than these items. When both the first estimation task and the second estimation task are to estimate one or more items relating to attributes of an object, the first estimation task and the second estimation task are set so as to estimate one or more items different from each other regarding attributes of an object. Alternatively, at least either the first estimation task or the second estimation task may be, for example, to estimate a future or past observation value based on a current observation value of the sensor. When both the first estimation task and the second estimation task are to estimate a future or past observation value of the sensor, the first estimation task and the second estimation task may be set so as to estimate temporal observation values different from each other. In this case, the higher-order estimation task may be to estimate attributes of the object based on either of the future or past observation values. The same applies to a case where n estimation tasks are set.

As another example, data to be handled may be attribute data relating to attributes of an object. Attribute data may be constituted by, for example, image data, sound data, numerical data, text data, or the like. Attribute data may be obtained by analyzing sensing data obtained by a sensor. In this case, the first estimation task may be to evaluate the object. "Evaluating the object" may be, for example, to determine an evaluation point of the object, estimate the state of the object, and the like. The second estimation task may be to estimate attributes of an object that does not bias the evaluation of the object (that is to say, excluding the object from the indicator for use in evaluating the object).

Also, at least one of the first estimation task and the second estimation task may be to estimate an object using one or more items. When both the first estimation task and the second estimation task are to estimate an object using one or more items, the first estimation task and the second estimation task may be set so as to estimate the object using one or more different items. In this case, the higher-order estimation task may be to estimate the object using one or more items of higher order than the items of the first estimation task and the second estimation task. Alternatively, at least either the first estimation task or the second estimation task may be, for example, to estimate future or past attribute values based on the current attribute values. When both the first estimation task and the second estimation task are to estimate future or past attribute values, the first estimation task and the second estimation task may be set so as to estimate different temporal attribute values. In this case, the higher-order estimation task may be to estimate the object based on either of the future or past attribute values. The same applies to a case where n estimation tasks are set.

As specific examples, the estimation system 100 according to the above-described embodiment and the modification thereof may be applied to, for example, a scenario in which an automated driving strategy is determined, a scenario in which a robot operation is determined, a scenario in which visual inspection for products is executed, a scenario in which an object person is evaluated, a scenario in which the state of an object person is diagnosed, a scenario in which plant cultivation conditions are monitored, and the like. In the following, specific examples to which the application scenario is limited will be illustrated.

(A) Scenario in which an Automated Driving Strategy is Determined

Figure 13:
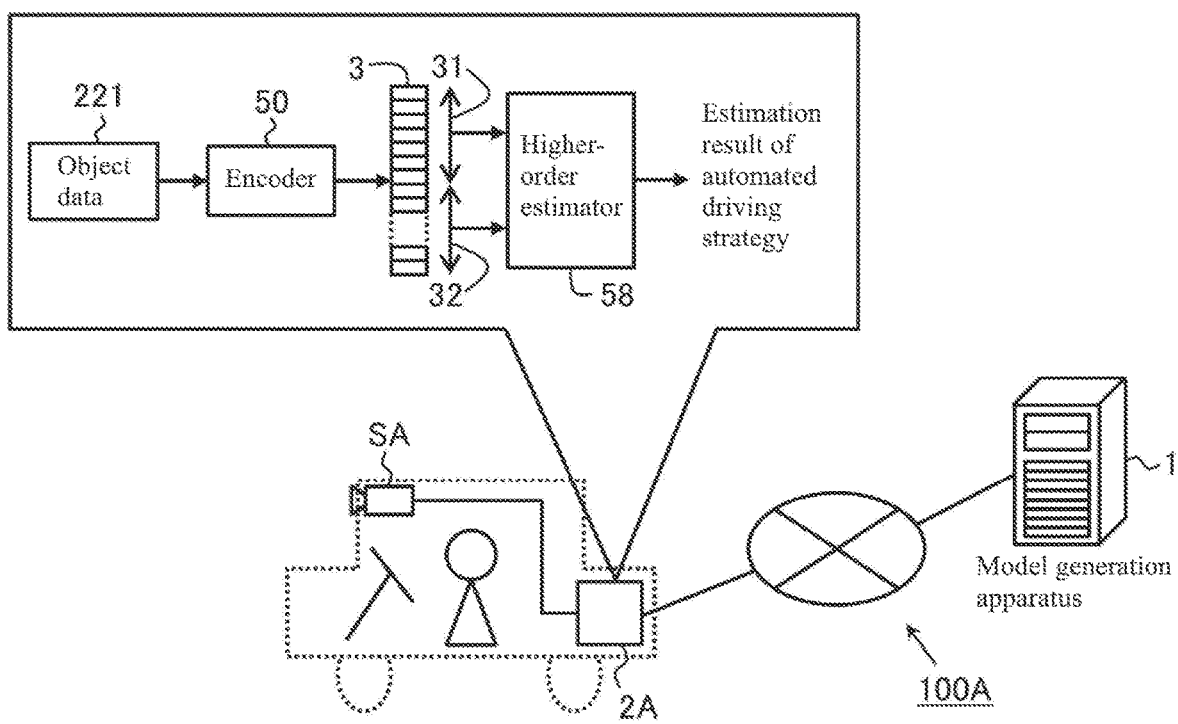
FIG. 13 is a schematic diagram illustrating an example of another scenario to which one or more embodiments is applied.

FIG. 13 schematically illustrates an example of a scenario to which a control system 100A according to a first specific example is applied. The first specific example is an example in which the above-described embodiment is applied to a scenario of determining automated driving strategy using sensing data obtained from an in-vehicle sensor SA. The control system 100A according to the first specific example includes the model generation apparatus 1 and a control apparatus 2A.

Similar to the above-described item <4.1>, a learning model of the first specific example further includes the higher-order estimator 58. Data (training data 121 and object data 221) to be handled in the first specific example may be sensing data obtained by the in-vehicle sensor SA. The type of the in-vehicle sensor SA may be appropriately selected. Examples of in-vehicle sensors SA include an image sensor, a Lidar sensor, a millimeter-wave radar, an ultrasonic sensor, and an acceleration sensor.

In the specific example, at least one of the first estimation task and the second estimation task may be to estimate (including predicting) one or more items relating to the situation of a vehicle. Estimation items relating to the situation of a vehicle may relate to at least either of outside and inside of the vehicle. The situation of outside of the vehicle may represent using, for example, attributes of a physical body present in the surrounding of the vehicle, congestion degree, inter-vehicular distances, risk of accidents, weather, time, attributes of places of roads, or the like. A physical body present in the surrounding of the vehicle may be, for example, a road, a traffic light, an obstacle (human or an object), or the like. Attributes of a road may include, for example, the type of a driving lane, the type of the road (for example, a traffic intersection or an express highway), the state of the road surface, and the like. Attributes of a traffic light may include, for example, the lighting state of the traffic light, and the like. Attributes of an obstacle may include, for example, presence or absent of an obstacle, the type of the obstacle, the size of the obstacle, the speed of the obstacle, an event relating to the obstacle, and the like. An event relating to an obstacle may include, for example, rushing out of a person or a vehicle, sudden acceleration, sudden stoppage, lane change, and the like. Risk of an accident may be expressed by, for example, the type of the accident, and the event probability of the accident. Time may be expressed by a predetermined period of time. For expression of a period of time, an expression method in which the period of time can change with a time zone such as morning, noon, and night may be used, or a fixed expression method such as from 1 o'clock to 2 o'clock may be used. Attributes of a place may include, for example, a type of population density of the place such as urban area or countryside. The situation of the inside of the vehicle may be expressed by, for example, a traveling state of the vehicle, an attribute of a passenger who is on-board of the vehicle, and the like. The traveling state may be expressed by, for example, a change in the traveling operation such as a speed, acceleration, or steering angle. Attributes of a passenger may include, for example, a passenger's state, the number of passengers, positions, identification information thereof, and the like. When both the first estimation task and the second estimation task are to estimate one or more items relating to the state of the vehicle, the first estimation task and the second estimation task may be set so as to estimate one or more items different from each other regarding the state of the vehicle. Alternatively, at least either the first estimation task or the second estimation task may be, for example, to estimate a future or past observation value based on a current observation value of the in-vehicle sensor SA. When both the first estimation task and the second estimation task are to estimate a future or past observation value, the first estimation task and the second estimation task may be set so as to estimate temporal observation values different from each other. On the other hand, the higher-order estimation task may be to estimate an operation instruction for the vehicle depending on the state of the vehicle, that is, to determine an automated driving strategy. The operation instruction may be defined by, for example, an acceleration amount, a braking amount, a handle steering angle, lighting of lights, use of klaxon, and the like. The correct answer data 122 to 124 may be appropriately configured to indicate correct answers of the corresponding estimation tasks.

In addition thereto, the configuration of the first specific example may be the same as the above-described embodiment and the modification. In the first specific example, the model generation apparatus 1 can generate a trained machine learning model (an encoder 50 and a higher-order estimator 58) that can be used to determine an automated driving strategy, using the same procedure as that of the above-described embodiment. The machine learning model may include the mask generator 56. The same applies to the following specific examples. Note that learning result data indicating the generated and trained machine learning model may be provided to the control apparatus 2A at an appropriate timing.

The control apparatus 2A is a computer configured to control operations of the vehicle, using the trained encoder 50 and higher-order estimator 58. The hardware configuration and software configuration of the control apparatus 2A May be the same as that of the above-described estimation apparatus 2. The in-vehicle sensor SA may be connected to the control apparatus 2A via an external interface or a communication interface. The control apparatus 2A may be an information processing apparatus specifically designed for the service to be provided, or may also be a general-purpose computer, an in-vehicle apparatus, or the like.

The control apparatus 2A can determine an automated driving strategy, using the same procedure as that of the above-described estimation apparatus 2. That is to say, in step S201, the control unit of the control apparatus 2A acquires object data 221 from the in-vehicle sensor SA. In step S202, using the trained encoder 50 and higher-order estimator 58, the control unit determines an automated driving strategy based on the object data 221. In step S203, the control unit controls an operation of the vehicle, based on an operation instruction for the determined strategy.

Features

According to the first specific example, with machine learning of the model generation apparatus 1, it is possible to construct a trained encoder 50 and higher-order estimator 58 that are likely to clarify, if an error occurs in an estimation result, the reason of the error. That is to say, in the control apparatus 2A, if determination of an automated driving strategy has any defect, the portions (31, 32) of the feature amounts 3 are referenced. As a result of referencing them, if it is found that at least either the first portion 31 or the second portion 32 does not have an appropriate value, that is, if it is found that an error has occurred in the estimation relating to the state of the vehicle, it is possible to clarify the reason why determination of an automated driving strategy has a defect.

Note that, in the first specific example, the higher-order estimation task may be replaced by estimating a state of the vehicle that is more complicated than those of the first estimation task and the second estimation task. Accordingly, the control apparatus 2A may be paraphrased as "monitoring apparatus". Also, the vehicle may be replaced by an autonomously flying object such as e.g., a drone.

(B) Scenario in which Operation of Robot is Determined

Figure 14:
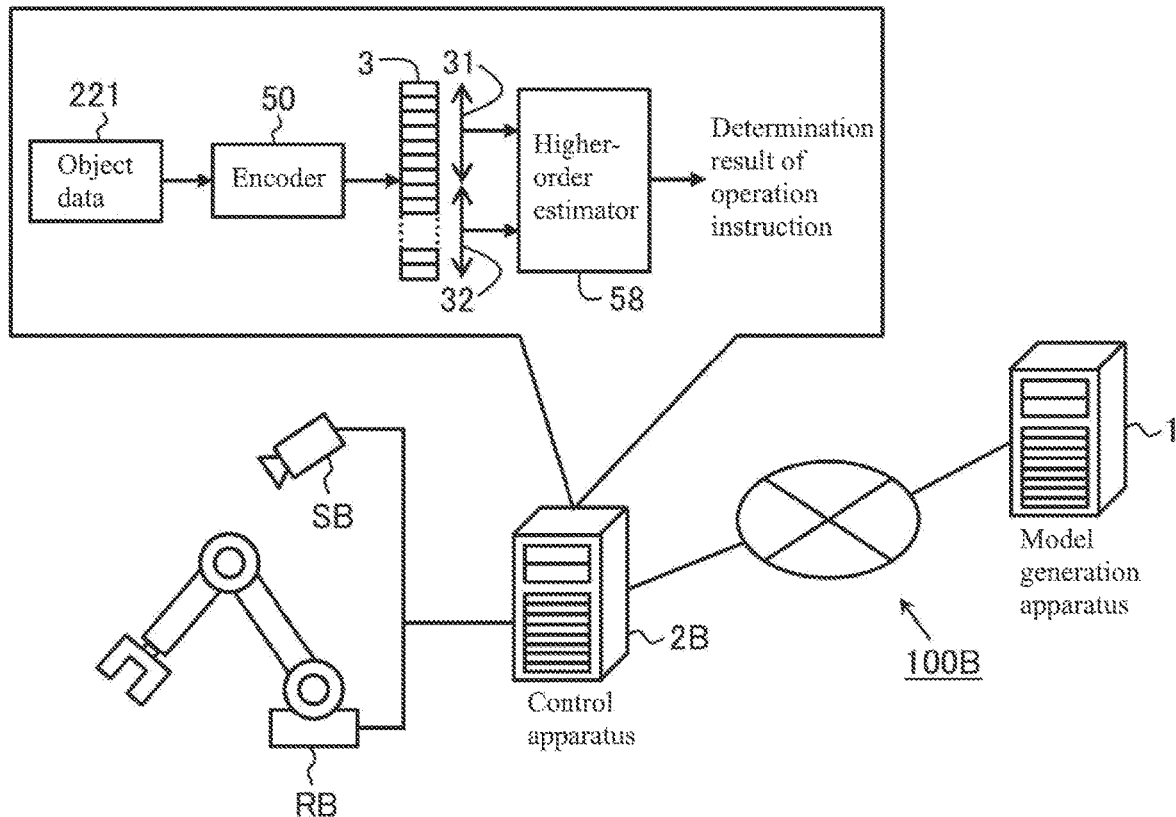
FIG. 14 is a schematic diagram illustrating an example of yet another scenario to which one or more embodiments is applied.

FIG. 14 schematically illustrates an example of a scenario to which a control system 100B according to a second specific example is applied. The second specific example is an example in which the above-described embodiment is applied to a scenario of determining an operation of a robot apparatus RB using sensing data obtained from a sensor SB. The control system 100B according to the second specific example includes a model generation apparatus 1 and a control apparatus 2B.

Similar to the above-described item <4.1>, the learning model of the second specific example further includes the higher-order estimator 58. Data (training data 121 and object data 221) to be handled in the second specific example may be sensing data obtained by the sensor SB. The type of the sensor SB may be appropriately selected. The sensor SB may be, for example, an image sensor (camera), a near-infrared image sensor, a microphone, an acceleration sensor, a touch sensor, a kinesthetic sensor, a nearby sensor, a torque sensor, a pressure sensor, a range sensor, a temperature sensor, an illuminance sensor, or the like. The sensor SB may be arranged as appropriate so as to observe the state of the robot apparatus RB. The type of the robot apparatus RB may be selected as appropriate depending on the embodiment. The robot apparatus RB may be, for example, an industrial robot such as a vertical articulated robot, a scalar robot, a parallel link robot, an orthogonal robot, or a cooperating robot. Alternatively, the robot apparatus RB may be an autonomous robot such as a communication robot that communicates with human.

In the second specific example, at least one of the first estimation task and the second estimation task may be to estimate (including predicting) one or more items relating to the robot apparatus RB. Estimation items relating to the situation of the robot apparatus RB may relate to at least either of outside and inside of the robot apparatus RB. The state of the robot apparatus RB may be expressed by, for example, work attributes, obstacle attributes, operator attributes, or the like. Works may be, for example, objects to be subjected to operations of the robot apparatus RB such as processing or transportation. Attributes of works and obstacles may include, for example, type, position, inclination, shape, size, weight, texture, event, and the like. An obstacle may be, for example, a robot apparatus other than the robot apparatus RB. In this case, the robot apparatus RB and the other robot apparatus may be configured to be able to communicate with each other, and obstacle attributes may include, for example, internal variables of the other robot apparatus, operations of the other robot apparatus (for example, messages from the other robot apparatus), and the like. As an example of an estimation task, a reaction (such as message output, for example) of the other robot apparatus to an operation of the robot apparatus RB may be predicted. A message may be transmitted to the robot apparatus RB from the other robot apparatus by a method such as communication, visual presentation, sound presentation, vibration presentation, or the like. The operator attributes may include, for example, position, body length, pose, operation content, sleepiness degree, fatigue degree, composure degree, level of skills, visual lines, and the like. The internal state of the robot apparatus RB may be expressed by, for example, the state of a driving unit (such as an end effector and a joint) the type of operations to be executed, and the like. When both the first estimation task and the second estimation task are to estimate one or more items relating to the state of the robot apparatus RB, the first estimation task and the second estimation task may be set so as to estimate one or more items different from each other regarding the state of the robot apparatus RB. Alternatively, at least either the first estimation task or the second estimation task may be, for example, to estimate a future or past observation value based on a current observation value of the sensor SB. When both the first estimation task and the second estimation task are to estimate a future or past observation value of the sensor SB, the first estimation task and the second estimation task may be set so as to estimate temporal observation values different from each other. On the other hand, the higher-order estimation task may be to estimate an operation instruction for the robot apparatus RB depending on the state of the robot apparatus RB, that is, to determine an operation of the robot apparatus RB. The operation instruction may be defined by, for example, the driving amount of the driving unit, signal output, information output, or the like. Signal output or information output may include, for example, transmitting data to a server, outputting sound, displaying information on a display device, lighting an indicating light, projecting information using a projector, vibrating an oscillator depending on information content, and the like.

In addition thereto, the configuration of the second specific example may be the same as the above-described embodiment and the modification. In the second specific example, the model generation apparatus 1 can generate a trained machine learning model (the encoder 50 and the higher-order estimator 58) that can be used to determine an operation of the robot apparatus RB, using the same procedure as that of the above-described embodiment. The learning result data indicating the generated and trained machine learning model may be provided to the control apparatus 2B at an appropriate timing.

The control apparatus 2B is a computer configured to control the operation of the robot apparatus RB, using the trained encoder 50 and higher-order estimator 58. The hardware configuration and software configuration of the control apparatus 2B may be the same as that of the above-described estimation apparatus 2. The sensor SB and the robot apparatus RB may be connected to the control apparatus 2B via an external interface or a communication interface. Also, the robot apparatus RB may also include a dedicated controller. In this case, the control apparatus 2B may be connected to the robot apparatus RB via the dedicated controller. Also, the control apparatus 2B may be an information processing apparatus specifically designed for the service to be provided, or may also be a general-purpose computer, a mobile phone including a smart-phone, a PLC (programmable logic controller), or the like.

The control apparatus 2B can determine an operation of the robot apparatus RB, using the same procedure as that of the above-described estimation apparatus 2. That is to say, in step S201, the control unit of the control apparatus 2B acquires object data 221 from the sensor SB. In step S202, the control unit uses the trained encoder 50 and higher-order estimator 58, to determine an operation instruction for the robot apparatus RB based on the object data 221. In step S203, the control unit controls an operation of the robot apparatus RB, based on the determined operation instruction.

Features

According to the first specific example, with machine learning of the model generation apparatus 2, it is possible to construct a trained encoder 50 and higher-order estimator 58 that are likely to clarify, if an error occurs in an estimation result, the reason of the error. That is to say, in the control apparatus 2B, if determination of an operation of the robot apparatus RB has any defect, the portions (31, 32) of the feature amounts 3 are referenced. As a result of referencing them, if it is found that at least either the first portion 31 or the second portion 32 does not have an appropriate value, that is, if it is found that an error has occurred in the estimation relating to the state of the robot apparatus RB, it is possible to clarify the reason why determination of an operation of the robot apparatus RB has a defect.

(C) Scenario in which Visual Inspection of Products is Executed

Figure 15:
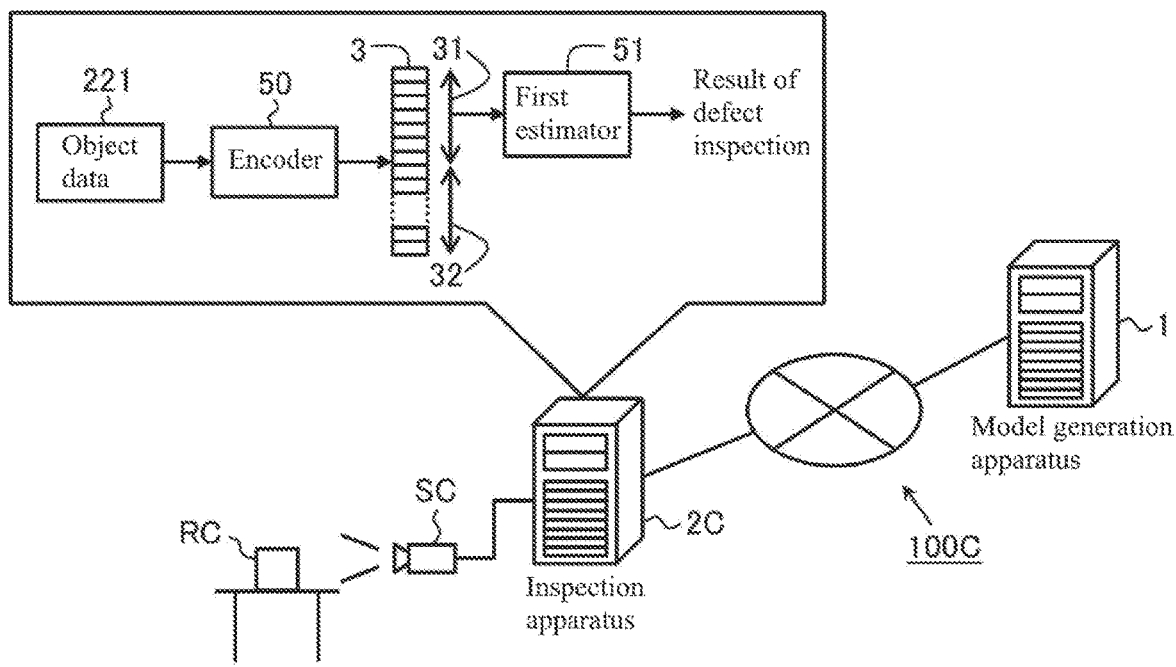
FIG. 15 is a schematic diagram illustrating an example of yet another scenario to which one or more embodiments is applied.

FIG. 15 schematically illustrates an example of a scenario to which an inspection system 100C according to a third specific example is applied. The third specific example is an example in which the above-described embodiment is applied to a scenario in which visual inspection of a product RC is executed using image data obtained from a camera SC. The inspection system 100C according to the third specific example includes the model generation apparatus 1 and an inspection apparatus 2C.

Data (training data 121 and object data 221) to be handled in the third specific example may be image data obtained by the camera SC. The type of the camera SC does not need to be particularly limited, and may be selected as appropriate depending on the embodiment. The camera SC may be a general-purpose RGB camera, a depth camera, an infrared camera, or the like. The camera SC may be placed appropriately at a position at which it can shoot the product RC.

Note that the product RC may be a product conveyed by a production lines, such as an electronic device, an electronic part, an automobile part, a drug, or food, for example. The electronic part may be, for example, a substrate, a chip capacitor, a liquid crystal, a winding of a relay, or the like. The automobile part may be, for example, a con rod, a shaft, an engine block, a power window switch, a panel, or the like. The drug may be, for example, a packed pill, an unplaced pill, or the like. The product RC may be a final product generated after the completion of a production process, an intermediate product generated during the production process, or an initial product prepared before the production process.

In the third specific example, the first estimation task is to perform estimation relating to a defect of the product RC. The defect may be, for example, a blemish, an impurity, a crack, a dent, a burr, color irregularity, a contamination, or the like. Estimation relating to the defect may be expressed by, for example, determining whether or not the product RC includes a defect, determining the probability that the product RC includes a defect, identifying the type of a defect included in the product RC, specifying the range of a defect included in the product RC, or a combination thereof. On the other hand, the second estimation task may be set as appropriate so as to be different from the first estimation task. The second estimation task may be, for example, to estimate the environment of the visual inspection such as the type of the product RC, the identifier of the production factory, the type of the production line, shooting conditions, lighting conditions, and disturbance/ambient light conditions. The shooting conditions may be defined by settings of the camera SC, a shooting angle, a relative layout in shooting, or the like. Settings of the camera SC may be defined by, for example, an aperture value, a shutter speed, a focus distance, zoom magnification or the like. A relative layout in shooting may be defined by, for example, the position/pose of the product RC within a field of view of the camera, the distance between the camera SC and the product RC, and the like. Lighting conditions may be defined by, for example, a direction of the lighting to the product RC, the spectrum of the lighting, polarization of light, and the like. Disturbance/ambient light conditions may be defined by, for example, influence of a ceiling light inside a building, influence of natural light from windows, and the like. Alternatively, the second estimation task may be to estimate the identity of input data, similar to the above-described embodiment. The identity may be identified by, for example, the rot number of the product RC, or the like.

In addition thereto, the configuration of the third specific example may be the same as the above-described embodiment and the modification. In the third specific example, the model generation apparatus 1 can generate a trained machine learning model (the encoder 50 and the first estimator 51) that can be used in visual inspection of the product RC, using the same procedure as that of the above-described embodiment. The learning result data indicating the generated and trained machine learning model may be provided to the inspection apparatus 2C at an appropriate timing.

The inspection apparatus 2C is a computer configured to execute visual inspection of the product RC, using the trained encoder 50 and first estimator 51. The hardware configuration and software configuration of the inspection apparatus 2C may be the same as that of the above-described estimation apparatus 2. The camera SC may be connected to the inspection apparatus 2C via an external interface or a communication interface. The inspection apparatus 2C may be an information processing apparatus specifically designed for the service to be provided, or may also be a general-purpose computer, an PLC, or the like.

The inspection apparatus 2C can perform visual inspection of the product RC, using the same procedure as that of the above-described estimation apparatus 2. That is to say, in step S201, the control unit of the inspection apparatus 2C acquires object data 221 from the camera SC. In step S202, the control unit uses the trained encoder 50 and first encoder 51, to execute estimation relating to a defect of the product RC appearing in the object data 221.

In step S203, the control unit outputs information regarding a result of estimation of a defect of the product RC. For example, the control unit may directly output the estimation result relating to a defect of the product RC to the output apparatus. Also, for example, if it is determined that the product RC includes a defect, the control unit may output a warning for notifying this fact to the output apparatus. Also, when the inspection apparatus 2C is connected to a conveyor apparatus for conveying the products RC, the control unit may control the conveyor apparatus based on the result of the defect estimation, such that products RC with defects and products RC without defects are conveyed on different lines.

Features

According to the third specific example, with machine learning of the model generation apparatus 1, a trained machine learning model can be generated that has relatively high explainability for computation content. In the inspection apparatus 2C, it is possible to make execution of the estimation task relating to a defect of the product RC (that is, visual inspection of the product RC) unlikely to be affected by information relating to the second estimation task. When visual inspection is executed in an unknown environment (for example, a factory different from a factory in which the training data 121 was obtained), there is a possibility that estimation accuracy using a trained machine learning model deteriorates due 5 to a difference between this unknown environment and the learning environment in which the training data was obtained. To address this problem, in the third specific example, by estimating the visual inspection environment for the second estimation task, it is possible to make the visual inspection of the product RC unlikely to be affected by information relating to this environment. With this, it is possible to improve the accuracy of the visual inspection of the product RC.

Note that when visual inspection is executed in an unknown environment, by using information relating to the environment, it is possible to expect an improvement in the accuracy of the visual inspection. Therefore, similar to the first specific example and the second specific example, the learning model of the third specific example may further include the higher-order estimator 58. In this case, the higher-order estimation task is to perform estimation relating to a defect of the product RC. In this case, the first estimation task and the second estimation task may be to estimate one or more different items relating to an environment of the visual inspection. With this, it is possible to expect an improvement in the accuracy of visual inspection in an unknown environment.

(D) Scenario in which Object Person is Evaluated

Figure 16:
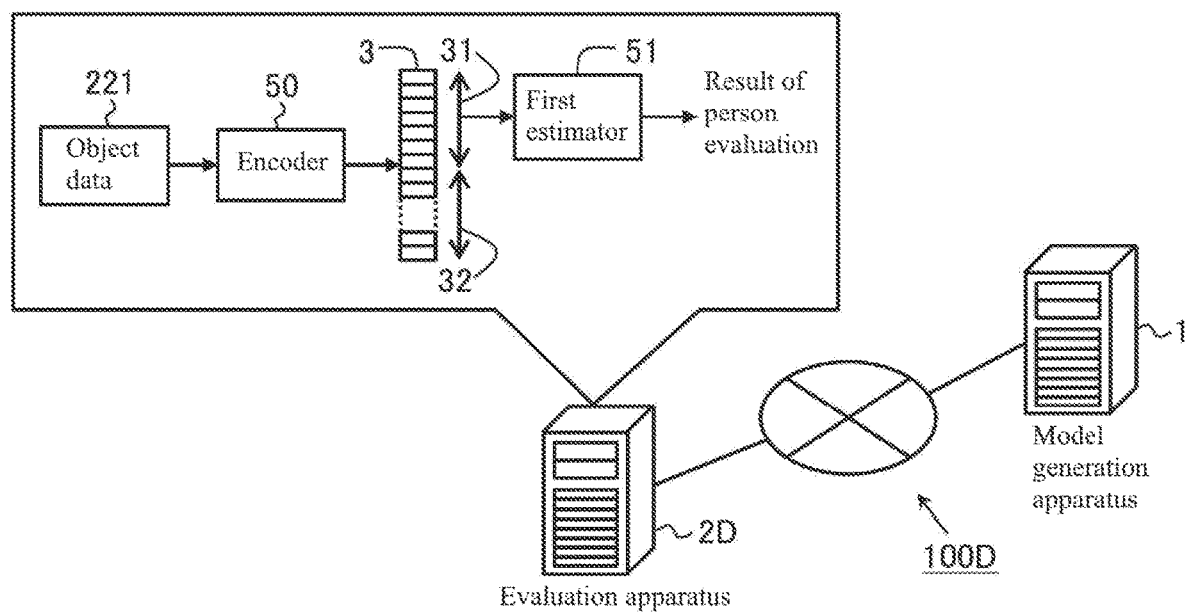
FIG. 16 is a schematic diagram illustrating an example of yet another scenario to which one or more embodiments is applied.

FIG. 16 schematically illustrates an example of a scenario to which an evaluation system 100D according to a fourth specific example is applied. The fourth specific example is an example in which the above-described embodiment is applied to a scenario in which data relating to object person (hereinafter, referred to as "personal data") is used to evaluate an object person. The evaluation system 100D according to the fourth specific example includes the model generation apparatus 1 and an evaluation apparatus 2D.

Data (training data 121 and object data 221) to be handled in the fourth specific example may be personal data available for evaluation. Personal data may include information relating to, for example, a carrier of the object person, results of body measurement, health checking data, test/questionnaire answers, presence or absence of qualifications (for example, various licenses), and the like. This information may be obtained by image data. Also, personal data may include image data in which the object person is appearing, and sound data of recorded voice of the object person. Personal data may be acquired as appropriate using an input apparatus, a scanner, or the like.

In the fourth specific example, the first estimation task may be to determine an evaluation point of the object person. Determining an evaluation point of the object person may be, for example, to determine whether or not to recruit the object person, to determine whether or not the object person is suitable for an object service, and the like. On the other hand, the second estimation task may be to estimate attributes that are not supposed to bias the evaluation, such as, for example, gender of the object person, race, hometown, nationality, relation's occupation, thinking, ideology, medical history, debt state, existence/absence of a disability, age, and appearance.

In addition thereto, the configuration of the fourth specific example may be the same as the above-described embodiment and the modification. In the fourth specific example, the model generation apparatus 1 can generate a trained machine learning model (the encoder 50 and the first estimator 51) that can be used to evaluate an object person, using the same procedure as that of the above-described embodiment. The learning result data indicating the generated and trained machine learning model may be provided to the evaluation apparatus 2D at an appropriate timing.

The evaluation apparatus 2D is a computer configured to evaluate an object person, using the trained encoder 50 and first estimator 51. The hardware configuration and software configuration of the evaluation apparatus 2D may be the same as that of the above-described estimation apparatus 2. The evaluation apparatus 2D may be an information processing apparatus specifically designed for the service to be provided, or may also be a general-purpose computer (such as e.g., a tablet terminal or a desktop PC), a mobile phone including a smart-phone, or the like.

The evaluation apparatus 2D can evaluate an object person, using the same procedure as that of the above-described estimation apparatus 2. That is to say, in step S201, the control unit of the evaluation apparatus 2D acquires object data 221 constituted by personal data of the object person. In step S202, the control unit uses the trained encoder 50 and first estimator 51, to evaluate an object person based on the object data 221. In step S203, the control unit outputs information relating to a result of the evaluation of the object person.

Features

According to the fourth specific example, with machine learning of the model generation apparatus 1, a trained machine learning model can be generated that has relatively high explainability for computation content. In the evaluation apparatus 2D, it is possible to make execution of the estimation task relating to evaluation of an object person unlikely to be affected by information relating to the second estimation task. As described above, by setting the second estimation task as being to estimate attributes that are not supposed to bias the evaluation, it is possible to make evaluation of an object person unlikely to be biased by attributes thereof. Accordingly, it is possible to suppress undesired determination standards from being formed, preventing unexpected evaluation.

(E) Scenario in which a State of an Object Person is Diagnosed

Figure 17:
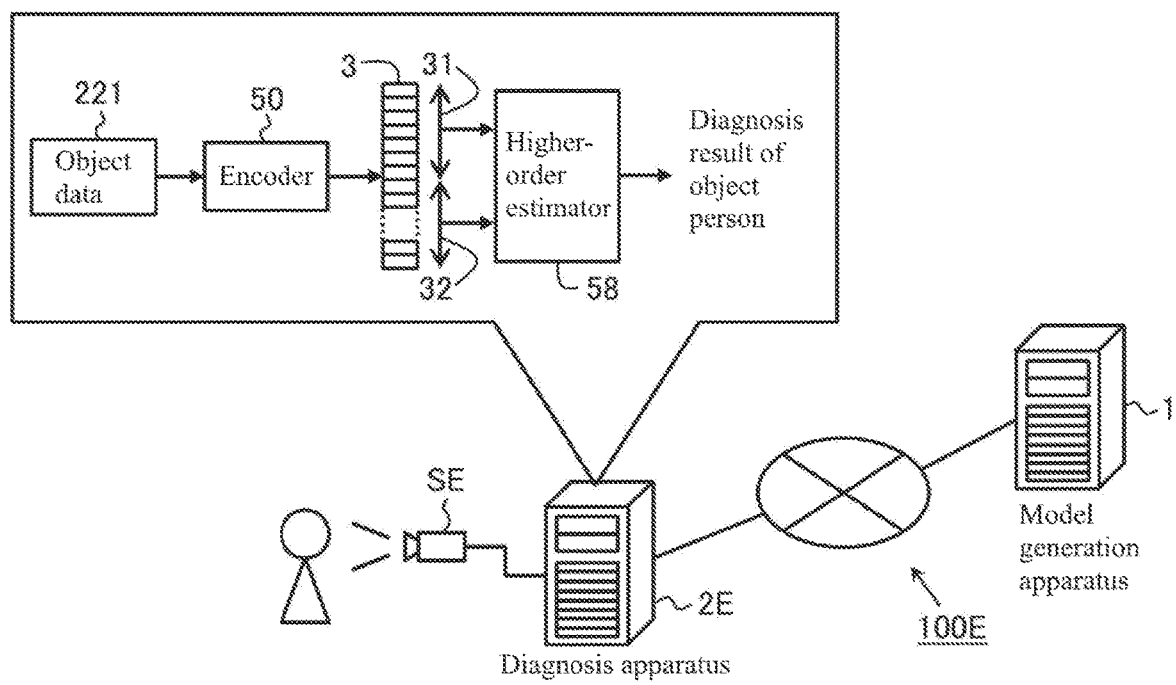
FIG. 17 is a schematic diagram illustrating an example of yet another scenario to which one or more embodiments is applied.

FIG. 17 schematically illustrates an example of a scenario to which a diagnosis system 100E according to a fifth specific example is applied. The fifth specific example is an example in which the above-described embodiment is applied to a scenario of diagnosing the state of an object person, using sensing data obtained from a sensor SE. The diagnosis system 100E according to the fifth specific example includes the model generation apparatus 1 and a diagnosis apparatus 2E.

Similar to the above-described item <4.1>, the learning model of the fifth specific example further includes the higher-order estimator 58. Data (training data 121 and object data 221) to be handled in the fifth specific example may be sensing data obtained by the sensor SE. The sensor SE does not need to be particularly limited as long as it can observe the state of an object person. The sensor SE may be, for example, a camera, an infrared sensor, a pressure sensor, a pressure distribution sensor, a microphone, a vital sensor, a medical test apparatus, or the like. Examples of vital sensors include a blood-pressure meter, a pulse monitor, a pulse rate meter, an electrocardiographic monitor, an electromyograph, a clinical thermometer, an electric skin resistance meter, a micro-wave sensor, an electroencephalograph, an activity meter, a blood sugar meter, an electro-oculography meter, and an eyeball movement measurement apparatus. A medical test apparatus may be, for example, a CT apparatus, an MRI apparatus, or the like.

In the fifth specific example, at least one of the first estimation task and the second estimation task may be to estimate (including predicting) one or more items relating to attributes of an object person. Estimation items relating to attributes of an object person may be, for example, a pose, facial expression, follow of eyeball movement against external stimulus and contractile responsiveness of pupils, cooperation between eyeball movement and head pose, respondence to sound, body length, weight, race, gender, lifestyle habit, or the like. When both the first estimation task and the second estimation task are to estimate one or more items relating to attributes of an object person, the first estimation task and the second estimation task may be set so as to estimate one or more items different from each other regarding attributes of the object person. Alternatively, at least either the first estimation task or the second estimation task may be, for example, to estimate a future or past observation value of the sensor SE based on current observation values of the sensor SE. When both the first estimation task and the second estimation task are to estimate a future or past observation value of the sensor SE, the first estimation task and the second estimation task may be set so as to estimate temporal observation values different from each other. On the other hand, the higher-order estimation task may be to estimate the health condition of the object person. Estimating the health condition of the object person may be, for example, constituted by determining whether or not he or she enjoys good health, determining whether or not he or she appears to get sick, identifying the type of his or her health condition, determining the provability of getting an object disease, or a combination thereof. Also, the object person may be the driver of a vehicle, and the scenario in which the state of the object person is estimated may be a scenario in which the state of the driver of a vehicle is estimated. In this case, estimating the health condition of the object person may be, for example, diagnosing the driving capability of the driver such as sleepiness degree, fatigue degree, and composure degree. Alternatively, the object person may be an operator who is operating in a factory or the like, and the scenario in which the health condition of the object person is estimated may be a scenario in which the state of the operator is estimated. In this case, estimating the health condition of the object person may be, for example, diagnosing the performance of the operator about operations, such as sleepiness degree, fatigue degree, and composure degree. The correct answer data 122 to 124 may be appropriately configured to indicate correct answers of the corresponding estimation tasks.

In addition thereto, the configuration of the fifth specific example may be the same as the above-described embodiment and the modification. In the fifth specific example, the model generation apparatus 1 can generate a trained machine learning model (the encoder 50 and the higher-order estimator 58) that can be used to diagnose the state of an object person (that is, estimation of the health condition), using the same procedure as that of the above-described embodiment. The learning result data indicating the generated and trained machine learning model may be provided to the diagnosis apparatus 2E at an appropriate timing.

The diagnosis apparatus 2E is a computer configured to diagnose the state of an object person, using the trained encoder 50 and higher-order estimator 58. The hardware configuration and software configuration of the diagnosis apparatus 2E may be the same as those of the above-described estimation apparatus 2. The sensor SE may be connected to the diagnosis apparatus 2E via an external interface or a communication interface. The diagnosis apparatus 2E may be an information processing apparatus specifically designed for the service to be provided, or may also be a general-purpose computer, a mobile phone including a smart-phone, or the like.

The diagnosis apparatus 2E can estimate the health condition of the object person, using the same procedure as that of the above-described estimation apparatus 2. That is to say, in step S201, the control unit of the diagnosis apparatus 2E acquires object data 221 from the sensor SE. In step S202, the control unit uses the trained encoder 50 and higher-order estimator 58, to estimate the health condition of the object person based on the object data 221. In step S203, the control unit outputs information relating to the result of the evaluation of the health condition of the object person.

Features

According to the first specific example, with machine learning of the model generation apparatus 5, it is possible to construct a trained encoder 50 and higher-order estimator 58 that are likely to clarify, if an error occurs in an estimation result, the reason of the error. That is to say, in the diagnosis apparatus 2E, if an error occurs in a result of estimating the health condition of the object person, it is possible to verify the cause of the error with reference to the portions (31, 32) of the feature amounts 3.

Note that, in the fifth specific example, the diagnosis system 100E may be configured to execute the first estimation task, instead of executing the higher-order estimation task. In this case, the first estimation task may be to estimate the health condition of the object person. On the other hand, the second estimation task may be to estimate the observation conditions for the sensor SE. The observation conditions may be defined by, for example, the model number of the sensor SE, the position at which the sensor SE is arranged, or the like. With this, it is possible to make execution of the first estimation task unlikely to be affect by information relating to observation conditions. As a result, it is possible to execute the first estimation task in a robust manner. Alternatively, the second estimation task may be to estimate the identity of input data (training data 121, the object data 221).

(F) Scenario in which Cultivation Conditions of a Plant are Monitored

Figure 18:
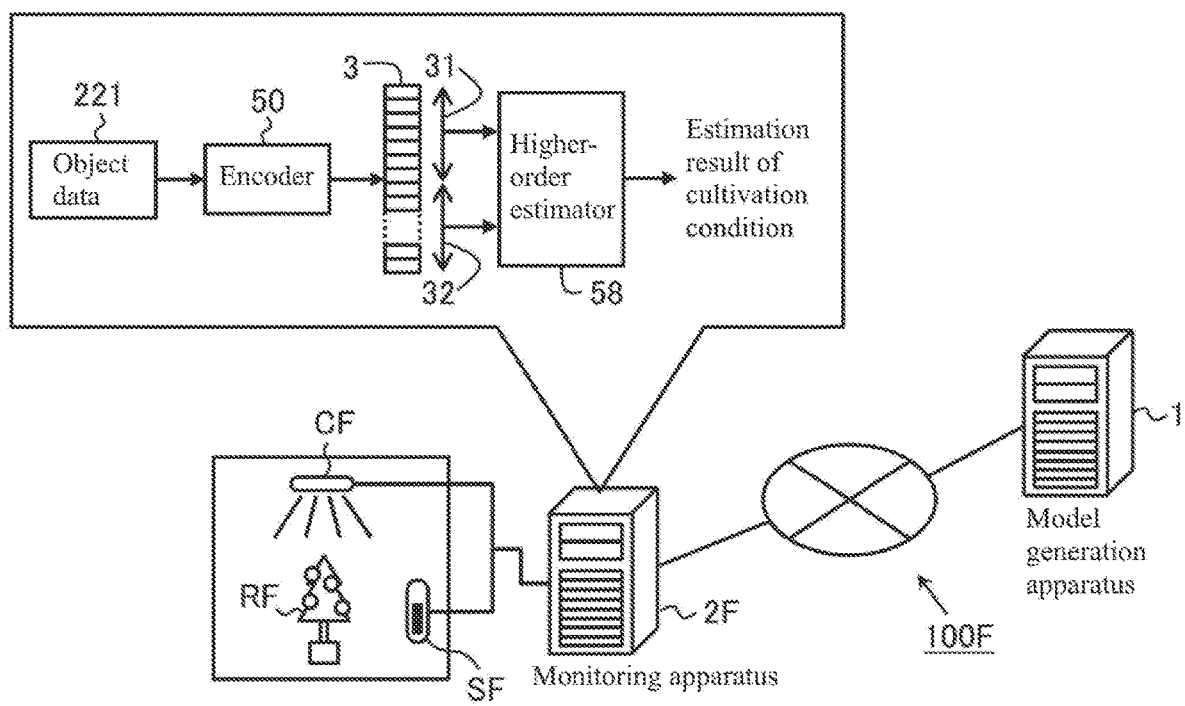
FIG. 18 is a schematic diagram illustrating an example of yet another scenario to which one or more embodiments is applied.

FIG. 18 schematically illustrates an example of a scenario to which a monitoring system 100F according to a sixth specific example is applied. The sixth specific example is an example in which the above-described embodiment is applied to a scenario in which cultivation conditions of a product RF are monitored. The monitoring system 100F according to the sixth specific example includes the model generation apparatus 1 and a monitoring apparatus 2F.

Similar to the above-described item <4.1>, the learning model of the sixth specific example further includes the higher-order estimator 58. Data to be handled in the sixth specific example may be constituted by sensing data generated by an environment sensor SF, observation data of the plant RF obtained by inputs of an operator, or a combination thereof. The type of the environment sensor SF does not need to be particularly limited as long as the environment sensor SF can observe the cultivation conditions of the plant RF, and may be selected as appropriate depending on the embodiment. Examples of environment sensors SF include a barometer, a thermometer, a hygrometer, a sound pressure meter, a sound sensor, an ultraviolet sensor, an illuminometer, an ombrometer, a gas sensor, and a soil sensor. The type of the plant RF may be appropriately selected. The observation data may be constituted by, for example, operation recording data, environment recording data, or a combination thereof. The operation recording data may be constituted by information indicating, for example, presence or absence of operations such as flower picking, leaf picking, and sprout picking, and date and amounts of execution thereof. Also, the environment recording data may be constituted by information indicating results of an operator observing environments (for example, weather, temperature, humidity, and the like) of the plant RF.

In the sixth specific example, at least one of the first estimation task and the second estimation task may be, for example, to estimate one or more items relating to basic cultivation conditions such as presence or absence of a disease, the number of berries/flowers, the degree of the growth of leaves, the nutrient state, light irradiation time for the plant RF, the temperature in the surroundings of the plant RF, or the amount of water to be given to the plant RF. When both the first estimation task and the second estimation task are to estimate one or more items relating to the cultivation conditions, the first estimation task and the second estimation task may be set so as to estimate one or more items different from each other regarding the cultivation conditions. Alternatively, at least either the first estimation task or the second estimation task may be, for example, to estimate a future or past observation value based on a current observation value of the environment sensor SF. When both the first estimation task and the second estimation task are to estimate a future or past observation value of the environment sensor SF, the first estimation task and the second estimation task may be set so as to estimate temporal observation values different from each other. In contrast, the higher-order estimation task may be to estimate higher-order cultivation conditions such as, for example, the harvest amount of the plant RF, harvest time, market value (market price), optimal growth environment (with, for example, the maximal harvest amount), or operation content. The higher-order estimation task may be to estimate a control instruction on a cultivation apparatus CF configured to control the growth environment of the plant RF, based on an estimation result of the basic cultivation conditions of the plant RF, for example. The cultivation apparatus CF may be, for example, a curtain apparatus, a lighting apparatus, air-conditioning equipment, a sprinkler system, or the like. The curtain apparatus is configured to open and close curtains provided on windows of a building. The lighting apparatus is, for example, an LED (light emitting diode) lighting, fluorescent bulb, or the like. The air-conditioning equipment may be, for example, an air conditioner or the like. The sprinkler system may be, for example, a sprinkler or the like. The curtain apparatus and the lighting apparatus are used to control a time period for which the plant RF is irradiated with light. The air-conditioning equipment is used to control the temperature in the surroundings of the plant RF. The sprinkler system is used to control the amount of water to be given to the plant RF. The correct answer data 122 to 124 may be appropriately configured to indicate correct answers of the corresponding estimation tasks.

In addition thereto, the configuration of the sixth specific example may be the same as the above-described embodiment and the modification. In the sixth specific example, the model generation apparatus 1 can generate a trained machine learning model (the encoder 50 and the higher-order estimator 58) that can be used to observe the cultivation conditions of the plant RF, using the same procedure as that of the above-described embodiment. The learning result data indicating the generated and trained machine learning model may be provided to the monitoring apparatus 2F at an appropriate timing.

The monitoring apparatus 2F is a computer configured to monitor the cultivation conditions of the plant RF, using the trained encoder 50 and higher-order estimator 58. The hardware configuration and software configuration of the monitoring apparatus 2F may be the same as those of the above-described estimation apparatus 2. The environment sensor SF may be connected to the monitoring apparatus 2F via an external interface or a communication interface. The monitoring apparatus 2F may be an information processing apparatus specifically designed for the service to be provided, or may also be a general-purpose computer, a general-purpose server apparatus, or the like.

The monitoring apparatus 2F can monitor the cultivation conditions of the plant RF, using the same procedure as that of the above-described estimation apparatus 2. That is to say, in step S201, the control unit of the monitoring apparatus 2F acquires object data 221 constituted by sensing data generated by the environment sensor SF, observation data obtained by an operator, or a combination thereof. In step S202, the control unit uses the trained encoder 50 and higher-order estimator 58, to estimate the cultivation conditions of the plant RF based on the object data 221. In step S203, the control unit outputs results obtained by estimating the cultivation conditions of the plant RF. For example, if the optimal growth environment or operation content is estimated as a higher-order estimation task, the control unit may output the estimation result to prompt the manager of the plant RF to operate a cultivation apparatus CF. Also, for example, if a control instruction on the cultivation apparatus CF according to the cultivation conditions of the plant RF is estimated, the control unit may also give a control instruction obtained by the estimation result to the cultivation apparatus CF to control the operations of the cultivation apparatus CF.

Features

According to the first specific example, with machine learning of the model generation apparatus 1, it is possible to construct a trained encoder 50 and higher-order estimator 58 that are likely to clarify, if an error occurs in an estimation result, the reason of the error. That is to say, in the monitoring apparatus 2F, if an error occurs in a result of estimating the cultivation conditions of the plant RF, it is possible to verify the cause of the error with reference to the portions (31, 32) of the feature amounts 3.

Note that, in the sixth specific example, the monitoring system 100F may be configured to execute the first estimation task, instead of executing the higher-order estimation task. In this case, the first estimation task may be to estimate cultivation conditions such as, for example, the harvest amount of the plant RF, harvest time, market value (market price), optimal growth (with, for example, the maximal harvest amount). Alternatively, the first estimation task may be to estimate a control instruction on the cultivation apparatus CF that is optimal for the cultivation of the plant RF, for example. On the other hand, the second estimation task may be to estimate the observation conditions for the environment sensor SF. The observation conditions may be defined by, for example, the model number of the environment sensor SF, the type of the environment sensor SF, the cultivation place (such as e.g., a farm, a PVC greenhouse, the position and latitude/longitude within the PVC greenhouse), or the like. With this, it is possible to make execution of the first estimation task unlikely to be affected by information relating to observation conditions. As a result, it is possible to execute the first estimation task in a robust manner. Alternatively, the second estimation task may be to estimate the identity of input data (training data 121, the object data 221).

<4.8>

In the above-described embodiment, the first estimation task may be to estimate the domain of input data, and the second estimation task may be to estimate the identity of the input data. The domain may be identified according to the data acquisition environment or the like. In this case, machine learning of the first estimation task and the second estimation task may be executed as prior learning. The above-described model generation apparatus 1 may execute machine learning in step S102, then execute additional learning of the second estimator 52 using a plurality of learning data sets obtained at an unknown domain, and use the second estimator 52 for another estimation task. The learning data sets that are used in the additional learning may be generated as appropriate. In the state immediately before the additional learning is executed, the second portion 32 of the feature amounts 3 hardly includes information relating to domains, and can estimate the identity of the input data from the second portion 32. Accordingly, the trained encoder 50 quantizes data given in as small units as possible into feature amounts, but during the quantization, variations due to a difference in domain is eliminated. Therefore, when additional learning is executed using learning data sets of an unknown domain, differences to be learned only include a common bias term of data obtained from the unknown domain relative to the feature in which variation due to the unknown domain is eliminated, and realignment of the feature space quantized in small units in a direction in which the particle size is increased. Accordingly, it is possible to generate the trained second estimator 52 that is capable of executing an estimation task at an unknown domain (that is, shorten the time for additional learning).

INDEX TO THE REFERENCE NUMERALS

1 Model generation apparatus
11 Control unit
12 Storage unit
13 Communication interface
14 External interface
15 Input apparatus
16 Output apparatus
17 Drive
111 Data acquisition unit
112 Learning processing unit
113 Saving processing unit
120 Learning data set
121 Training data
122 First correct answer data
123 Second correct answer data
129 Learning result data
81 Model generation program
91 Storage medium
2 Estimation apparatus
21 Control unit
22 Storage unit
23 Communication interface
24 External interface
25 Input apparatus
26 Output apparatus
27 Drive
211 Data acquisition unit
212 Estimation unit
213 Output unit
221 Object data
5 Learning model
50 Encoder
51 First estimator
52 Second estimator

The invention claimed is:

1. A model generation apparatus comprising a processor having a memory, the processor configured with a program to perform operations comprising:

operation as a data acquisition unit configured to acquire a plurality of learning data sets, each of the learning data sets being constituted by a combination of training data, first correct answer data that indicates a correct answer of a first estimation task with respect to the training data, and second correct answer data that indicates a correct answer of a second estimation task with respect to the training data, the second estimation task being different from the first estimation task; and operation as a learning processing unit configured to execute, by iteratively adjusting computational parameters of a learning model stored in the memory, machine learning of the learning model using the plurality of learning data sets, wherein the learning model comprises an encoder, a first estimator, and a second estimator, the encoder is configured to convert given input data into feature amounts comprising a first portion of the feature amounts associated with the first estimation task and a second portion of the feature amounts associated with the second estimation task, the first estimator is configured to accept first input data from the first portion of the feature amounts, and execute the first estimation task based on the first input data from the first portion of the feature amounts, the first estimation task comprising a regression task to estimate a continuous variable associated with the first input data, the second estimator is configured to accept second input data from the second portion of the feature amounts other than the first portion, and execute the second estimation task based on the second input data from the second portion of the feature amounts, the second estimation task comprising a classification task identifying a category associated with the second input data, and executing the machine learning comprises:

training the encoder, the first estimator, and the second estimator by adjusting the computational parameters so that, when the training data of each of the learning data sets is given to the encoder, a result of the first estimator executing the first estimation task matches the first correct answer data, and a result of the second estimator executing the second estimation task matches the second correct answer data; and training the encoder by adjusting the computational parameters so that, for each of the learning data sets, a correlation between the first portion of the feature amounts and the second correct answer data is lowered, and a correlation between the second portion of the feature amounts and the first correct answer data is lowered.

2. The model generation apparatus according to claim 1, wherein the learning model further comprises a mask generator configured to generate a mask based on an output of the encoder, the processor is configured with the program to perform operations such that executing the machine learning further comprises training the mask generator so that, when the training data of each of the learning data sets is given to the encoder, a result of the first estimator executing the first estimation task matches the first correct answer data, and the first portion is extracted by applying the generated mask to the feature amounts.

3. The model generation apparatus according to claim 2, wherein the processor is configured with the program to perform operations such that training the mask generator comprises executing the training the mask generator at the same time as at least one of the training the encoder, the first estimator, and the second estimator and the training the encoder.

4. The model generation apparatus according to claim 3, wherein the processor is configured with the program to perform operations such that executing the machine learning further comprises training the mask generator so that binarization of elements of the generated mask advances.

5. The model generation apparatus according to claim 2, wherein the processor is configured with the program to perform operations such that executing the machine learning further comprises training the mask generator so that binarization of elements of the generated mask advances.

6. The model generation apparatus according to claim 2, wherein the learning model further comprises a first adversarial estimator and a second adversarial estimator, the first adversarial estimator is configured to accept an input from the first portion of the feature amounts, and execute the second estimation task on the input data based on the input first portion, and the second adversarial estimator is configured to accept an input from the second portion of the feature amounts, and execute the first estimation task on the input data based on the input second portion, and the training the encoder comprises alternately and repeatedly executing:

training the first adversarial estimator and the second adversarial estimator so that, when the training data of each of the learning data sets is given to the encoder, a result of the first adversarial estimator executing the second estimation task matches the second correct answer data, and a result of the second adversarial estimator executing the first estimation task matches the first correct answer data; and training the encoder so that, when the training data of each of the learning data sets is given to the encoder, a result of the first adversarial estimator executing the second estimation task does not match the second correct answer data, and a result of the second adversarial estimator executing the first estimation task does not match the first correct answer data.

7. The model generation apparatus according to claim 1, wherein the learning model further comprises a first adversarial estimator and a second adversarial estimator, the first adversarial estimator is configured to accept an input from the first portion of the feature amounts, and execute the second estimation task on the input data based on the input first portion, and the second adversarial estimator is configured to accept an input from the second portion of the feature amounts, and execute the first estimation task on the input data based on the input second portion, and the training the encoder is constituted by alternately and repeatedly executing:

training the first adversarial estimator and the second adversarial estimator so that, when the training data of each of the learning data sets is given to the encoder, a result of the first adversarial estimator executing the second estimation task matches the second correct answer data, and a result of the second adversarial estimator executing the first estimation task matches the first correct answer data; and training the encoder so that, when the training data of each of the learning data sets is given to the encoder, a result of the first adversarial estimator executing the second estimation task does not match the second correct answer data, and a result of the second adversarial estimator executing the first estimation task does not match the first correct answer data.

8. The model generation apparatus according to claim 1, wherein the learning model further comprises a decoder configured to decode the input data from the feature amounts, and the processor is configured with the program to perform operations such that executing the machine learning further comprises training the encoder and the decoder so that, when the training data of each of the learning data sets is given to the encoder, decoded data obtained by the decoder matches the training data.

9. The model generation apparatus according to claim 8, wherein the training the encoder and the decoder is executed at the same time as at least one of the training the encoder, the first estimator, and the second estimator and the training the encoder.

10. The model generation apparatus according to claim 1, wherein the second estimation task is to estimate an identity of the training data.

11. The model generation apparatus according to claim 10,
wherein the second correct answer data is configured to indicate an identifier of the training data, and
estimating the identity of the training data comprises identifying the identifier.

12. The model generation apparatus according to claim 11,
wherein the identifier comprises a hash value.

13. The model generation apparatus according to claim 11,
wherein the training data of each of the learning data sets is classified, and
the identifier is configured to represent a class to which the training data belongs.

14. The model generation apparatus according to claim 1, wherein
each of the learning data sets further comprises higher-order correct answer data that indicates a correct answer of a higher-order estimation task with respect to the training data,
the learning model further comprises a higher-order estimator,
the higher-order estimator is configured to accept inputs from the first portion and the second portion of the feature amounts, and execute the higher-order estimation task on the input data based on the input first portion and the input second portion, and
the processor is configured with the program to perform operations such that executing the machine learning further comprises training the higher-order estimator so that, when the training data of each of the learning data sets is given to the encoder, a result of the higher-order estimator executing the higher-order estimation task matches the higher-order correct answer data.

15. An estimation apparatus comprising a processor configured with a program to perform operations comprising:
operation as a data acquisition unit configured to acquire object data;
operation as an estimation unit configured to execute, using an encoder and a higher-order estimator that are trained by the model generation apparatus according to claim 14, a higher-order estimation task on the acquired object data; and
operation as an output unit configured to output information relating to an execution result of the higher-order estimation task.

16. An estimation apparatus comprising a processor configured with a program to perform operations comprising:
operation as a data acquisition unit configured to acquire object data;
operation as an estimation unit configured to execute, using an encoder and a first estimator that are trained by the model generation apparatus according to claim 1, a first estimation task on the acquired object data; and
operation as an output unit configured to output information relating to an execution result of the first estimation task.

17. A model generation apparatus comprising a processor having a memory, the processor configured with a program to perform operations comprising:
operation as a data acquisition unit configured to acquire a plurality of learning data sets each constituted by a combination of training data, and n pieces of correct answer data that respectively indicate correct answers of n estimation tasks with respect to the training data; and
operation as a learning processing unit configured to execute, by iteratively adjusting computational parameters of a learning model stored in the memory, machine learning of the learning model using the plurality of learning data sets, wherein
the learning model comprises an encoder and n estimators comprising at least a first estimator and a second estimator,
the encoder is configured to convert given input data into feature amounts comprising a first portion of the feature amounts associated with the first estimation task and a second portion of the feature amounts associated with the second estimation task,
the feature amounts comprises n portions that respectively correspond to the n estimation tasks,
each of the n estimators is assigned to an estimation task of the n estimation tasks,
each of the n estimators is configured to accept an input from the corresponding portion of the feature amounts, and execute the assigned estimation task on the input data based on the input portion,
the first estimator is configured to accept first input data from the first portion of the feature amounts, and execute a first estimation task of the n estimation tasks based on the first input data from the first portion of the feature amounts, the first estimation task comprising a regression task to estimate a continuous variable associated with the first input data,
the second estimator is configured to accept second input data from the second portion of the feature amounts other than the first portion, and execute a second estimation task of the n estimation tasks based on the second input data from the second portion of the feature amounts, the second estimation task comprising a classification task identifying a category associated with the second input data, and
the processor is configured with the program to perform operations such that executing the machine learning comprises:
training the encoder and the n estimators by adjusting the computational parameters so that, when the training data of each of the learning data sets is given to the encoder, a result of each of the n estimators executing the corresponding estimation task matches the corresponding correct answer data; and
training the encoder by adjusting the computational parameters so that, for each of the learning data sets, a correlation between any of the portions of the feature amounts, and n−1 pieces of correct answer data other than the correct answer data that correspond to the estimation task corresponding to that portion of the feature amounts is lowered, and n is three or more.

18. The model generation apparatus according to claim 17,
wherein one of the n estimation tasks is to estimate an identity of the training data.

19. A model generation method in which a computer having a memory executes operations comprising:
acquiring a plurality of learning data sets, each of the learning data sets being constituted by a combination of training data, first correct answer data that indicates a correct answer of a first estimation task with respect to the training data, and second correct answer data that indicates a correct answer of a second estimation task with respect to the training data, the second estimation task being different from the first estimation task; and executing, by iteratively adjusting computational parameters of a learning model stored in the memory, machine learning of the learning model using the plurality of learning data sets, wherein the learning model comprises an encoder, a first estimator, and a second estimator, the encoder is configured to convert given input data into feature amounts comprising a first portion of the feature amounts associated with the first estimation task and a second portion of the feature amounts associated with the second estimation task, the first estimator is configured to accept first input data from the first portion of the feature amounts, and execute the first estimation task based on the first input data from the first portion of the feature amounts, the first estimation task comprising a regression task to estimate a continuous variable associated with the first input data, the second estimator is configured to accept second input data from the second portion of the feature amounts other than the first portion, and execute the second estimation task based on the second input data from the second portion of the feature amounts, the second estimation task comprising a classification task identifying a category associated with the second input data, and executing the machine learning comprises:

training the encoder, the first estimator, and the second estimator by adjusting the computational parameters so that, when the training data of each of the learning data sets is given to the encoder, a result of the first estimator executing the first estimation task matches the first correct answer data, and a result of the second estimator executing the second estimation task matches the second correct answer data; and training the encoder by adjusting the computational parameters so that, for each of the learning data sets, a correlation between the first portion of the feature amounts and the second correct answer data is lowered, and a correlation between the second portion of the feature amounts and the first correct answer data is lowered.

20. A non-transitory computer-readable storage medium storing a model generation program, which when read and executed, causes a computer having a memory, to perform operations comprising:

acquiring a plurality of learning data sets, each of the learning data sets being constituted by a combination of training data, first correct answer data that indicates a correct answer of a first estimation task with respect to the training data, and second correct answer data that indicates a correct answer of a second estimation task with respect to the training data, the second estimation task being different from the first estimation task; and executing, by iteratively adjusting computational parameters of a learning model stored in the memory, machine learning of the learning model using the plurality of learning data sets, wherein the learning model comprises an encoder, a first estimator, and a second estimator, the encoder is configured to convert given input data into feature amounts comprising a first portion of the feature amounts associated with the first estimation task and a second portion of the feature amounts associated with the second estimation task, the first estimator is configured to accept first input data from the first portion of the feature amounts, and execute the first estimation task based on the first input data from the first portion of the feature amounts, the first estimation task comprising a regression task to estimate a continuous variable associated with the first input data, the second estimator is configured to accept second input data from the second portion of the feature amounts other than the first portion, and execute the second estimation task based on the second input data from the second portion of the feature amounts, the second estimation task comprising a classification task identifying a category associated with the second input data, and executing the machine learning comprises:

training the encoder, the first estimator, and the second estimator by adjusting the computational parameters so that, when the training data of each of the learning data sets is given to the encoder, a result of the first estimator executing the first estimation task matches the first correct answer data, and a result of the second estimator executing the second estimation task matches the second correct answer data; and training the encoder by adjusting the computational parameters so that, for each of the learning data sets, a correlation between the first portion of the feature amounts and the second correct answer data is lowered, and a correlation between the second portion of the feature amounts and the first correct answer data is lowered.

* * * * *